United States Patent
Shimada

(10) Patent No.: US 8,936,525 B2
(45) Date of Patent: Jan. 20, 2015

(54) GEAR SYSTEM AND DRIVER

(76) Inventor: Toshiaki Shimada, Hiroshima (JP)

( * ) Notice: Subject to any disclaimer, the term of this patent is extended or adjusted under 35 U.S.C. 154(b) by 0 days.

(21) Appl. No.: 13/981,588

(22) PCT Filed: Jul. 25, 2011

(86) PCT No.: PCT/JP2011/004181
§ 371 (c)(1),
(2), (4) Date: Jul. 24, 2013

(87) PCT Pub. No.: WO2012/111049
PCT Pub. Date: Aug. 23, 2012

(65) Prior Publication Data
US 2013/0319145 A1   Dec. 5, 2013

(30) Foreign Application Priority Data

Feb. 14, 2011   (JP) .................. 2011-028267

(51) Int. Cl.
| | |
|---|---|
| *F16H 19/08* | (2006.01) |
| *F16H 3/44* | (2006.01) |
| *B60K 7/00* | (2006.01) |
| *B60K 17/04* | (2006.01) |
| *F16H 1/32* | (2006.01) |

(52) U.S. Cl.
CPC .................. *F16H 19/08* (2013.01); *B06K 7/00* (2013.01); *F16H 3/44* (2013.01); *B60K 7/0007* (2013.01); *B60K 17/046* (2013.01); *F16H 1/32* (2013.01); *F16H 1/321* (2013.01); *B60K 2007/0092* (2013.01)
USPC .............. 475/149; 475/162; 475/175

(58) Field of Classification Search
None
See application file for complete search history.

(56) References Cited

U.S. PATENT DOCUMENTS

| | | | | |
|---|---|---|---|---|
| 3,965,774 | A | * | 6/1976 | Omi et al. ............. 475/173 |
| 4,181,042 | A | | 1/1980 | Rau et al. |
| 4,807,494 | A | | 2/1989 | Lew |
| 5,152,725 | A | | 10/1992 | Shank, Jr. |
| 5,525,115 | A | | 6/1996 | Vanzini |
| 2005/0028640 | A1 | | 2/2005 | Laurent et al. |
| 2010/0206649 | A1 | | 8/2010 | Ishii |

FOREIGN PATENT DOCUMENTS

| | | |
|---|---|---|
| EP | 0444790 A2 | 9/1991 |
| EP | 0444790 A3 | 4/1992 |
| EP | 2218604 A1 | 8/2010 |

(Continued)

OTHER PUBLICATIONS

International Search Report; PCT/JP2011/004181; Oct. 4, 2011.

*Primary Examiner* — David D Le
*Assistant Examiner* — Timothy Hannon
(74) *Attorney, Agent, or Firm* — Studebaker & Brackett PC

(57) ABSTRACT

A gear system 1 includes: an internal gear 12; an external gear 11; an input shaft 10 rotatably inserted into a center hole 11*a* formed in the external gear 11; and an anti-rotation section 19 configured to block rotation of the external gear 11. The input shaft 10 has an eccentric part 10*a*. The anti-rotation section 19 is formed such that the input shaft 10 is inserted into the anti-rotation section 19, and is rotatable about a center line of the input shaft 10. The gear system 1 includes: a brake 15 configured to disable movement of the anti-rotation section 19 about the input shaft 10; and a clutch system 16 configured to select one of a coupling state in which the anti-rotation section 19 and the input shaft 10 are coupled together to rotate together, and a non-coupling state in which the anti-rotation section 19 and the input shaft 10 are rotatable relative to each other.

4 Claims, 65 Drawing Sheets

(56) References Cited

FOREIGN PATENT DOCUMENTS

| | | | |
|---|---|---|---|
| GB | 1000324 A | 8/1965 | |
| GB | 1166910 A | 10/1969 | |
| GB | 2389827 A | 12/2003 | |
| JP | 02-045554 Y | 12/1990 | |
| JP | 07-054939 A | 2/1995 | |
| JP | 11-193851 A | 7/1999 | |
| JP | 2001-018670 A | 1/2001 | |
| JP | 2010-084907 A | 4/2010 | |
| JP | 2010-188745 A | 9/2010 | |

\* cited by examiner

GEAR SYSTEM AND DRIVER

TECHNICAL FIELD

The present disclosure relates to gear systems configured such that an external gear placed inward of an internal gear meshes with the internal gear while being eccentrically oscillated, and drivers including the same.

BACKGROUND ART

Conventionally, a so-called eccentrically oscillating gear system has been known which includes a ring-shaped internal gear having an inner circumferential surface including internal teeth, and an external gear placed inward of the internal gear to mesh with the internal gear while eccentrically oscillating, and including external teeth fewer in number than the internal teeth as described in, e.g., PATENT DOCUMENTS 1 and 2.

An input shaft of a gear system of PATENT DOCUMENT 1 includes an eccentric part, and the eccentric part is inserted through a bearing into a center hole formed in a central portion of an external gear so as to be rotatable about its axis. One end portion of a crankshaft is rotatably supported by a casing of the gear system, and the other end portion of the crankshaft is rotatably inserted into an insertion hole formed in a region of the external gear toward the outer circumferential surface thereof.

When, in the gear system, the input shaft is rotated with a motor, the movement of the eccentric part drives the external gear. The crankshaft is rotated with the external gear, and since the one end portion of the crankshaft is supported by the casing, the rotation of the external gear is blocked by the crankshaft, and the external gear is eccentric by the eccentricity of the eccentric part, and oscillates while meshing with the internal gear. Thus, the internal gear is rotated to output the torque of the motor.

A gear system of PATENT DOCUMENT 2 includes an external gear having a side surface on which many teeth are formed successively along the circumference of the gear. An input shaft includes, in addition to an eccentric part, an inclined shaft part extending obliquely relative to the center line of the eccentric part. A disk is rotatably supported by the inclined shaft part, and teeth meshing with the teeth on the side surface of the external gear are formed on a side surface of the disk.

In this gear system, rotation of the input shaft allows the external gear to move in response to the movement of the eccentric part. In this case, since the disk engages with the teeth on the side surface of the external gear, the external gear and the disk are connected together to allow the disk to block the rotation of the external gear. Thus, the external gear is eccentric by the eccentricity of the eccentric part, and oscillates while meshing with the internal gear.

The above-described eccentrically oscillating gear systems of PATENT DOCUMENTS 1 and 2 are compact in size, and can provide a high speed reducing ratio.

CITATION LIST

Patent Documents

PATENT DOCUMENT 1: Japanese Examined Utility Model Publication No. H02-45554
PATENT DOCUMENT 2: Japanese Patent Publication No. 2010-84907

SUMMARY OF THE INVENTION

Technical Problem

Incidentally, the eccentrically oscillating gear system may be used as, e.g., a portion of a drive train of an electric vehicle. Specifically, the motor output is fed to the gear system, and wheels are driven by the torque output from the gear system. Thus, while a motor with low maximum power output is used, a sufficient driving force can be obtained, thereby reducing power consumption.

However, in the case of an electric vehicle, a gear system is regularly used in a wide range of speeds, and the rotational speed of a motor significantly varies, for example, between a condition where the vehicle travels at a high speed exceeding 100 km/h and a condition where the vehicle starts to accelerate from 0 km/h; therefore, unless the high speed reducing ratio of the gear system is changed, high-speed running cannot be accommodated.

The eccentrically oscillating gear system may be used to drive, e.g., a press die of a press with a motor. In this case, high thrust is obtained; however, the speed of the movement of the press die is decreased except under pressure, such as when the press die is simply moved.

It is therefore an object of the present disclosure to enable a change in rotational speed and torque if necessary while capitalizing on a compact structure that is the advantage of an eccentrically oscillating gear system.

Solution to the Problem

In order to achieve the object, in the present disclosure, movement of an anti-rotation section configured to block rotation of an external gear is controlled.

An eccentrically oscillating gear system according to a first aspect of the disclosure includes: an internal gear; an external gear disposed inward of the internal gear to mesh with the internal gear, and including teeth that are different in number from teeth of the internal gear; an input shaft rotatably inserted into a center hole formed in the external gear; and an anti-rotation section engaging with the external gear to block rotation of the external gear. The input shaft has an eccentric part that is eccentric relative to a center line of the input shaft. In a situation where the anti-rotation section blocks the rotation of the external gear, the external gear is eccentrically oscillated while meshing with the internal gear by rotating the input shaft with the eccentric part being inserted into the center hole of the external gear. The anti-rotation section is formed such that the input shaft is inserted into the anti-rotation section, and is rotatable about the center line of the input shaft. The gear system includes: a brake configured to disable movement of the anti-rotation section about the input shaft; and a clutch system configured to select one of a coupling state in which the anti-rotation section and the input shaft are coupled together to rotate together, and a non-coupling state in which the anti-rotation section and the input shaft are rotatable relative to each other. One of a first mode in which while the brake is operated, or the clutch system is placed in the non-coupling state, the external gear is oscillated, and a second mode in which while the brake is released, and the clutch system is placed in the coupling state, the external gear is rotated at a rotational speed equal to a rotational speed of the input shaft is selected.

With this configuration, the brake is operated in the first mode, and thus, the movement of the anti-rotation section about the input shaft is disabled. This prevents rotation of the external gear, and the external gear oscillates. This oscillation reduces or increases the rotational speed of the input shaft in response to the difference in number between the teeth of the internal gear and the teeth of the external gear, and the internal gear rotates, thereby outputting the torque of, e.g., the motor.

In contrast, the anti-rotation section rotates together with the input shaft in the second mode, and thus, the anti-rotation section rotates about the center line of the input shaft. Since the anti-rotation section and the external gear engage with each other, the external gear rotates together with the anti-rotation section. The rotational speed of the external gear is equal to that of the input shaft. In this case, the external gear and the internal gear mesh with each other, and thus, the internal gear rotates at a speed equal to the rotational speed of the input shaft (a speed equal to the rotational speed of, e.g., the motor), thereby outputting the torque of, e.g., the motor. In other words, the input shaft and the internal gear rotate at equal speed.

A driver according to a second aspect of the disclosure includes: the gear system of the first aspect of the disclosure; a motor configured to rotate the input shaft; and a controller section configured to control the motor, the brake, and the clutch system.

According to a third aspect of the disclosure, in the driver of the second aspect of the disclosure, the number of the teeth of the external gear may be set at a number less than the number of the teeth of the internal gear, and when a change is made from the second mode to the first mode, the controller section may place the clutch system in the non-coupling state, then control a rotational speed of the motor such that a rotational speed of the input shaft corresponds to a difference in number between the teeth of the external gear and the teeth of the internal gear, and thereafter operate the brake.

With this configuration, since the number of the teeth of the external gear is set at a number less than the number of the teeth of the internal gear, the rotational speed of the input shaft is reduced, and the torque of the motor is output; thus, the gear system acts as a speed reducer. When a change is made from the second mode, i.e., the state in which the input shaft and the internal gear rotate at equal speed, to the first mode, i.e., a deceleration mode, the clutch system is placed in the non-coupling state, and the rotational speed of the motor is controlled to be equal to that of the input shaft after a shift operation. Therefore, when the brake is then operated, and the deceleration mode is obtained, shock or vibration arising from the difference in rotational speed between the input shaft and the internal gear is reduced.

According to a fourth aspect of the disclosure, in the driver of the second aspect of the disclosure, the number of the teeth of the external gear may be set at a number less than the number of the teeth of the internal gear, and when a change is made from the first mode to the second mode, the controller section may release the brake, then control a rotational speed of the motor such that a rotational speed of the input shaft corresponds to a difference in number between the teeth of the external gear and the teeth of the internal gear, and thereafter place the clutch system in the coupling state.

With this configuration, when a change is made from the first mode, i.e., a state in which the deceleration mode is performed, to the second mode, i.e., a state in which the input shaft and the internal gear rotate at equal speed, the brake is released, and the rotational speed of the motor is controlled to be equal to that of the input shaft after a shift operation. Therefore, when the clutch system is then placed in the coupling state, shock or vibration arising from the difference in rotational speed between the input shaft and the internal gear is reduced.

Advantages of the Invention

According to the first aspect of the disclosure, one of the first mode in which the external gear is oscillated, and the second mode in which the internal gear is rotated at a rotational speed equal to the rotational speed of the input shaft can be selected. This allows both of an operation in which the internal gear is rotated at a speed corresponding to the difference in number between the teeth of the internal gear and the teeth of the external gear, and the torque of, e.g., the motor is output, and an operation in which the internal gear is rotated at a rotational speed equal to that of the input shaft, and the torque of the motor is output. Thus, the gear system has a compact structure, and can change the rotational speed and torque if necessary. When the gear system is used for, e.g., an electric vehicle, a motor with low maximum power output can accommodate the range of speeds from the vehicle speed at the start of a vehicle to high speeds, and thus, energy savings can be achieved.

According to the second aspect of the disclosure, the driver that has a compact structure, and can change the rotational speed can be obtained.

According to the third aspect of the disclosure, when a change is made from the second mode to the first mode, the rotational speed of the motor is controlled such that the rotational speed of the input shaft corresponds to the difference in number between the teeth of the internal gear and the teeth of the external gear, and the brake is then operated. This can reduce shock or vibration arising from the difference in rotational speed between the input shaft and the internal gear.

According to the fourth aspect of the disclosure, when a change is made from the first mode to the second mode, shock or vibration arising from the difference in rotational speed between the input shaft and the internal gear can be reduced.

BRIEF DESCRIPTION OF THE DRAWINGS

FIGS. 5A-5C illustrate an input shaft having another structure, in which FIG. 5A is an exploded view of the input shaft, FIG. 5B is a front view of a ring, and FIG. 5C is a partial cross-sectional view of the input shaft.

DESCRIPTION OF EMBODIMENTS

Embodiments of the present disclosure will be described hereinafter in detail with reference to the drawings. The following embodiments are set forth merely for the purposes of preferred examples in nature, and are not intended to limit the scope, applications, and use of the invention.

First Embodiment

Figure 1:
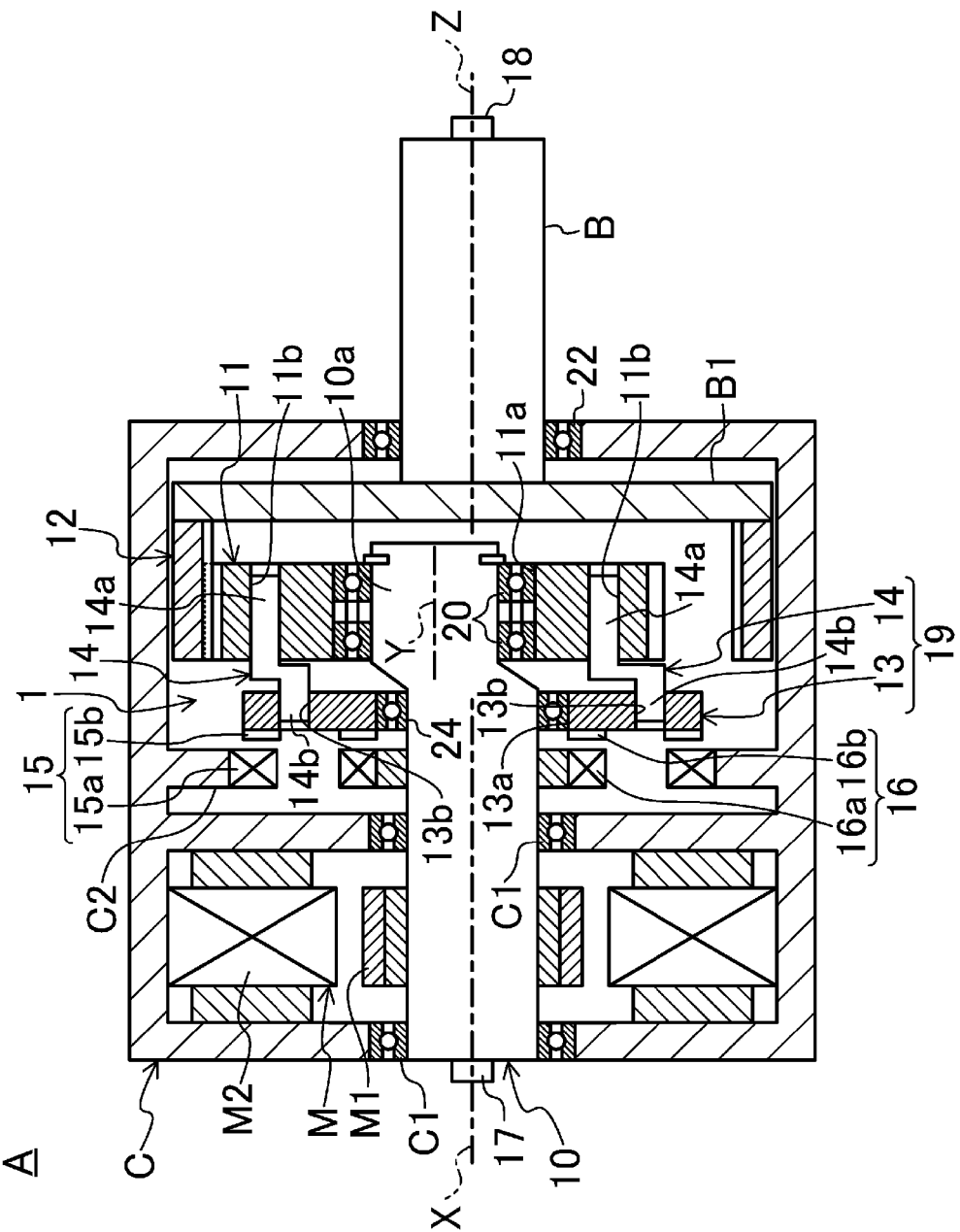
FIG. 1 is a cross-sectional view of a driver according to a first embodiment.
Figure 2:
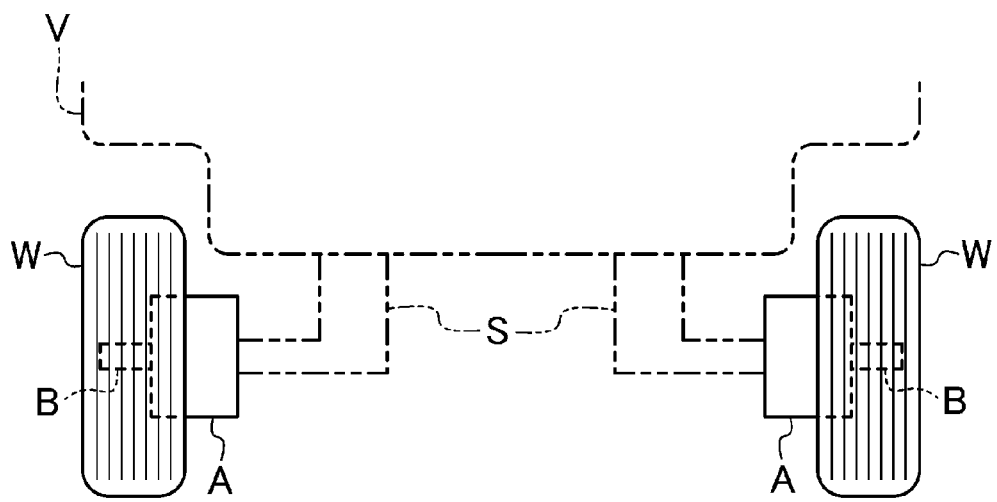
FIG. 2 is a diagram illustrating the use conditions of the driver.

FIG. 1 is a cross-sectional view of a driver A including a gear system 1 according to a first embodiment of the present disclosure. As illustrated in FIG. 2, the driver A is used as a portion of a drive train of an electric vehicle V, and is an in-wheel motor placed in a wheel W. An output shaft B forming a portion of the gear system 1 is coupled through a bolt and a nut (not shown) to the wheel W, and a casing C of the driver A is attached through, e.g., a suspension system S to a vehicle body.

Figure 3:
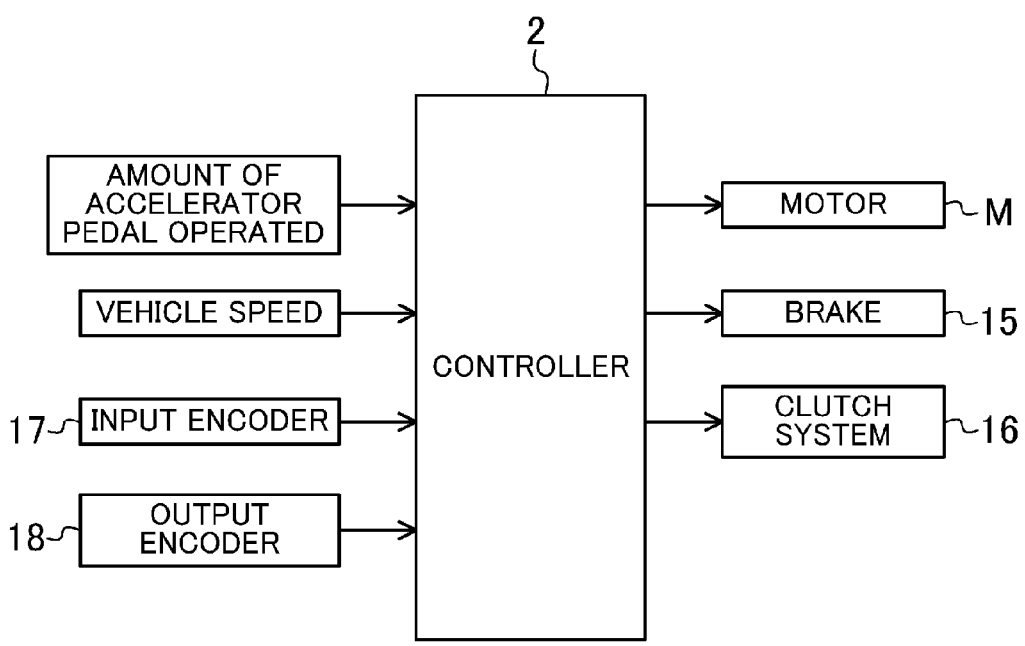
FIG. 3 is a block diagram of the driver.

As illustrated in FIG. 3, the driver A includes a motor M and a controller (controller section) 2 in addition to the gear system 1 and the casing C. As illustrated in FIG. 1, the gear system 1 includes an input shaft 10, an eccentrically oscillating external gear 11, an internal gear 12 fixed to the output shaft B, an anti-rotation plate 13 and crankpins 14 configured to block rotation of the external gear 11, a brake 15, and a clutch system 16, in addition to the output shaft B. The structure for blocking the rotation of the external gear 11 of the gear system 1 of the first embodiment is substantially identical with the structure described in Japanese Examined Utility Model Publication No. H02-45554.

The input shaft 10 is rotatably supported by the casing C with bearings C1, C1 interposed therebetween, and extends in the casing C to the vicinity of one end of the casing C (the right end thereof in FIG. 1) from the other end thereof (the left end thereof in FIG. 1). One end portion of the input shaft 10 is provided with an eccentric part 10a. The eccentric part 10a is formed in a cylindrical shape having a center line Y that is radially eccentric with respect to the center line X of the input shaft 10 by a predetermined amount. The eccentric part 10a is contained in a portion of the casing C toward the one end thereof. The eccentricity of the eccentric part 10a may be determined depending on, e.g., the set number of teeth of each of the external gear 11 and the internal gear 12.

The input shaft 10 includes an input encoder 17 configured to detect the rotational speed of the input shaft 10. As illustrated in FIG. 3, the input encoder 17 is connected to the controller 2, and a signal output from the input encoder 17 is fed to the controller 2.

As illustrated in FIG. 1, the output shaft B passes through a wall of the casing C toward the one end thereof, and protrudes outside the casing C. The output shaft B is rotatably supported by the wall of the casing C with a bearing 22 interposed therebetween. The center line Z of the output shaft B coincides with the center line X of the input shaft 10.

The output shaft B includes an output encoder 18 configured to detect the rotational speed of the output shaft B. As illustrated in FIG. 3, the output encoder 18 is connected to the controller 2.

The wheel W is fixed to a portion of the output shaft B protruding outside the casing C. A portion of the output shaft B located in the casing C includes a radially extending portion B1. The internal gear 12 is fixed to the extending portion B1 to rotate together with the extending portion B1.

The internal gear 12 is contained in a portion of the casing C toward the one end thereof, is formed, as a whole, in the shape of an annular ring, and has an inner circumferential surface including many teeth. The center of rotation of the internal gear 12 coincides with the center line Z of the output shaft B.

The external gear 11 is placed inside the internal gear 12 to mesh with the internal gear 12. Specifically, a circular center hole 11a is formed to pass through a central portion of the external gear 11 along the thickness of the gear 11. The eccentric part 10a of the input shaft 10 is inserted into the center hole 11a of the external gear 11. Bearings 20, 20 are inserted between the inner wall of the center hole 11a of the external gear 11 and the eccentric part 10a of the input shaft 10, and the external gear 11 is supported so as to be rotatable relative to the eccentric part 10a about the center line Y of the eccentric part 10a.

The eccentricity of the eccentric part 10a of the input shaft 10 is set such that some of the teeth of the external gear 11 mesh with some of the teeth of the internal gear 12, and the other teeth of the external gear 11 are apart from the other teeth of the internal gear 12.

The number of the teeth of the external gear 11 is set at a value less than that of the teeth of the internal gear 12. For example, the number of the teeth of the internal gear 12 is 44, and the number of the teeth of the external gear 11 is 43. The number of the teeth of each of the external and internal gears 11 and 12 can be optionally set.

Six pin insertion holes 11b into which the crankpins 14 are inserted are circumferentially spaced at substantially regular intervals in a portion of the external gear 11 toward the outer circumferential surface thereof. The number of the pin insertion holes 11b does not need to be identical with that of the crankpins 14, and may be greater than that of the crankpins 14.

The number of the crankpins 14 is identical with that of the pin insertion holes 11b herein. A portion of each of the crankpins 14 toward one end thereof includes a one-end shaft portion 14a, and the one-end shaft portion 14a is inserted into one of the pin insertion holes 11b of the external gear 11. The one-end shaft portion 14a inserted into the pin insertion hole 11b can rotate about the center line of the one-end shaft portion 14a. A portion of the crankpin 14 toward the other end thereof includes an other-end shaft portion 14b. The eccentricity of the one-end shaft portion 14a with respect to the other-end shaft portion 14b is equal to that of the center line Y of the eccentric part 10a with respect to the center line X of the input shaft 10.

The anti-rotation plate 13 is composed of a generally circular plate. A through hole 13a is formed in a central portion of the anti-rotation plate 13 to pass therethrough along the thickness thereof. A portion of the input shaft 10 closer to the other end of the casing C than the eccentric part 10a is inserted into the through hole 13a of the anti-rotation plate 13, and in this situation, a side surface of the anti-rotation plate 13 is opposed to a side surface of the external gear 11. A bearing 24 is provided between the inner wall of the through hole 13a of the anti-rotation plate 13 and the input shaft 10, and the anti-rotation plate 13 is supported so as to be rotatable relative to the input shaft 10 about the center line X of the input shaft 10.

The bearing 24 may be provided if necessary, and can be omitted.

Six pin insertion holes 13b into which the crankpins 14 are inserted are formed in a portion of the anti-rotation plate 13 toward the outer circumferential surface thereof to correspond to the pin insertion holes 11b of the external gear 11.

The number of the pin insertion holes 13b does not need to be identical with that of the crankpins 14, and may be greater than that of the crankpins 14.

The other-end shaft portion 14b of each of the crankpins 14 is inserted into one of the pin insertion holes 13b. The other-end shaft portion 14b inserted into the pin insertion hole 13b can rotate about the center line of the other-end shaft portion 14b. An anti-rotation section 19 engages with the external gear 11 through the crankpins 14.

Although, in this embodiment, the number of the crankpins 14 is six, it is not limited to six, may be, for example, three, and is not specifically limited.

The anti-rotation plate 13 and the crankpins 14 form the anti-rotation section 19 according to the present disclosure.

The brake 15 is configured to disable movements of the anti-rotation plate 13 and the crankpins 14 about the input shaft 10, and is changed between a braking state where the movements are disabled and a non-braking state where the movements are allowed.

The brake 15 is composed of an electricity-driven electromagnetic brake, and includes a brake body 15a, and a brake facing 15b, which are contained in the casing C. The brake body 15a is fixed to a brake fixing portion C2. The brake fixing portion C2 is formed in the shape of a ring, and is provided on the inner surface of the casing C such that the input shaft 10 is inserted through the brake fixing portion C2. The brake body 15a is opposed to a side surface of the anti-rotation plate 13 further from the external gear 11.

The brake facing 15b is fixed to an outer portion of the side surface of the anti-rotation plate 13 further from the external gear 11 to rotate together with the anti-rotation plate 13.

Although not shown, the brake body 15a includes an electromagnet, and an engagement/disengagement member configured to engage/disengage the brake body 15a to/from the brake facing 15b, and the electromagnet is controlled by the controller 2. When the electromagnet is energized, the engagement/disengagement member moves closer to the brake facing 15b to engage with the brake facing 15b (the braking state), and when the electromagnet is not energized, the engagement/disengagement member moves further from the brake facing 15b so as to be disengaged from the brake facing 15b (the non-braking state).

Specifically, when the electromagnet of the brake body 15a is energized by the controller 2, the anti-rotation plate 13 is fixed to the casing C, thereby disabling rotation of the anti-rotation plate 13 and the crankpins 14 about the input shaft 10. On the other hand, when the controller 2 allows the electromagnet to be in a non-energized condition, the anti-rotation plate 13 is free (in a non-fixed state), and the anti-rotation plate 13 and the crankpins 14 can rotate relative to the casing C.

The brake 15 may be, for example, a brake using a solenoid, or a powder brake utilizing magnetic powder instead of the electromagnetic brake. The brake 15 can be controlled so as to be placed in a state where the brake body 15a and the brake facing 15b are not completely coupled together, i.e., in a so-called half-braking state. When the brake 15 is changed from one of the braking state and the non-braking state to the other state, the brake 15 is preferably placed in the half-braking state.

The clutch system 16 is composed of an electricity-driven electromagnetic clutch system, and includes a clutch system body 16a, and a clutch facing 16b, which are contained in the casing C. The clutch system body 16a is formed in the shape of a ring, and the input shaft 10 is inserted through the clutch system body 16a, which is opposed to a side surface of the anti-rotation plate 13 further from the external gear 11. The clutch system body 16a is coupled to the input shaft 10 using, e.g., a key (not shown) to rotate together with the input shaft 10.

The clutch facing 16b is fixed to an inner portion of the side surface of the anti-rotation plate 13 further from the external gear 11 to rotate together with the anti-rotation plate 13.

Similarly to the brake body 15a, the clutch system body 16a includes an electromagnet, and an engagement/disengagement member configured to engage/disengage the clutch system body 16a to/from the clutch facing 16b, and the electromagnet is controlled by the controller 2. When the electromagnet is energized, the engagement/disengagement member moves closer to the clutch facing 16b to engage with the clutch facing 16b, and when the electromagnet is not energized, the engagement/disengagement member moves further from the clutch facing 16b so as to be disengaged from the clutch facing 16b.

Specifically, when the electromagnet of the brake body 15a is energized by the controller 2, the anti-rotation plate 13 is fixed to the input shaft 10, resulting in a state where the anti-rotation plate 13, the crankpins 14, and the input shaft 10 are coupled to rotate together, i.e., a coupling state. On the other hand, when the controller 2 allows the electromagnet to be in a non-energized condition, the anti-rotation plate 13 is unrestrained by the input shaft 10 (a non-coupling state), and the anti-rotation plate 13 and the crankpins 14 can rotate about the input shaft 10.

The clutch system 16 may be, for example, a clutch system using a solenoid, or a powder clutch system utilizing magnetic powder instead of the electromagnetic clutch system. The clutch system 16 can be controlled so as to be placed in a state where the clutch system body 16a and the clutch facing 16b are not completely coupled together, i.e., a so-called partial clutch engagement state. When the clutch system 16 is changed from one of the coupling state and the non-coupling state to the other state, the clutch system 16 is preferably placed in the partial clutch engagement state.

The motor M is contained in a portion of the casing C toward the other end thereof, and is a hollow motor including a rotor M1 and a stator M2. The inner circumferential surface of the rotor M1 is fixed to the outer circumferential surface of a portion of the input shaft 10 toward the other end of the casing C. The outer circumferential surface of the stator M2 is fixed to the inner circumferential surface of the casing C.

The motor M is connected to the controller 2, and the direction of rotation of the motor M and the rotational speed thereof are changed by the controller 2.

The motor M is a small and power-thrifty motor having a maximum power output that is about $\frac{1}{5}$-$\frac{1}{4}$ of the maximum power output of a motor (maximum power output: 60-120 kW) typically used in electric passenger vehicles.

Next, operation of the driver A configured as above will be described.

When the motor M is rotated in a situation where the brake 15 is placed in the braking state, and the clutch system 16 is placed in the non-coupling state, a deceleration mode (a first mode) in which the rotational speed of the motor M is reduced by the gear system 1, and the torque of the motor M is output is obtained. Specifically, when the brake 15 is placed in the braking state, this allows the anti-rotation plate 13 to be fixed to the casing C. Thus, the crankpins 14 do not rotate about the input shaft 10, and can each rotate about the corresponding other-end shaft portion 14b. Since the clutch system 16 is not in the coupling state, the anti-rotation plate 13 is unrestrained by the input shaft 10.

Figure 4:
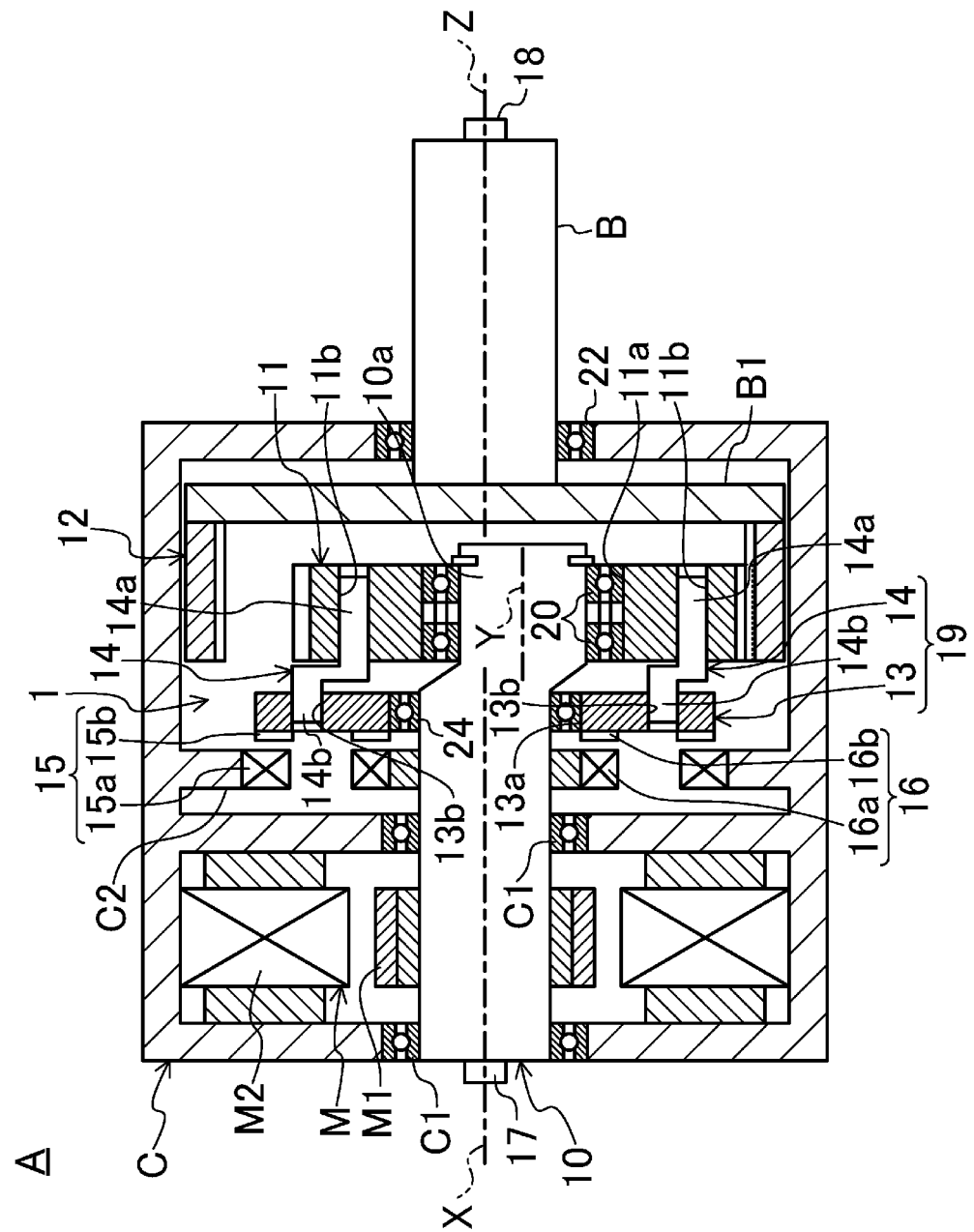
FIG. 4 is a diagram corresponding to FIG. 1, where an input shaft is rotated 180°.

When, in this situation, the motor M rotates to rotate the input shaft 10, the eccentric part 10a moves, and the movement of the eccentric part 10a starts allowing the external gear 11 to oscillate. In this case, since the crankpins 14 are inserted into the external gear 11 so as to be engaged therein, the rotation of the external gear 11 is blocked, and the movement thereof is controlled by the crankpins 14. Thus, the external gear 11 eccentrically oscillates about the center line X while meshing with the internal gear 12. FIG. 4 illustrates a state where the input shaft 10 is rotated 180° from the position illustrated in FIG. 1.

In this case, the number of the teeth of the drive external gear 11 is one less than that of the teeth of the driven internal gear 12, and thus, one oscillation of the external gear 11 allows the internal gear 12 to rotate by an angle corresponding to one of the teeth. That is, in this embodiment, the number of the teeth of the internal gear 12 is 44, and thus, when the external gear 11 rotates 44 times, the internal gear 12 makes one revolution, and a high speed reducing ratio of 1:44 is obtained.

In contrast, when the motor M is rotated in a situation where the brake 15 is placed in the non-braking state, and the clutch system 16 is placed in the coupling state, an equal speed mode (a second mode) in which the motor torque is output without increasing and reducing the rotational speed of the motor M is obtained. Specifically, when the brake 15 is placed in the non-braking state, this allows the anti-rotation plate 13 to rotate. Furthermore, when the clutch system 16 is placed in the coupling state, this allows the anti-rotation plate 13 to be coupled to the input shaft 10.

When, in this situation, the motor M rotates to rotate the input shaft 10, the anti-rotation plate 13 rotates at a speed equal to the rotational speed of the input shaft 10, and the external gear 11 engaging with the anti-rotation plate 13 via the crankpins 14 so as to be connected to the anti-rotation plate 13 also rotates at a speed equal to the rotational speed of the input shaft 10. Since the external gear 11 meshes with the internal gear 12, the internal gear 12 rotates at a speed equal to the rotational speed of the external gear 11.

The controller 2 is a controller that has been conventionally used as a controller for an electric vehicle, includes, e.g., a known microcomputer, and is configured to control the motor M by a known method for controlling a motor.

At least the amount by which an accelerator pedal is operated by the driver, the vehicle speed, and an operation signal of a shift lever are fed to the controller 2. The controller 2 controls the brake 15, the clutch system 16, and the motor M, based on the amount by which the accelerator pedal is operated, the vehicle speed, and signals fed from, e.g., the input encoder 17 and the output encoder 18.

Next, what is controlled by the controller 2 will be specifically described. When the vehicle speed is 0 km/h, the brake 15 is placed in the braking state, and the clutch system 16 is placed in the non-coupling state, thereby obtaining the deceleration mode. When the accelerator pedal is depressed, current is supplied to the motor M to achieve the torque corresponding to the amount by which the accelerator pedal is depressed.

When the vehicle speed increases and exceeds 60 km/h, the brake 15 is placed in the non-braking state, and the clutch system 16 is placed in the coupling state, thereby obtaining the equal speed mode. The timing at which the brake 15 is placed in the non-braking state, and the clutch system 16 is placed in the coupling state is not limited to the timing at which the vehicle speed exceeds 60 km/h, and may be, for example, the timing at which the vehicle speed exceeds 50 km/h, or the timing at which the vehicle speed exceeds 80 km/h. At this timing, the brake 15 can be placed in the half-braking state, and the clutch system 16 can be placed in the partial clutch engagement state. This can reduce the shock occurring under operating conditions of the brake 15 or the clutch system 16.

The following control is performed at the time of change from the deceleration mode to the equal speed mode. Before the clutch system 16 is changed from the non-coupling state to the coupling state, the brake 15 is placed in the non-braking state. Then, the rotational speed of the motor M is reduced such that the rotational speed of the input shaft 10 corresponds to that in the equal speed mode, and thereafter, the clutch system 16 is placed in the coupling state.

Specifically, at the time of change from the deceleration mode to the equal speed mode, the controller 2 adjusts the rotational speed of the motor M such that after the brake 15 has been placed in the non-braking state, the rotational speed of the input shaft 10 corresponds to the difference in number between the teeth of the gear 11 and the teeth of the gear 12, and then, the clutch system 16 is placed in the coupling state. The rotational speed of the motor M is adjusted based on the rotational speed of each of the input shaft 10 and the output shaft B obtained from a signal of a corresponding one of the input encoder 17 and the output encoder 18. The rotational speed of the motor M does not necessarily need to be adjusted at the time of change from the deceleration mode to the equal speed mode.

In contrast, when the vehicle speed is reduced, and is lower than 60 km/h, a change is made from the equal speed mode to the deceleration mode. The following control is performed at the time of the change. Before the brake 15 is changed from the non-braking state to the braking state, the clutch system 16 is placed in the non-coupling state. Then, the rotational speed of the motor M is increased such that the rotational speed of the input shaft 10 corresponds to that in the deceleration mode, and then, the brake 15 is placed in the braking state.

Specifically, at the time of change from the equal speed mode to the deceleration mode, the controller 2 adjusts the rotational speed of the motor M such that after the clutch system 16 has been placed in the non-coupling state, the rotational speed of the input shaft 10 corresponds to the difference in number between the teeth of the gear 11 and the teeth of the gear 12, and then, the brake 15 is operated.

The rotational speed of the motor M is adjusted based on the rotational speed of each of the input shaft 10 and the output shaft B obtained from a signal of a corresponding one of the input encoder 17 and the output encoder 18. At the time of change from the equal speed mode to the deceleration mode, the brake 15 can be placed in the half-braking state, and the clutch system 16 can be placed in the partial clutch engagement state. The rotational speed of the motor M does not necessarily need to be adjusted at the time of change from the equal speed mode to the deceleration mode.

As described above, according to the first embodiment, one of the deceleration mode in which the external gear 11 is oscillated, and the equal speed mode in which the external gear 11 is rotated at a speed equal to the rotational speed of the input shaft 10 can be selected. This enables both the mode in which the internal gear 12 is rotated at a speed corresponding to the difference in number between the teeth of the internal gear 12 and the teeth of the external gear 11, and the torque of the motor M is output, and the mode in which the internal gear 12 is rotated at a speed equal to the rotational speed of input shaft 10, and the torque of the motor M is output.

Thus, the gear system has a compact structure, and can change the rotational speed and torque if necessary. Therefore, also when the motor M with low maximum power output is used, the range of speeds from the vehicle speed at the start of a vehicle to high speeds can be accommodated, and energy savings can be achieved. Furthermore, the distance that can be traveled per charge can be increased, and a vehicle battery can have a longer life, and can be reduced in size and weight. Moreover, the frequency of charges can be also reduced, and the battery charging time can be also reduced.

At the time of change from the equal speed mode to the deceleration mode, the rotational speed of the motor M is adjusted such that the rotational speed of the input shaft 10 corresponds to the difference in number between the teeth of the internal gear 12 and the teeth of the external gear 11, and then, the brake 15 is operated to perform the deceleration mode, thereby reducing shock or vibration arising from the difference in rotational speed between the input shaft 10 and the internal gear 13.

Figure 5A:
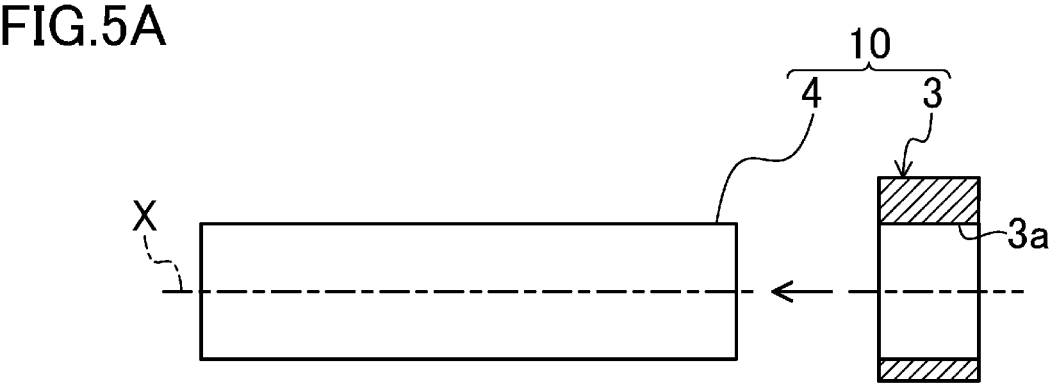
Figure 5B:
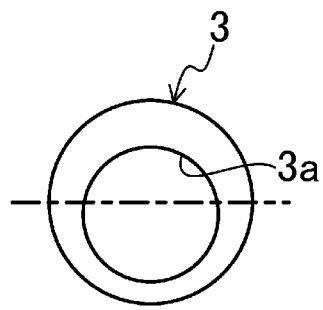
Figure 5C:
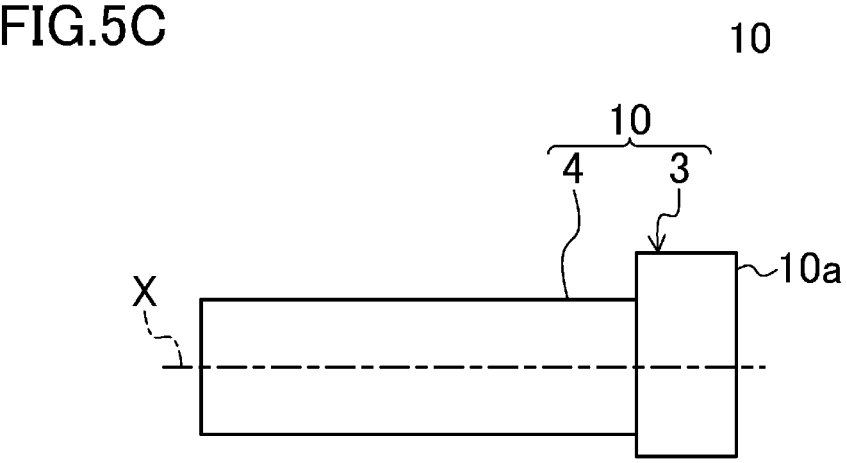

Although, in the first embodiment, the input shaft 10 is an integrally formed piece, it is not limited to the integrally formed piece, and may be obtained, for example, by combining a plurality of parts as illustrated in FIGS. 5A-5C. Specifically, in the structure illustrated in FIGS. 5A-5C, the input shaft 10 includes a ring 3 and a bar 4 as illustrated in FIG. 5A. The bar 4 does not have any eccentric part, and the ring 3 forms an eccentric part 10a (see FIG. 5C). A hole 3a of the ring 3 has a circular cross section having a diameter substantially equal to the outer diameter of the bar 4. As illustrated in FIG. 5B, the center of the outer circle of the ring 3 is radially eccentric relative to the center of the hole 3a by a predetermined amount. As illustrated in FIG. 5C, the bar 4 is fixed by being inserted into the hole 3a of the ring 3, thereby forming the input shaft 10 having the eccentric part 10a.

As such, a member forming the eccentric part 10a (ring 3) and a member forming a main part of the input shaft 10 (bar 4) are different members, and thus, while the accuracy of the input shaft 10 can be increased, cost can be reduced. Specifically, it is typically difficult and very expensive to integrally form a shaft having an eccentric part with high accuracy. In contrast, the bar 4 that does not have an eccentric part can be formed at low cost and with high accuracy, and the ring 3 can be also formed at low cost and with high accuracy because of its simple shape.

When a plurality of types of gear systems 1 are manufactured, only the ring 3 may be varied among the gear systems 1, and the same type of bars 4 may be used. Alternatively, only the bar 4 may be varied among the gear systems 1, and the same type of rings 3 may be used.

The ring 3 and the bar 4 can be made of different materials to each offer adequate properties.

Figure 6:
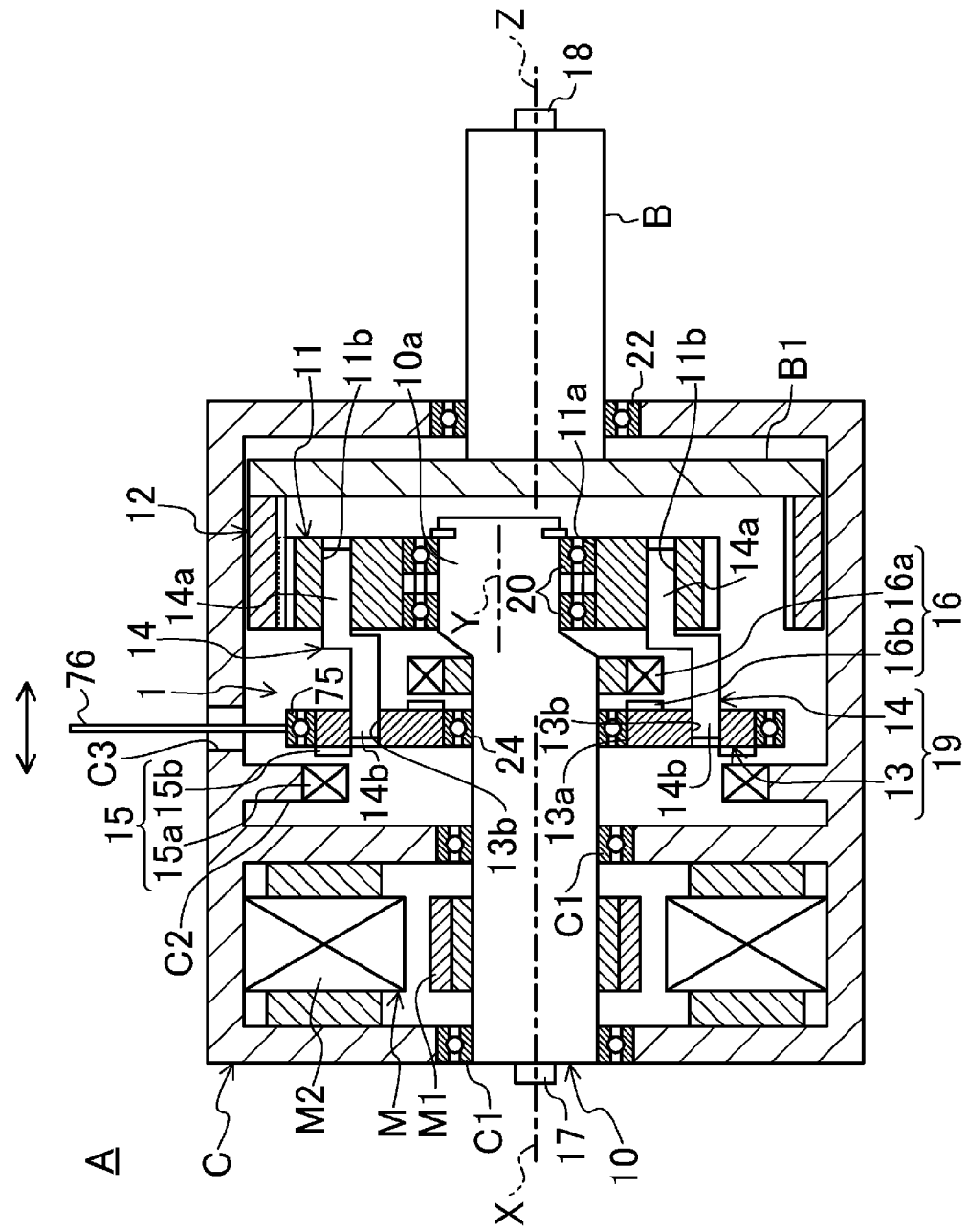
FIG. 6 is a diagram corresponding to FIG. 1 according to a first variation of the first embodiment.

As illustrated in a first variation in FIG. 6, an anti-rotation plate 13 may be moved along the center line X of an input shaft 10 to select one of operation of a brake 15 and operation of a clutch system 16. In the first variation, a brake body 15a of the brake 15 does not move, is opposed to a brake facing 15b, and can be engaged/disengaged to/from the brake facing 15b.

In contrast, the clutch system 16 is closer to the one end of a casing C than the anti-rotation plate 13, a clutch system body 16a is fixed to the input shaft 10 to rotate together with the input shaft 10, and a clutch facing 16b is fixed to a side surface of the anti-rotation plate 13 toward an external gear 11 to rotate together with the anti-rotation plate 13. The clutch system body 16a does not also move, is opposed to the clutch facing 16b, and can be engaged/disengaged to/from the clutch facing 16b.

As illustrated in FIG. 6, the brake body 15a and the clutch system body 16a are each placed so as to be able to be separated from a corresponding one of the brake facing 15b and the clutch facing 16b on the anti-rotation plate 13.

The anti-rotation plate 13 is supported by the input shaft 10 to be slidable along the center line X of the input shaft 10. The movement of the anti-rotation plate 13 along the center line X allows other-end shaft portions 14b of crankpins 14 to slide in corresponding pin insertion holes 13b of the anti-rotation plate 13.

When the anti-rotation plate 13 moves to the right in FIG. 6, the brake body 15a and the brake facing 15b are separated from each other, and the clutch system body 16a and the clutch facing 16b are in contact with each other, and are engaged to each other. When the anti-rotation plate 13 moves to the left in FIG. 6, the brake body 15a and the brake facing 15b are in contact with each other, and are engaged to each other, and the clutch system body 16a and the clutch facing 16b are separated from each other.

The anti-rotation plate 13 is controlled from outside the casing C. A ball bearing 75 is placed around the anti-rotation plate 13. An inner ring of the ball bearing 75 is fixed to an outer portion of the anti-rotation plate 13. A control member 76 is fixed to an outer ring of the ball bearing 75. The control member 76 passes through a through hole C3 formed in a circumferential wall of the casing C, and protrudes outward from the casing C. An actuator (not shown) that is controlled by a controller 2 is coupled to the control member 76, and the control member 76 is manipulated along lateral directions in FIG. 6 (the directions illustrated by the arrow) by the actuator.

When the control member 76 is manipulated to the right in FIG. 6, the anti-rotation plate 13 moves to the right, the brake body 15a and the brake facing 15b are separated from each other, and the clutch system body 16a and the clutch facing 16b are in contact with each other, and are engaged to each other. When the control member 76 is manipulated to the left in FIG. 6, the anti-rotation plate 13 moves to the left, the brake body 15a and the brake facing 15b are in contact with each other, and are engaged to each other, and the clutch system body 16a and the clutch facing 16b are separated from each other. When the control member 76 is stopped at the midpoint position between the leftmost position to which the control member 76 can be moved and the rightmost position to which the control member 76 can be moved, the brake body 15a and the clutch system body 16a are each separated from a corresponding one of the brake facing 15b and the clutch facing 16b. In the first variation, the speed of the output shaft B can be varied by the manipulation of the control member 76. The positioning of the control member 76 allows the brake body 15a to be in the half-braking state, and similarly allows the clutch system 16 to be in the partial clutch engagement state. The control member 76 may be manually manipulated by an occupant of the vehicle.

Figure 7:
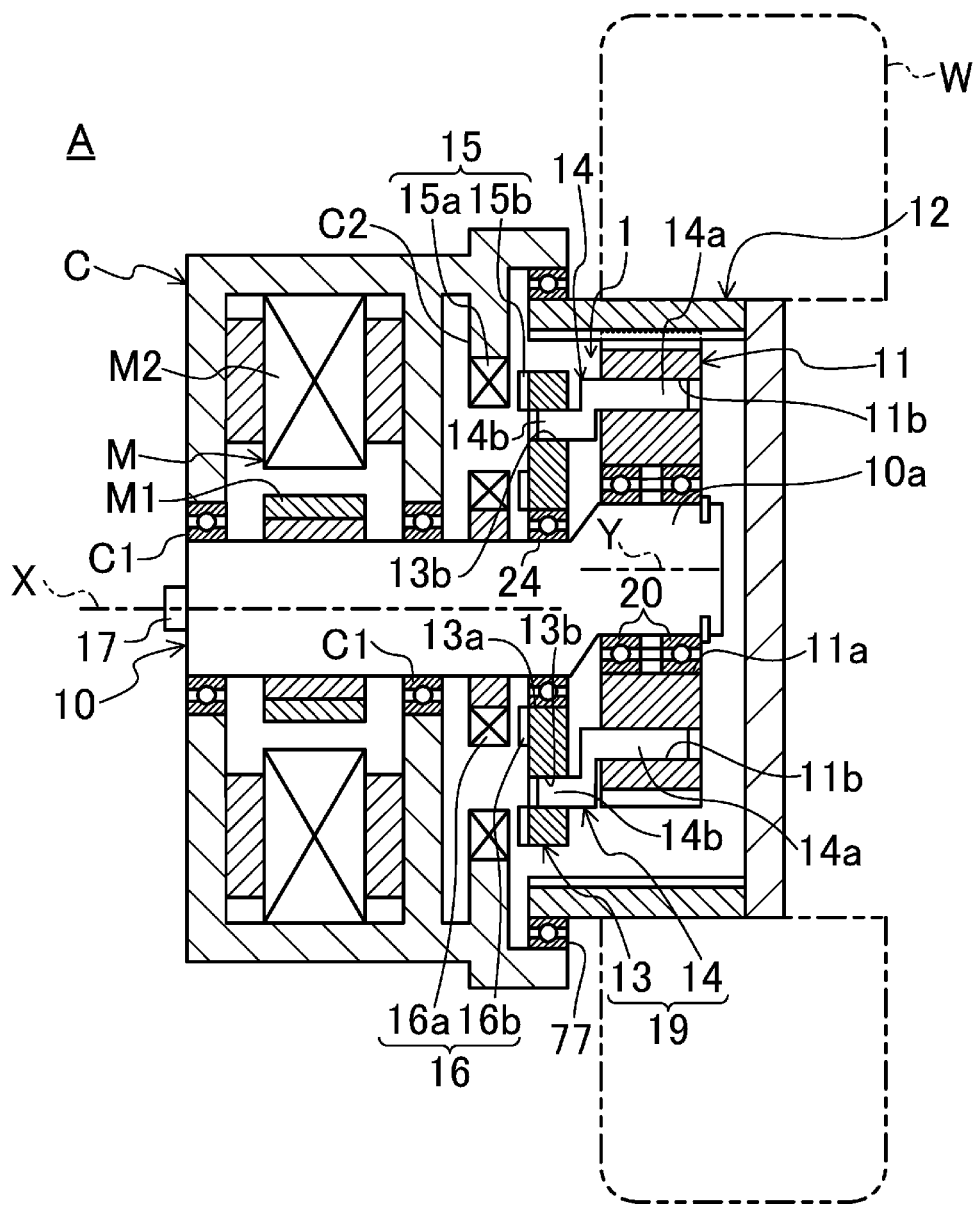
FIG. 7 is a diagram corresponding to FIG. 1 according to a second variation of the first embodiment.

As illustrated in a second variation in FIG. 7, a wheel W may be fixed to an internal gear 12. In the second variation, an output shaft B is omitted, and although not shown, the internal gear 12 or the wheel W can include an output encoder. A bearing 77 is placed around an external gear 11, and the external gear 11 is rotatably supported by the casing C with the bearing 77 interposed therebetween. In the second variation, the output shaft B is omitted, and the internal gear 12 can be located inside the wheel W, thereby allowing a driver A to be compact in size.

Second Embodiment

Figure 8:
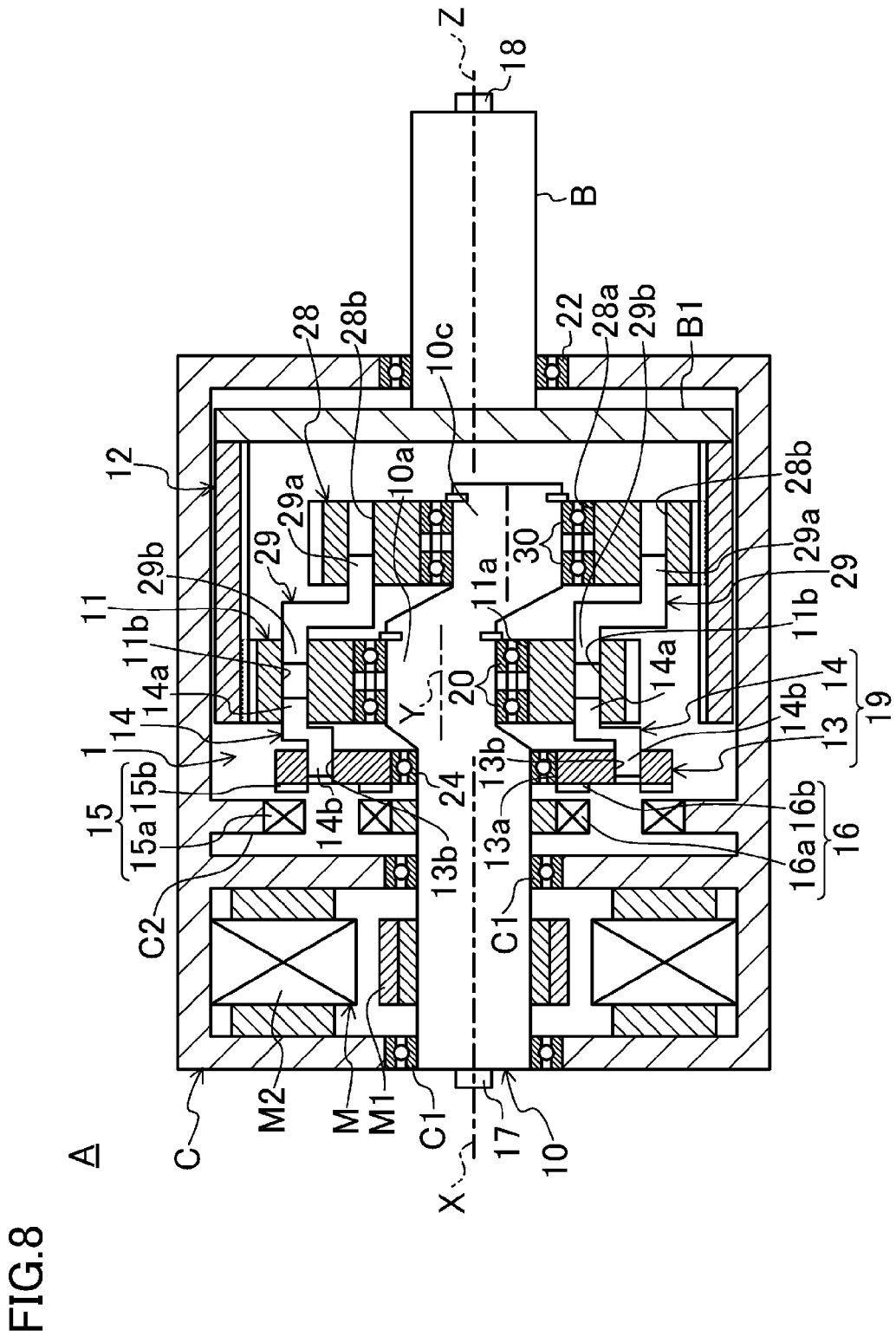
FIG. 8 is a diagram corresponding to FIG. 1 according to a second embodiment.

FIG. 8 is a cross-sectional view of a driver A according to a second embodiment of the present disclosure. Unlike the first embodiment, the driver A of the second embodiment includes a balancer plate 28, and balancer-plate-actuating crankpins 29 for actuating the balancer plate. The other parts of the second embodiment are identical with those of the first embodiment, and thus, the difference between the first and second embodiments will be described hereinafter in detail.

An input shaft 10 includes a balancer-plate-mounting eccentric part 10c that is closer to one end of the input shaft 10 than an eccentric part 10a. The eccentricity of the balancer-plate-mounting eccentric part 10c with respect to the input shaft 10 is set at an eccentricity identical with the eccentricity of the eccentric part 10a with respect to the input shaft 10. The direction of eccentricity of the balancer-plate-mounting eccentric part 10c with respect to the input shaft 10 is diametrically opposite to the direction of eccentricity of the eccentric part 10a with respect to the input shaft 10.

The structure of the balancer plate 28 is identical with that of an external gear 11. Specifically, the balancer plate 28 has a center hole 28a, and pin insertion holes 28b into which the balancer-plate-actuating crankpins 29 are inserted, and the outer circumferential surface of the balancer plate 28 includes the same number of teeth as those of the external gear 11.

A portion of each of the balancer-plate-actuating crankpins 29 toward one end thereof forms a one-end shaft portion 29a, and the one-end shaft portion 29a is inserted into a corresponding one of the pin insertion holes 28b of the balancer plate 28. The one-end shaft portion 29a can rotate about the center line of the one-end shaft portion 29a while being inserted into the corresponding pin insertion hole 28b. A portion of the crankpin 29 toward the other end thereof forms an other-end shaft portion 29b. The eccentricity of the one-end shaft portion 29a with respect to the other-end shaft portion 29b is twice the eccentricity of the center line Y of the eccentric part 10a with respect to the center line X of the input shaft 10, and is equal to the radial distance between the center line Y of the eccentric part 10a and the center line of the balancer-plate-mounting eccentric part 10c.

The other-end shaft portion 29b of each of the balancer-plate-actuating crankpins 29 is inserted into a corresponding one of pin insertion holes 11b of the external gear 11. The other-end shaft portion 29b can rotate about the center line of the other-end shaft portion 29b while being inserted into the corresponding pin insertion hole 11b.

The balancer-plate-mounting eccentric part 10c is inserted into the center hole 28a of the balancer plate 28. Bearings 30 are provided between the inner wall of the center hole 28a of the balancer plate 28 and the balancer-plate-mounting eccentric part 10c, and the balancer plate 28 can rotate about the balancer-plate-mounting eccentric part 10c.

The teeth of the balancer plate 28 mesh with teeth of an internal gear 12. Since the balancer-plate-mounting eccentric part 10c is eccentric in a direction opposite to the direction of eccentricity of the eccentric part 10a, a portion of the internal gear 12 with which the teeth of the balancer plate 28 mesh is opposite to a portion of the internal gear 12 with which the teeth of the external gear 11 mesh with respect to the center line of the internal gear 12. The balancer plate 28 does not always need to mesh with the internal gear 12. For example, the internal gear 12 may include a friction material being in contact with the balancer plate 28 and having a high coefficient of friction, and the friction material may block rotation of the balancer plate 28. Oppositely, the balancer plate 28 may include a friction material being in contact with the internal gear 12, and the friction material may block rotation of the balancer plate 28.

In the second embodiment, the balancer plate 28 is always located radially opposite to the external gear 11, and thus, acts as a counterweight to cancel vibrations resulting from eccentric oscillation of the external gear 11.

According to the second embodiment, operational advantages similar to those of the first embodiment can be obtained.

Figure 9:
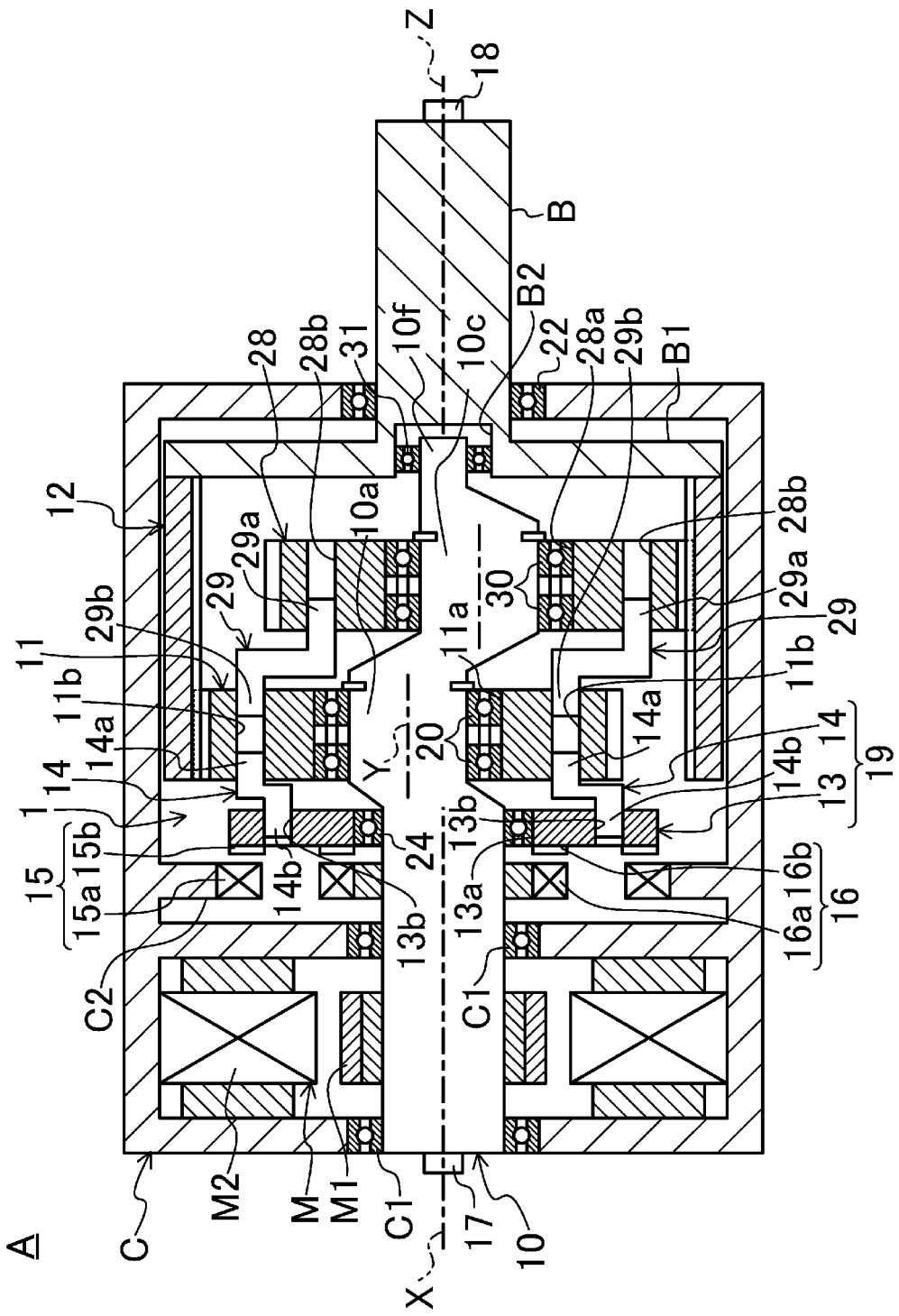
FIG. 9 is a diagram corresponding to FIG. 1 according to a first variation of the second embodiment.

As illustrated in a first variation in FIG. 9, one end portion of an input shaft 10 may be supported by an output shaft B. In the first variation, the one end portion of the input shaft 10 includes a spindle portion 10f extending along the same line as the center line X of the input shaft 10. In contrast, a portion of the output shaft B facing the one end portion of the input shaft 10 has a receiving hole B2 on the same line as the center line X of the input shaft 10. The spindle portion 10f of the input shaft 10 is inserted into the receiving hole B2. A bearing 31 is provided between the inner wall of the receiving hole B2 and the spindle portion 10f, and the spindle portion 10f is supported by the output shaft B to be rotatable relative to the output shaft B. The support structure of the one end portion of the input shaft 10 according to this variation can be practiced also with the driver A of the first embodiment.

Figure 10:
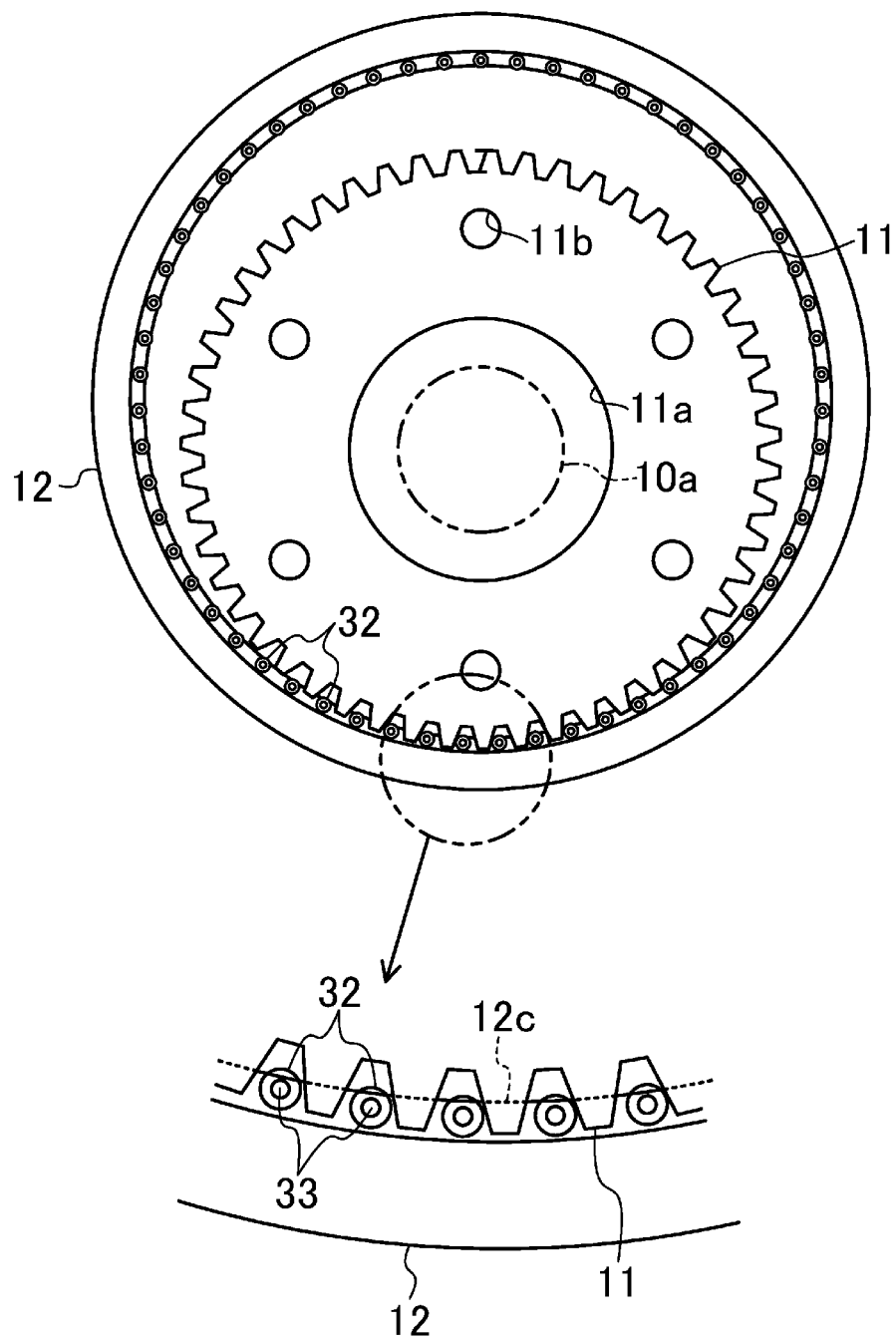
FIG. 10 is a side view of external and internal gears according to a second variation of the second embodiment.

As illustrated in a second variation in FIG. 10, a portion of the internal gear 12 including teeth may include rollers 32 functioning as teeth. The rollers 32 are each supported on a main portion of the internal gear 12 by a spindle 33 extending in parallel with the center line of rotation of the internal gear 12, and can each rotate about the spindle 33. The spindle 33 is placed on a support wall 12c formed as an inner surface of the internal gear 12. This allows the teeth surfaces of the external gear 11 to be in contact with the rollers 32, and thus, the contact resistance between the teeth surfaces of the external gear 11 and the internal gear 12 decreases, resulting in a reduction in frictional heat.

Figure 11:
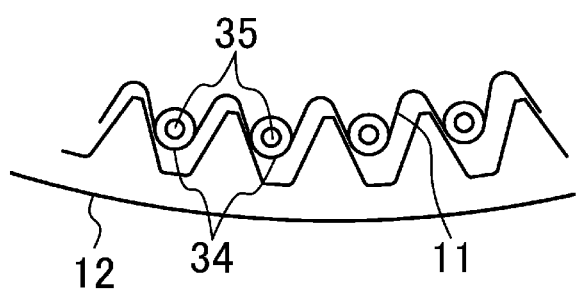
FIG. 11 is a partial enlarged view of external and internal gears according to a third variation of the second embodiment.

As illustrated in a third variation in FIG. 11, a portion of the external gear 11 including teeth may include rollers 34 functioning as teeth. The rollers 34 are each supported on a main portion of the external gear 11 by a spindle 35 extending in parallel with the center line of rotation of the external gear 11, and can each rotate about the spindle 35. This allows the teeth surfaces of the internal gear 12 to be in contact with the rollers 34, resulting in a reduction in frictional heat.

Third Embodiment

Figure 12:
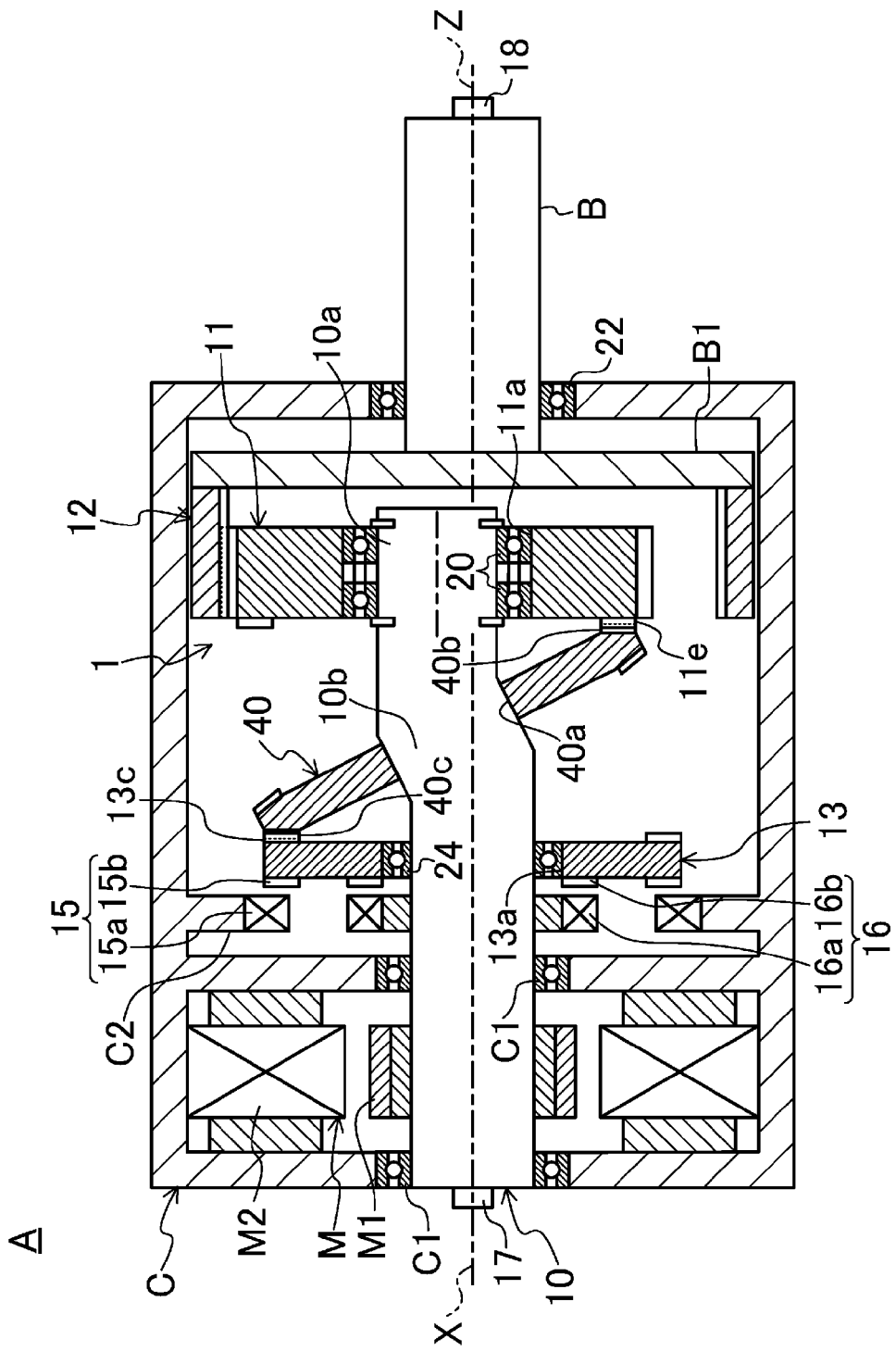
FIG. 12 is a diagram corresponding to FIG. 1 according to a third embodiment.

FIG. 12 illustrates a driver A according to a third embodiment of the present disclosure. Unlike the first embodiment, an anti-rotation section of the driver A of the third embodiment has the structure described in Japanese Patent Publication No. 2010-84907, and the other parts of the driver A are identical with those of the first embodiment. The difference between the first and third embodiments will be described hereinafter in detail.

Specifically, a gear system 1 of the third embodiment includes a wobble plate 40 instead of crankpins 14.

Figure 13:
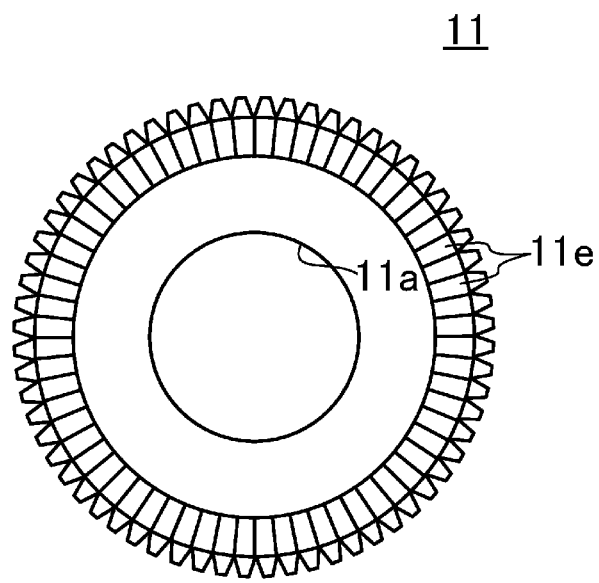
FIG. 13 is a side view of an external gear.

An input shaft 10 includes an inclined shaft part 10b that is closer to the other end of a casing C (the left side of FIG. 12) than an eccentric part 10a of the input shaft 10 and extends obliquely relative to the center line X of the input shaft 10. As illustrated also in FIG. 13, a plurality of teeth 11e are successively formed on an outer portion of a side surface of an external gear 11 near an anti-rotation plate 13 along the circumference of the external gear 11.

A plurality of teeth 13c are successively formed on an outer portion of a side surface of the anti-rotation plate 13 near the external gear 11 along the circumference of the anti-rotation plate 13. The anti-rotation plate 13 is supported by the input shaft 10 so as not to move along the center line X of the input shaft 10.

Figure 14:
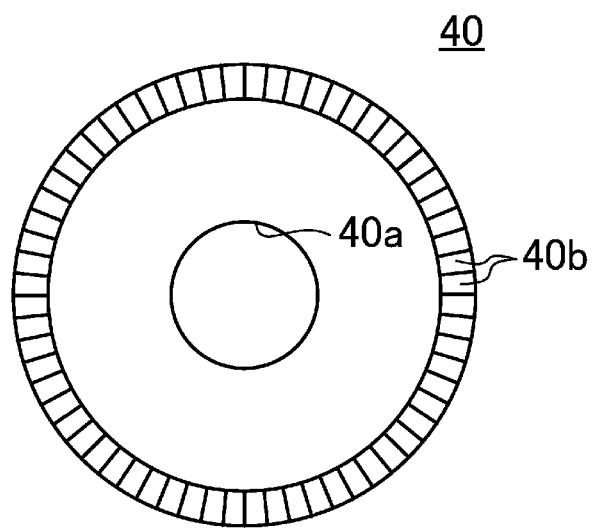
FIG. 14 is a side view of a wobble plate.
Figure 15:
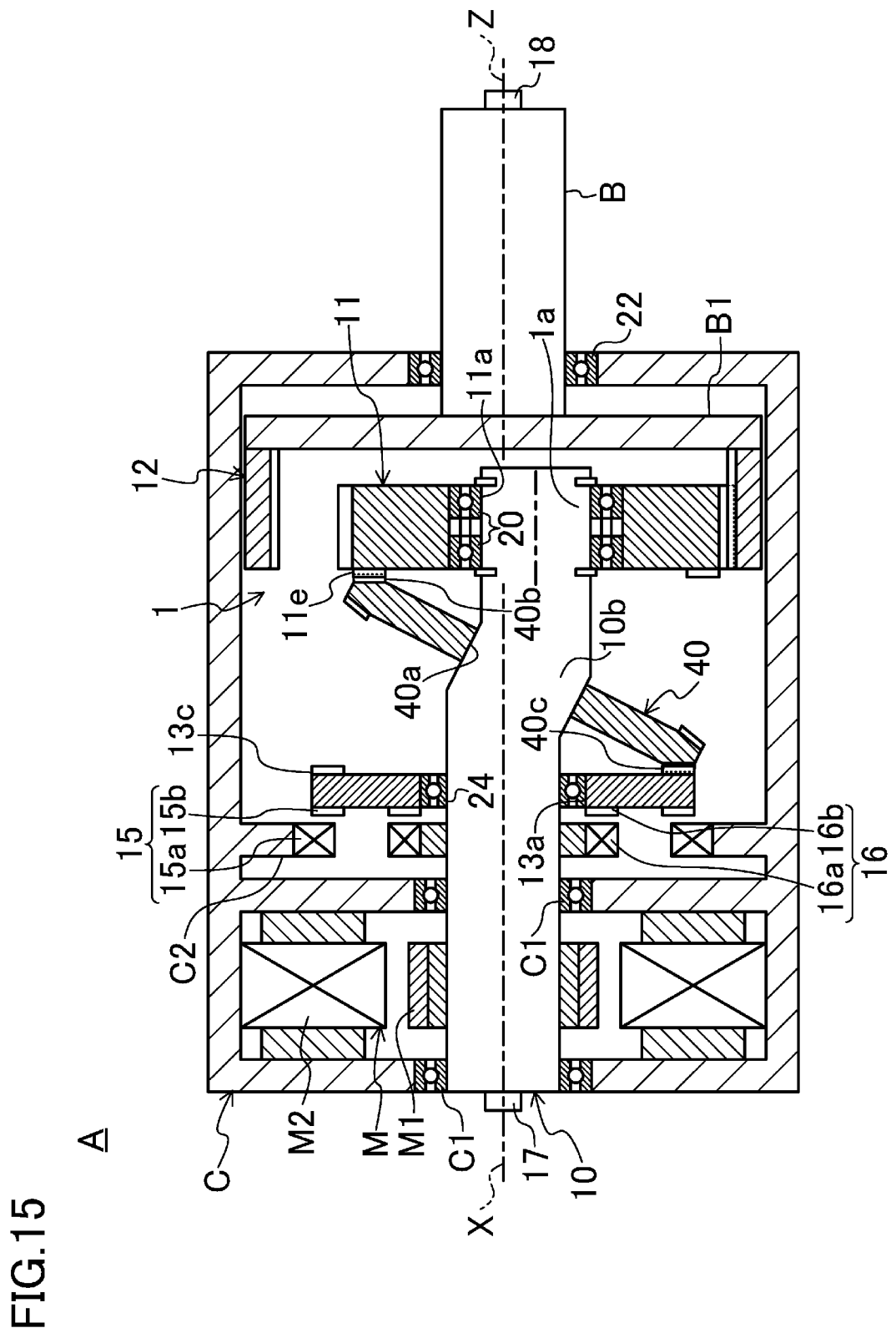
FIG. 15 is a diagram corresponding to FIG. 4 according to the third embodiment.

The wobble plate 40 is located between the external gear 11 and the anti-rotation plate 13. The wobble plate 40 has a center hole 40a, and forms an annular shape. As illustrated in FIG. 14, a plurality of teeth 40b are successively formed on an outer portion of a side surface of the wobble plate 40 near the external gear 11 along the circumference of the wobble plate 40 to mesh with the teeth 11e of the external gear 11. A plurality of teeth 40c (illustrated in FIG. 12) are successively formed on an outer portion of a side surface of the wobble plate 40 near the anti-rotation plate 13 along the circumference of the wobble plate 40 to mesh with the teeth 13c of the anti-rotation plate 13.

The inclined shaft part 10b of the input shaft 10 is rotatably inserted into the center hole 40a of the wobble plate 40. Therefore, the wobble plate 40 is supported by the input shaft 10 with the center line of the wobble plate 40 corresponding to the center line of the inclined shaft part 10b.

Thus, the wobble plate 40 is inclined relative to the external gear 11 such that part of the circumference of the wobble plate 40 is closer to the external gear 11, and part thereof opposite to the part thereof closer to the external gear 11 with respect to the center hole 40a is furthest from the external gear 11. In this situation, among the teeth 40b, 40b, . . . of the wobble plate 40, only the teeth 40b of the part closer to the external gear 11 mesh with the teeth 11e of the external gear 11, and the wobble plate 40 and the external gear 11 engage with each other.

The wobble plate 40 is supported by the anti-rotation plate 13 from a direction opposite to the direction in which the external gear 11 is located. Among the teeth 40c, 40c, . . . of the wobble plate 40, only the teeth 40c of the part closer to the anti-rotation plate 13 mesh with the teeth 13c of the anti-rotation plate 13, and the wobble plate 40 and the anti-rotation plate 13 engage with each other. When the wobble plate 40 is assembled to the input shaft 10, the wobble plate 40 may have a structure that can be radially divided.

Next, operation of the driver A configured as above will be described. When a motor M is rotated in a situation where while a brake 15 is placed in a braking state, a clutch system 16 is placed in a non-coupling state, a deceleration mode in which the rotational speed of the motor M is reduced by the gear system 1, and the motor torque is output is obtained. Specifically, when the brake 15 is placed in the braking state, the anti-rotation plate 13 is fixed to the casing C. Furthermore, when the clutch system 16 is placed in the non-coupling state, the anti-rotation plate 13 is unrestrained by the input shaft 10. In this case, the teeth 40b of the wobble plate 40 mesh with the teeth 11e of the external gear 11, and thus, the wobble plate 40 and the external gear 11 are integrally connected together, and cannot rotate relative to each other. Furthermore, the teeth 40c of the wobble plate 40 mesh with the teeth 13c of the anti-rotation plate 13, and thus, the wobble plate 40 and the anti-rotation plate 13 are also integrally connected together.

When, in this situation, the motor M rotates to rotate the input shaft 10, the eccentric part 10a moves, and the movement of the eccentric part 10a allows the external gear 11 to start oscillating. In this case, the external gear 11 and the anti-rotation plate 13 are prevented from relatively rotating with the wobble plate 40 interposed therebetween, and the anti-rotation plate 13 is integrally connected through the brake 15 to the casing C. Therefore, rotation of the external gear 11 is blocked, and the external gear 11 eccentrically oscillates. This allows the gear system 1 to function as a speed reducer.

In contrast, when the motor M is rotated in a situation where while the brake 15 is placed in a non-braking state, the clutch system 16 is placed in a coupling state, an equal speed mode in which the motor torque is output without reducing and increasing the rotational speed of the motor M is obtained. Specifically, when the brake 15 is placed in the non-braking state, this allows rotation of the anti-rotation plate 13. When the clutch system 16 is placed in the coupling state, the anti-rotation plate 13 is coupled to the input shaft 10.

When, in this situation, the motor M rotates to rotate the input shaft 10, the anti-rotation plate 13 rotates at a speed equal to the rotational speed of the input shaft 10, and the external gear 11 integrally connected through the wobble plate 40 to the anti-rotation plate 13 also rotates at a speed equal to the rotational speed of the input shaft 10. Furthermore, since the external gear 11 mesh with the internal gear 12, the internal gear 12 rotates at a speed equal to the rotational speed of the external gear 11.

A controller 2 controls the brake 15, the clutch system 16, and the motor M similarly to the first embodiment.

Therefore, according to the third embodiment, one of the deceleration mode and the equal speed mode can be selected, and thus, the gear system has a compact structure, and can change the rotational speed and torque if necessary similarly to the first embodiment.

Figure 16:
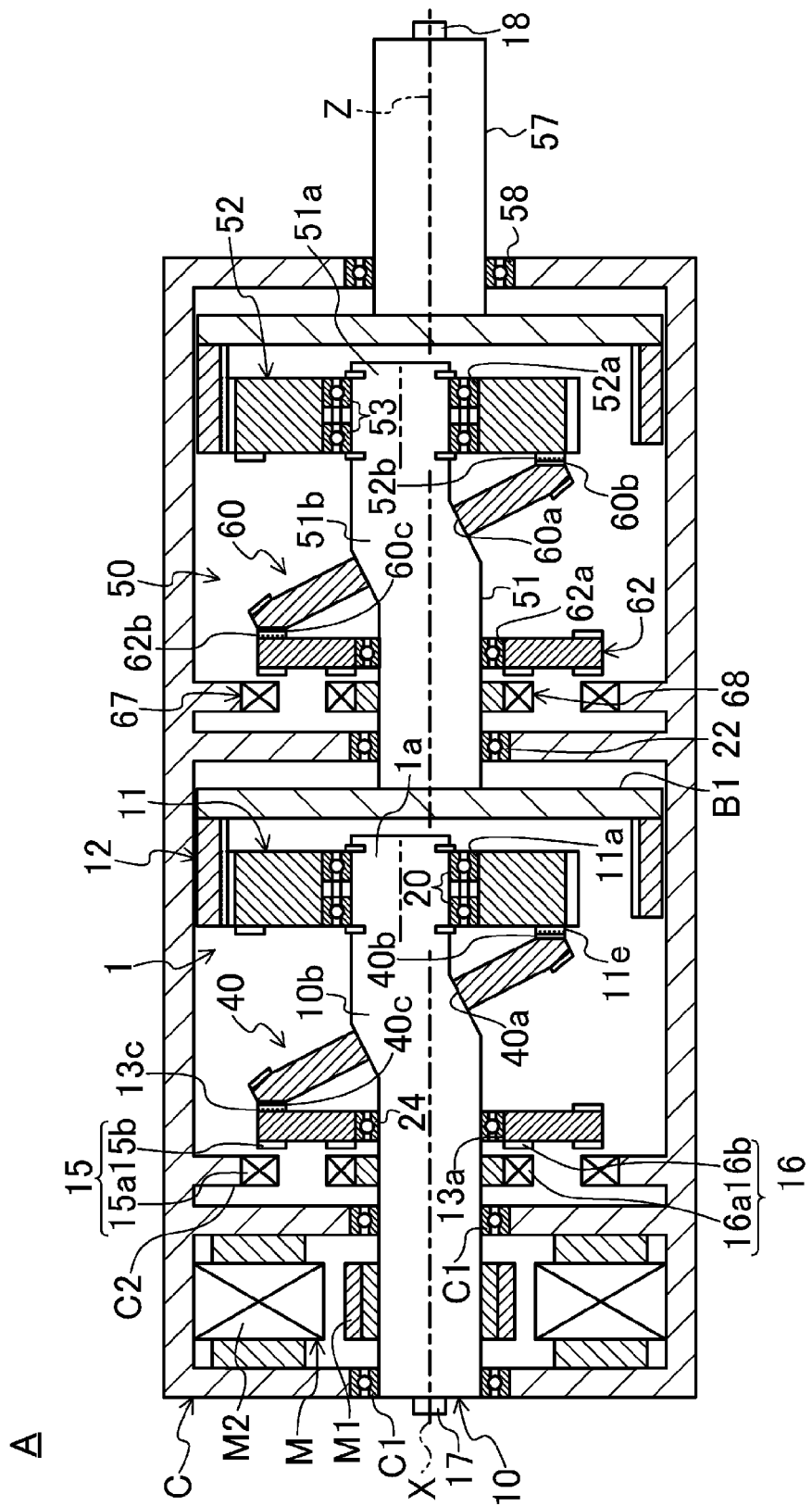
FIG. 16 is a diagram corresponding to FIG. 1 according to a variation of the third embodiment.

As illustrated in a variation in FIG. 16, first and second gear systems 1 and 50 may be placed in series. The first gear system 1 has the above-described structure. The principal structure of the second gear system 50 is identical with that of the first gear system 1. An input shaft 51 of the second gear system 50 serves as an output shaft of the first gear system 1. The input shaft 51 of the second gear system 50 includes an eccentric part 51a and an inclined shaft part 51b. The eccentric part 51a is inserted into a center hole 52a of an external gear 52. The external gear 52 is supported by the input shaft 51 with bearings 53 interposed therebetween. A plurality of teeth 52b are formed on a side surface of the external gear 52.

An output shaft 57 is fixed to an internal gear 54. The output shaft 57 is supported by a casing C with a bearing 58 interposed therebetween.

The inclined shaft part 51b is inserted into a center hole 60a of a wobble plate 60. Teeth 60b are formed on a side surface of the wobble plate 60 near the external gear 52, and teeth 60c are formed on a side surface thereof near an anti-rotation plate 62.

The input shaft 51 is inserted into a center hole 62a of the anti-rotation plate 62. Teeth 62b are formed on a side surface of the anti-rotation plate 62. A brake 67 and a clutch system 68 are also provided.

The speed reducing ratio of the first gear system 1 is set at 1/6, and the speed reducing ratio of the second gear system 50 is set at 1/10.

In this variation, the first and second gear systems 1 and 50 are placed in series, thereby selecting one of more speeds. Specifically, when the motor M is rotated in a situation where while the brake 15 of the first gear system 1 is placed in the non-braking state, and the clutch system 16 thereof is placed in the coupling state, the brake 67 of the second gear system 50 is placed in the non-braking state, and the clutch system 68 thereof is placed in the coupling state, the output shaft 57 rotates at a speed equal to the rotational speed of the motor M.

When the motor M is rotated in a situation where while the brake 15 of the first gear system 1 is placed in the braking state, and the clutch system 16 thereof is placed in the non-coupling state, the brake 67 of the second gear system 50 is placed in the non-braking state, and the clutch system 68 thereof is placed in the coupling state, the speed reducing ratio of the entire driver A is 1/6.

When the motor M is rotated in a situation where while the brake 15 of the first gear system 1 is placed in the non-braking state, and the clutch system 16 thereof is placed in the coupling state, the brake 67 of the second gear system 50 is placed in the braking state, and the clutch system 68 thereof is placed in the non-coupling state, the speed reducing ratio of the entire driver A is 1/10.

When the motor M is rotated in a situation where while the brake 15 of the first gear system 1 is placed in the braking state, and the clutch system 16 thereof is placed in the non-coupling state, the brake 67 of the second gear system 50 is placed in the braking state, and the clutch system 68 thereof is placed in the non-coupling state, the speed reducing ratio of the entire driver A is 1/60.

The speed reducing ratio of the first gear system 1 may be 1/6, and the speed reducing ratio of the second gear system 50 may be 1/8. Alternatively, the speed reducing ratio of the first gear system 1 may be 1/12, and the speed reducing ratio of the second gear system 50 may be 1/16.

In the third embodiment, a balancer plate may be provided similarly to the second embodiment.

Figure 17:
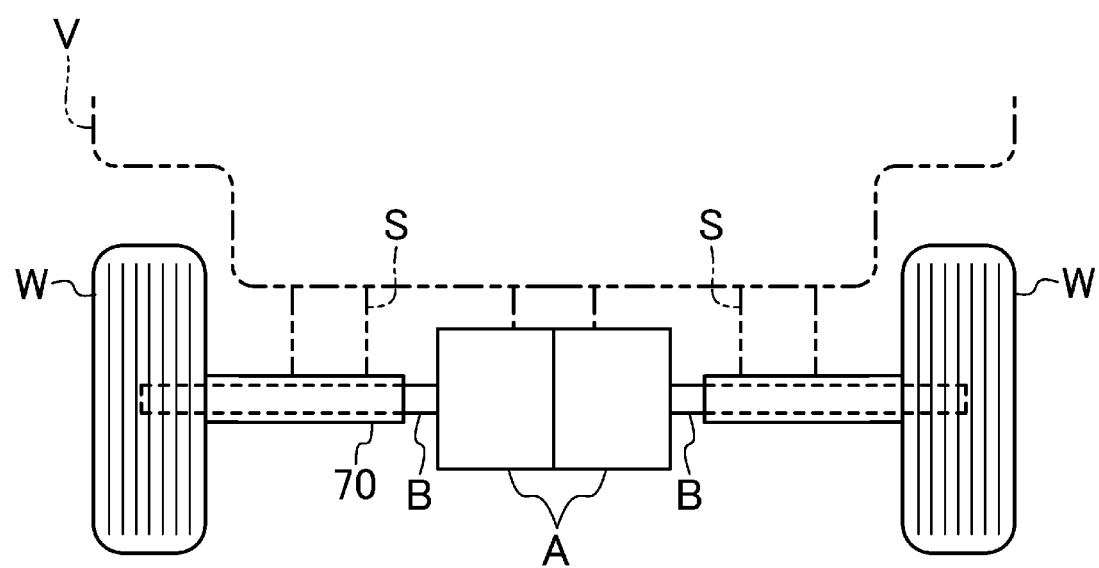
FIG. 17 is a diagram illustrating other use conditions of the driver.

In each of the first through third embodiments, a case where the driver A is used as an in-wheel motor was described; however, the driver A is not limited to the in-wheel motor, and for example, as illustrated in FIG. 17, part of an axle shaft 70 of an already-existing vehicle may be modified, and the axle shaft 70 may include the driver A.

Figure 18:
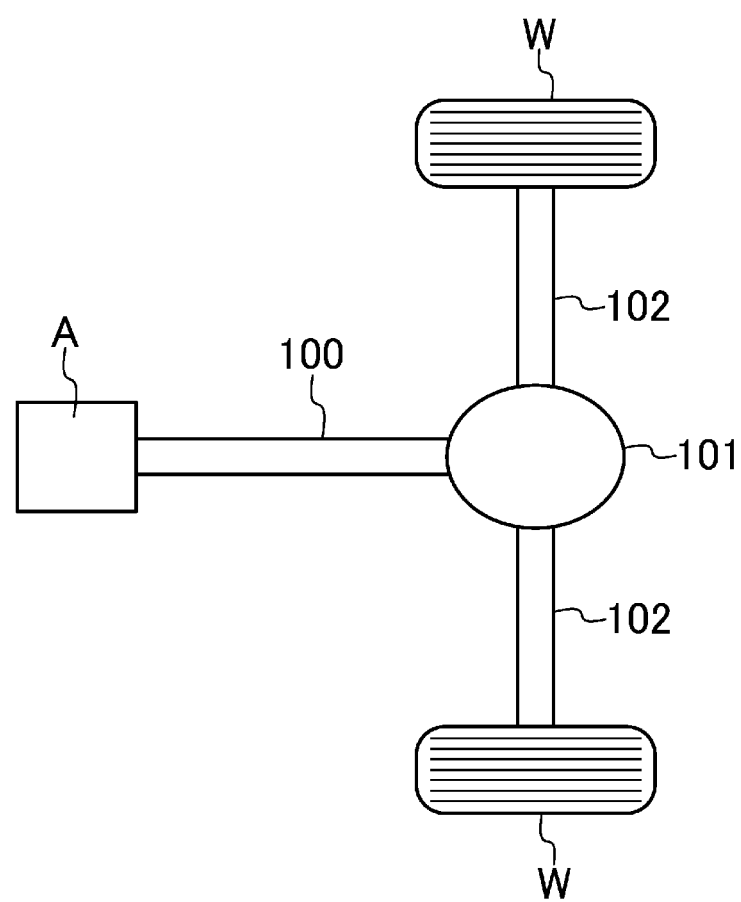
FIG. 18 is a diagram illustrating still other use conditions of the driver.

Alternatively, the driver A may be provided to drive a propeller shaft 100 as illustrated in FIG. 18. In this case, power of the driver A is transferred through the propeller shaft 100, a differential gear 101, and drive shafts 102, 102 to wheels W, W. With this structure, after an already-existing engine of an automobile has been removed, the driver A may be placed at the location at which the engine was located, thereby easily converting the automobile into an electric vehicle.

Fourth Embodiment

Figure 19:
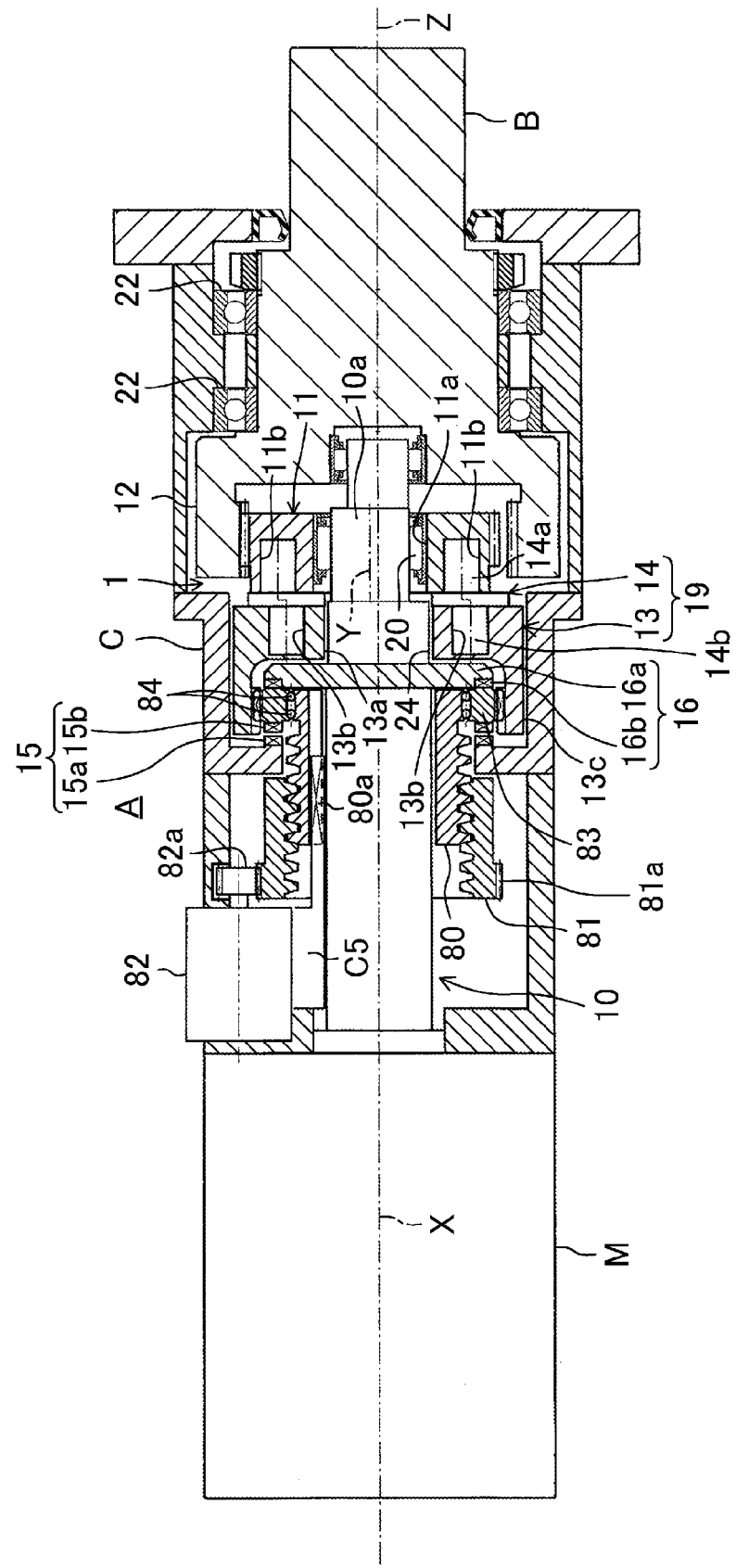
FIG. 19 is a diagram corresponding to FIG. 1 according to a fourth embodiment, where a brake 15 is placed in a non-braking state.
Figure 20:
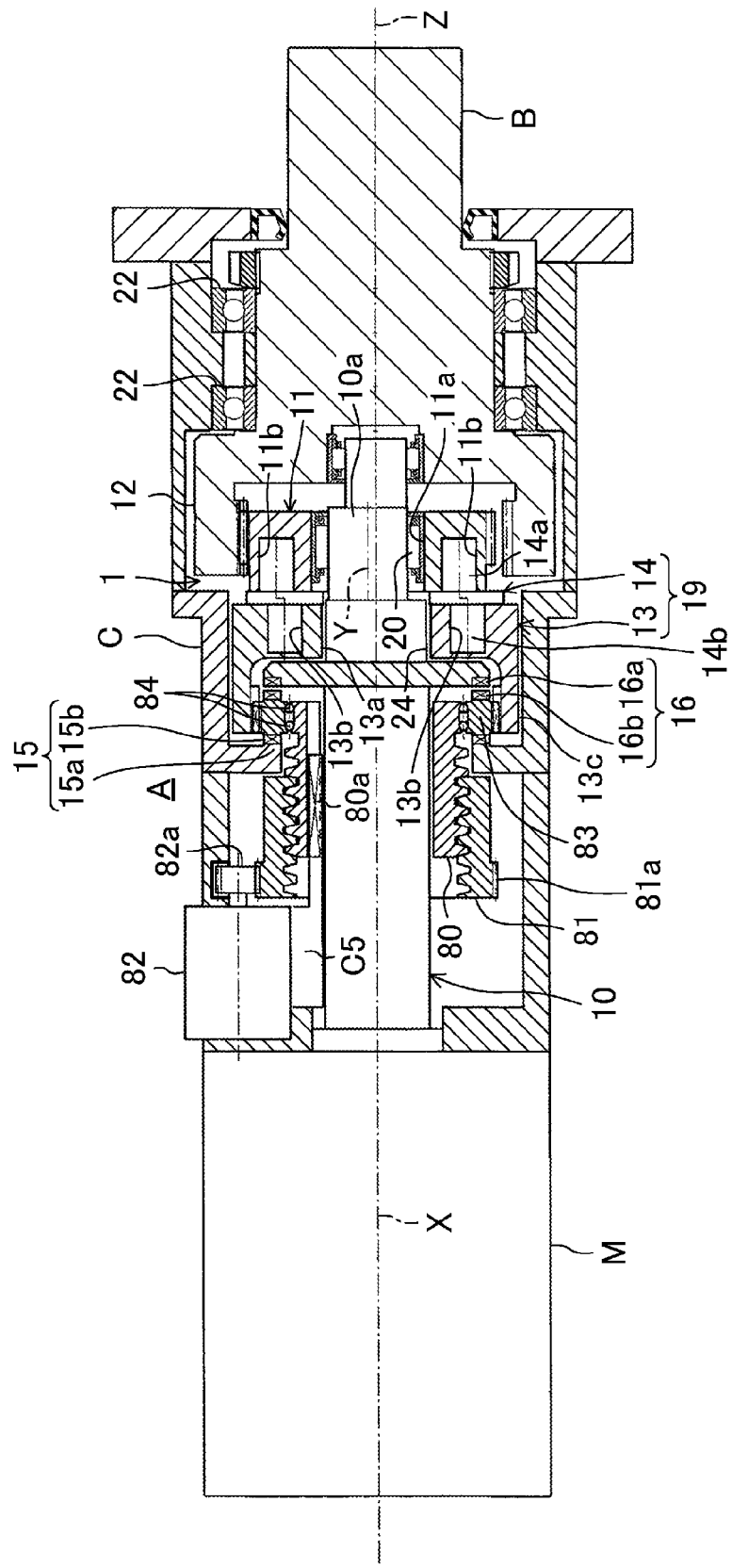
FIG. 20 is a diagram corresponding to FIG. 1 according to the fourth embodiment, where the brake 15 is placed in a braking state.

FIGS. 19 and 20 are cross-sectional views of a driver A including a gear system 1 according to a fourth embodiment of the present disclosure. In the principal structure of the gear system 1 of the fourth embodiment, the crankpins 14 of the first embodiment are used. In the fourth embodiment, a brake 15 and a clutch system 16 are operated using a screw mechanism. The same reference characters are used to represent the same components as those in the first embodiment, and the explanation thereof will be omitted. The difference between the first and fourth embodiments will be described hereinafter in detail.

In the fourth embodiment, the gear system 1 includes a ring-shaped male thread member 80 having an outer circumferential surface including a male thread portion, a ring-shaped female thread member 81 having a female thread portion threadedly engaging with the male thread member 80, and a screw drive motor 82 configured to drive the female thread member 81.

A portion of an input shaft 10 closer to a motor M than a clutch system body 16a is inserted into the male thread member 80. The male thread member 80 can move relative to the input shaft 10 along the center line X of the input shaft 10.

A facing fixing member 83 is placed around a portion of the male thread member 80 near the clutch system body 16a. The facing fixing member 83 is ring-shaped to surround the male thread member 80, and many teeth are formed on the outer circumferential surface of the facing fixing member 83, and are arranged all around the facing fixing member 83. The teeth of the facing fixing member 83 mesh with teeth similarly formed on an inner circumferential surface of a ring-shaped portion 13c of an anti-rotation plate 13 extending from an outer portion thereof to the motor M. When the teeth of the facing fixing member 83 mesh with the teeth of the anti-rotation plate 13, the facing fixing member 83 and the anti-rotation plate 13 rotate together.

A clutch facing 16b is fixed to a side surface of the facing fixing member 83 near the clutch system body 16a, and a brake facing 15b is fixed to a side surface of the facing fixing member 83 near a brake body 15a.

Roller members 84 are provided between the inner circumferential surface of the facing fixing member 83 and the outer circumferential surface of the male thread member 80 to roll therebetween, and the roller members 84 allows the facing fixing member 83 to rotate relative to the male thread member 80 about the center line X. The facing fixing member 83 and the male thread member 80 engage with the roller members 84 to prevent the members 83 and 80 from moving relative to each other along the center line X.

The male thread member 80 has an inner circumferential surface including a rail engaging portion 80a engaging with a rail C5 fixed to a casing C. The rail C5 extends in parallel with the center line X. Engagement between the rail engaging portion 80a and the rail C5 prevents rotation of the male thread member 80 about the center line X, and the male thread member 80 can move only along the center line X.

The female thread member 81 is supported by the male thread member 80, and can rotate about the center line X.

Many teeth 81a are formed on a portion of the outer circumferential surface of the female thread member 81 near the motor M, and are arranged all around the female thread member 81.

The screw drive motor 82 is fixed to the casing C. An output shaft of the screw drive motor 82 is placed in parallel with the center line X of the input shaft 10. A pinion gear 82a is fixed to the output shaft of the screw drive motor 82. The pinion gear 82a is disposed to mesh with the teeth 81a of the female thread member 81. For example, the direction of rotation of the screw drive motor 82, the timing at which the rotation starts, and the rotational speed of the screw drive motor 82 are controlled by the controller 2.

In the fourth embodiment, when the screw drive motor 82 is rotated, the female thread member 81 rotates, and the male thread member 80 moves on the rail C5 along the center line X in a direction corresponding to the direction of the rotation of the female thread member 81. As illustrated in FIG. 19, when the screw drive motor 82 is rotated such that the male thread member 80 moves to the right, the brake 15 is placed in a non-braking state, and the clutch system 16 is placed in a coupling state. This allows the anti-rotation plate 13 to be fixed to the input shaft 10.

In contrast, as illustrated in FIG. 20, when the screw drive motor 82 is rotated such that the male thread member 80 moves to the left, the brake 15 is placed in a braking state, and the clutch system 16 is placed in a non-coupling state. This allows the anti-rotation plate 13 to be unrestrained by the input shaft 10.

According to the fourth embodiment, operational advantages similar to those of the first embodiment can be obtained.

When lubricating oil is injected into the casing C of the gear system 1, the screw drive motor 82 may be provided outside the casing C, and the female thread member 81 may be driven by gears or a belt.

Fifth Embodiment

Figure 21:
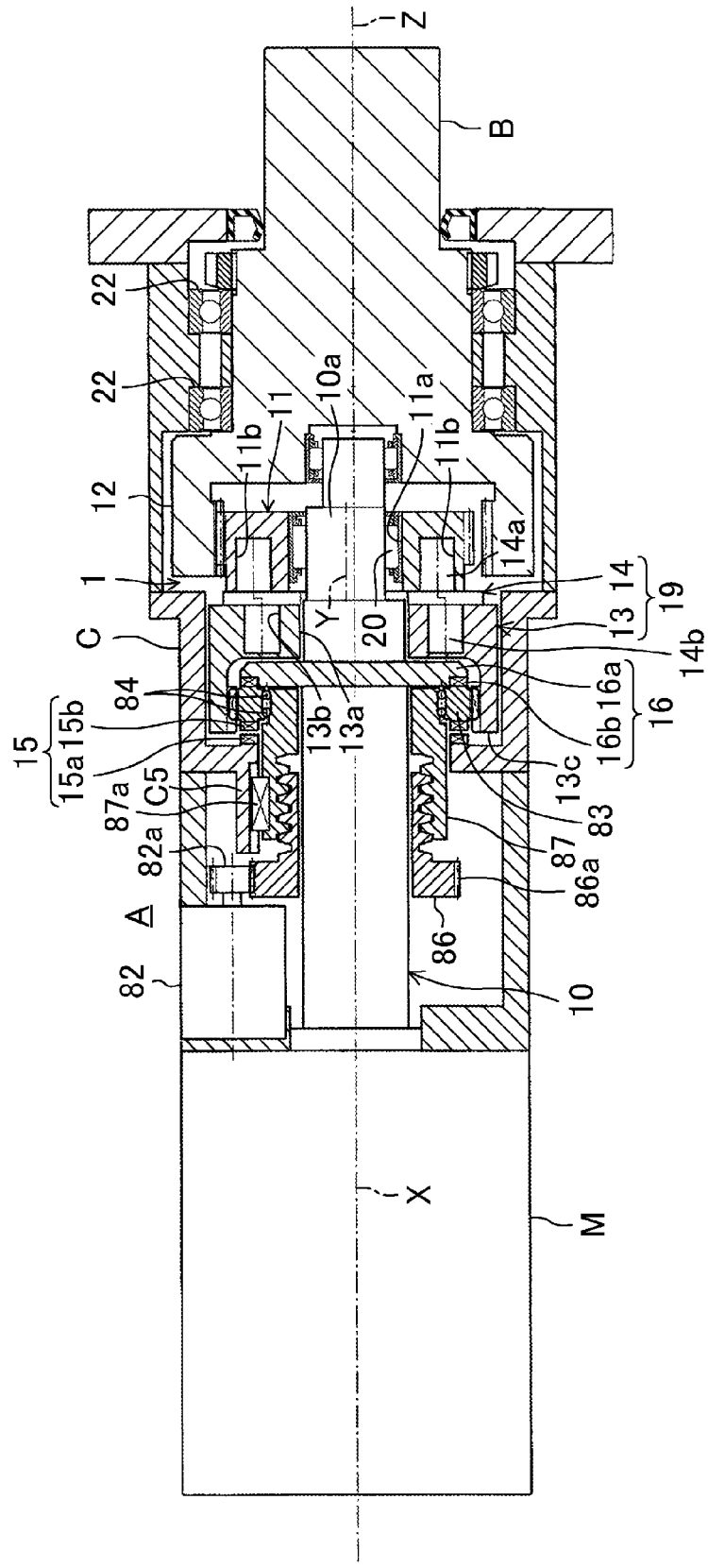
FIG. 21 is a diagram corresponding to FIG. 19 according to a fifth embodiment.
Figure 22:
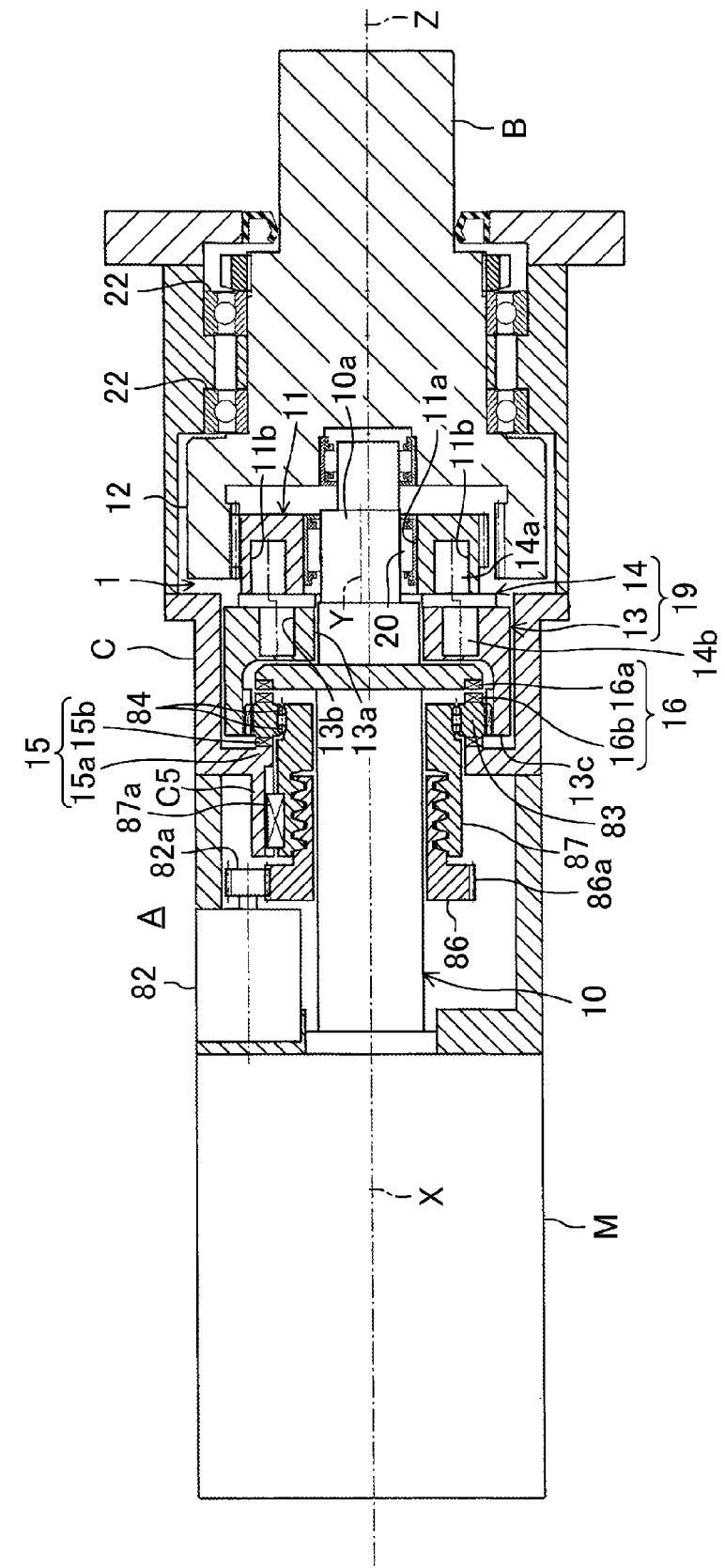
FIG. 22 is a diagram corresponding to FIG. 20 according to the fifth embodiment.

FIGS. 21 and 22 are cross-sectional views of a driver A including a gear system 1 according to a fifth embodiment of the present disclosure. In the principal structure of the gear system 1 of the fifth embodiment, the crankpins 14 of the first embodiment are used. In the fifth embodiment, a brake 15 and a clutch system 16 are operated using a screw mechanism. The same reference characters are used to represent the same components as those in the first embodiment, and the explanation thereof will be omitted. The difference between the first and fifth embodiments will be described hereinafter in detail.

In the fifth embodiment, the gear system 1 includes a ring-shaped male thread member 86 having an outer circumferential surface including a male thread portion, a ring-shaped female thread member 87 having a female thread portion threadedly engaging with the male thread member 86, and a screw drive motor 82 configured to drive the male thread member 86.

A portion of an input shaft 10 closer to a motor M than a clutch system body 16a is inserted into the male thread member 86. The male thread member 86 can rotate relative to the input shaft 10 about the center line X of the input shaft 10. Many teeth 86a are formed on a portion of the outer circumferential surface of the male thread member 86 near the motor M, and are arranged all around the male thread member 86.

A facing fixing member 83 similar to that of the fourth embodiment is placed around a portion of the female thread member 87 near the clutch system body 16a.

The female thread member 87 has an outer circumferential surface including a rail engaging portion 87a engaging with a rail C5 fixed to a casing C. The rail C5 extends in parallel with the center line X. Engagement between the rail engaging portion 87a and the rail C5 prevents rotation of the female thread member 87 about the center line X, and the female thread member 87 can move only along the center line X.

The male thread member 86 is supported by the female thread member 87, and can rotate about the center line X.

A pinion gear 82a of the screw drive motor 82 is disposed to mesh with the teeth 86a of the male thread member 86.

In the fifth embodiment, when the screw drive motor 82 is rotated, the male thread member 86 rotates, and the female thread member 87 moves on the rail C5 along the center line X in a direction corresponding to the direction of the rotation of the male thread member 86. As illustrated in FIG. 21, when the screw drive motor 82 is rotated such that the female thread member 87 moves to the right, the brake 15 is placed in a non-braking state, and the clutch system 16 is placed in a coupling state. This allows the anti-rotation plate 13 to be fixed to the input shaft 10.

In contrast, as illustrated in FIG. 22, when the screw drive motor 82 is rotated such that the female thread member 87 moves to the left, the brake 15 is placed in a braking state, and the clutch system 16 is placed in a non-coupling state. This allows the anti-rotation plate 13 to be unrestrained by the input shaft 10.

According to the fifth embodiment, operational advantages similar to those of the first embodiment can be obtained.

Sixth Embodiment

Figure 23:
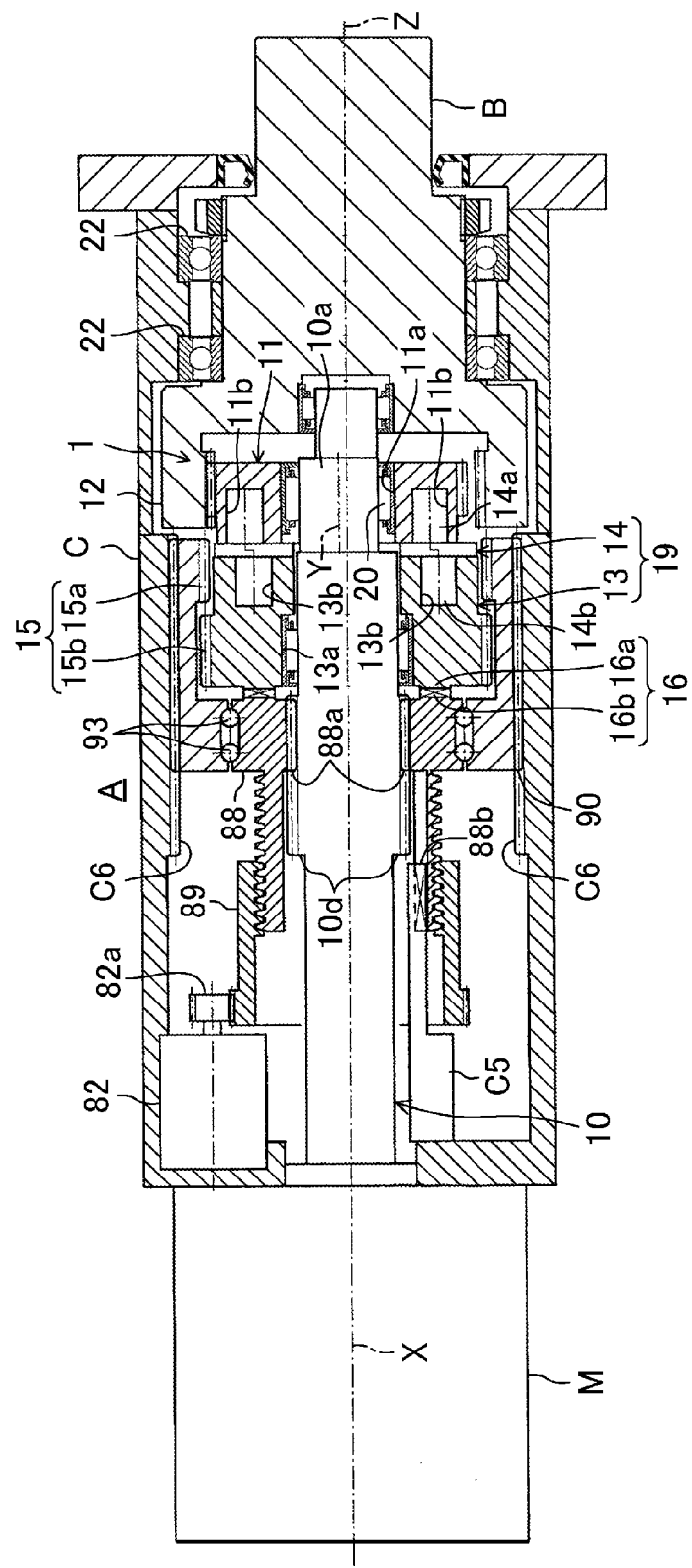
FIG. 23 is a diagram corresponding to FIG. 19 according to a sixth embodiment.
Figure 24:
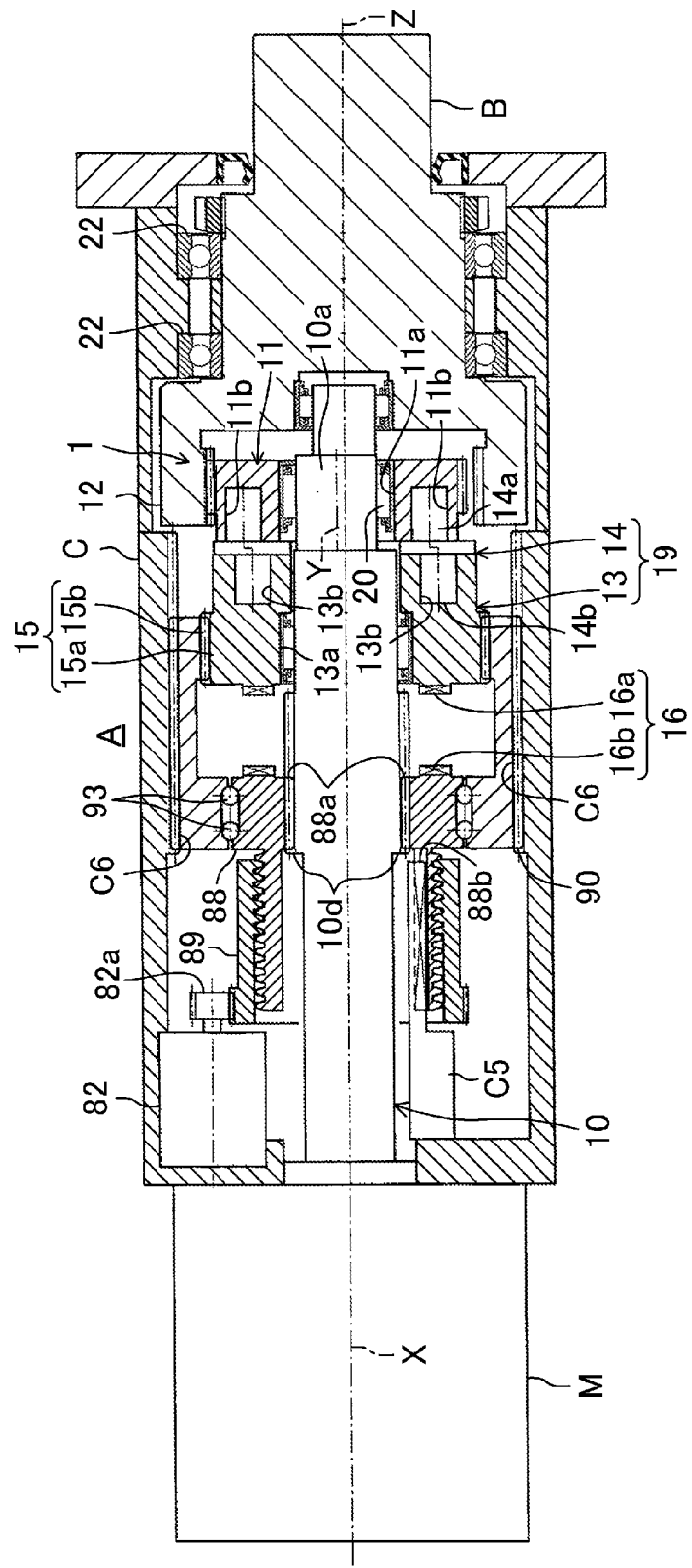
FIG. 24 is a diagram corresponding to FIG. 20 according to the sixth embodiment.

FIGS. 23 and 24 are cross-sectional views of a driver A including a gear system 1 according to a sixth embodiment of the present disclosure. In the principal structure of the gear system 1 of the sixth embodiment, the crankpins 14 of the first embodiment are used. In the sixth embodiment, a brake 15 and a clutch system 16 are operated using a screw mechanism. The same reference characters are used to represent the same components as those in the first embodiment, and the explanation thereof will be omitted. The difference between the first and sixth embodiments will be described hereinafter in detail.

In the sixth embodiment, the gear system 1 includes a ring-shaped male thread member 88 having an outer circumferential surface including a male thread portion, a ring-shaped female thread member 89 having a female thread portion threadedly engaging with the male thread member 88, and a screw drive motor 82 configured to drive the female thread member 89.

The configurations of the male thread member 88, the female thread member 89, and the screw drive motor 82 are similar to those of the male thread member 80, the female thread member 81, and the screw drive motor 82 of the fourth embodiment.

The male thread member 88 has an inner circumferential surface including a rail engaging portion 88a engaging with a rail 10d formed on the outer circumferential surface of the input shaft 10 to extend along the center line X. This prevents rotation of the male thread member 88 about the center line X, and the male thread member 88 can move only along the center line X.

A brake body 15a is ring-shaped to surround an anti-rotation plate 13. Many teeth are formed on the inner circumferential surface of the brake body 15a, and are arranged along the entire inside perimeter of the brake body 15a. On the other hand, teeth 15b are formed on the outer circumferential surface of the anti-rotation plate 13 to mesh with the teeth of the brake body 15a. Movement of the teeth of the brake body 15a along the center line X enables selection of one of a state where the teeth of the brake body 15a mesh with the teeth 15b of the anti-rotation plate 13 (a braking state illustrated in FIG. 24), and a state where the teeth of the brake body 15a are disengaged from the teeth 15b (a non-braking state illustrated in FIG. 23). When the teeth of the brake body 15a mesh with the teeth 15b, the brake body 15a and the anti-rotation plate 13 rotate together.

The brake body 15a has an outer circumferential surface including a rail engaging portion 90 engaging with a rail C6 formed on a casing C to extend along the center line X. Engagement between the rail engaging portion 90 and the rail C6 prevents rotation of the brake body 15a about the center line X, and the brake body 15a can move along the center line X.

Roller members 93 similar to the roller members 84 of the fourth embodiment are provided between the outer circumferential surface of the male thread member 88 and the inner circumferential surface of the brake body 15a. The male thread member 88 and the brake body 15a engage with the roller members 93 to prevent the male thread member 88 and the brake body 15a from moving relative to each other along the center line X.

The clutch system body 16a is fixed to a side surface of the anti-rotation plate 13. The clutch facing 16b is fixed to a surface of the male thread member 88 opposed to the side surface of the anti-rotation plate 13.

In the sixth embodiment, when the screw drive motor 82 is rotated, the female thread member 89 rotates, and the male thread member 88 moves on the rail 10d along the center line X in a direction corresponding to the direction of the rotation of the female thread member 89. As illustrated in FIG. 23, when the screw drive motor 82 is rotated such that the male thread member 88 moves to the right, the teeth of the brake body 15a are apart from the teeth 15b of the anti-rotation plate 13 along the center line X; thus, the brake 15 is placed in a non-braking state, and the clutch system 16 is placed in a coupling state. This allows the anti-rotation plate 13 to be fixed to the input shaft 10.

In contrast, as illustrated in FIG. 24, when the screw drive motor 82 is rotated such that the male thread member 88 moves to the left, the teeth of the brake body 15a mesh with the teeth 15b of the anti-rotation plate 13; thus, the brake 15 is placed in a braking state, and the clutch system 16 is placed in a non-coupling state. This allows the anti-rotation plate 13 to be unrestrained by the input shaft 10.

According to the sixth embodiment, operational advantages similar to those of the first embodiment can be obtained.

Seventh Embodiment

Figure 25:
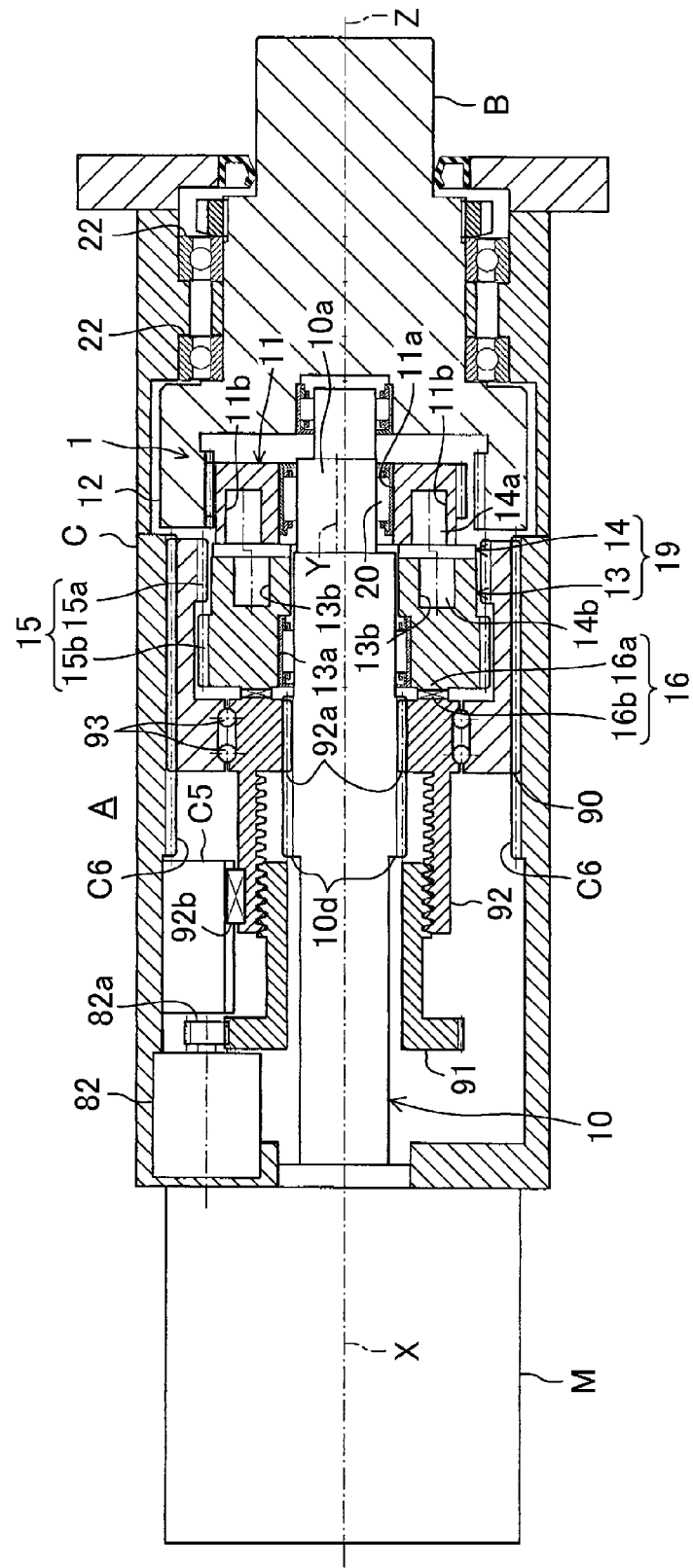
FIG. 25 is a diagram corresponding to FIG. 19 according to a seventh embodiment.
Figure 26:
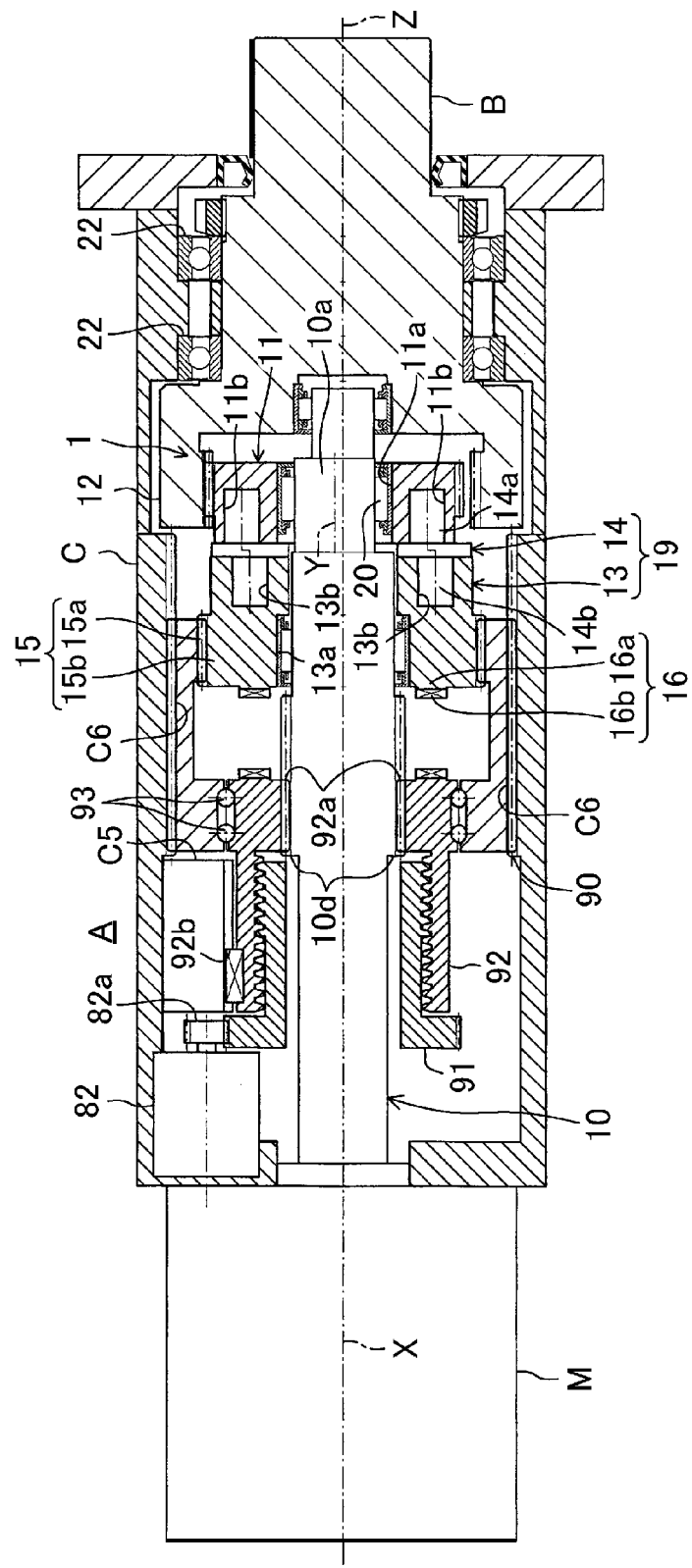
FIG. 26 is a diagram corresponding to FIG. 20 according to the seventh embodiment.

FIGS. 25 and 26 are cross-sectional views of a driver A including a gear system 1 according to a seventh embodiment of the present disclosure. In the principal structure of the gear system 1 of the seventh embodiment, the crankpins 14 of the first embodiment are used. In the seventh embodiment, a brake 15 and a clutch system 16 are operated using a screw mechanism. The same reference characters are used to represent the same components as those in the first embodiment, and the explanation thereof will be omitted. The difference between the first and seventh embodiments will be described hereinafter in detail.

In the seventh embodiment, the gear system 1 includes a ring-shaped male thread member 91 having an outer circumferential surface including a male thread portion, a ring-shaped female thread member 92 having a female thread portion threadedly engaging with the male thread member 91, and a screw drive motor 82 configured to drive the male thread member 91.

The configurations of the male thread member 91, the female thread member 92, and the screw drive motor 82 are similar to those of the male thread member 86, the female thread member 87, and the screw drive motor 82 of the fifth embodiment.

The configurations of the brake 15 and the clutch system 16 of the seventh embodiment are similar to those of the sixth embodiment.

The female thread member 92 has an inner circumferential surface including a rail engaging portion 92a engaging with a rail 10d formed on the outer circumferential surface of the input shaft 10 to extend along the center line X. This prevents rotation of the female thread member 92 about the center line X, and the female thread member 92 can move only along the center line X.

Furthermore, the female thread member 92 has an outer circumferential surface including a rail engaging portion 92b engaging with a rail C5 fixed to a casing C. Engagement between the rail engaging portion 92b and the rail C5 prevents rotation of the female thread member 92 about the center line X, and the female thread member 92 can move only along the center line X.

In the seventh embodiment, when the screw drive motor 82 is rotated, the male thread member 91 rotates, and the female thread member 92 moves on the rail C5 along the center line X in a direction corresponding to the direction of the rotation of the male thread member 91. As illustrated in FIG. 25, when the screw drive motor 82 is rotated such that the female thread member 92 moves to the right, the teeth of the brake body 15a are apart from the teeth 15b of the anti-rotation plate 13 along the center line X; thus, the brake 15 is placed in a non-braking state, and the clutch system 16 is placed in a coupling state. This allows the anti-rotation plate 13 to be fixed to the input shaft 10.

In contrast, as illustrated in FIG. 26, when the screw drive motor 82 is rotated such that the female thread member 92 moves to the left, the teeth of the brake body 15a mesh with the teeth 15b of the anti-rotation plate 13; thus, the brake 15 is placed in a braking state, and the clutch system 16 is placed in a non-coupling state. This allows the anti-rotation plate 13 to be unrestrained by the input shaft 10.

According to the seventh embodiment, operational advantages similar to those of the first embodiment can be obtained.

Eighth Embodiment

Figure 27:
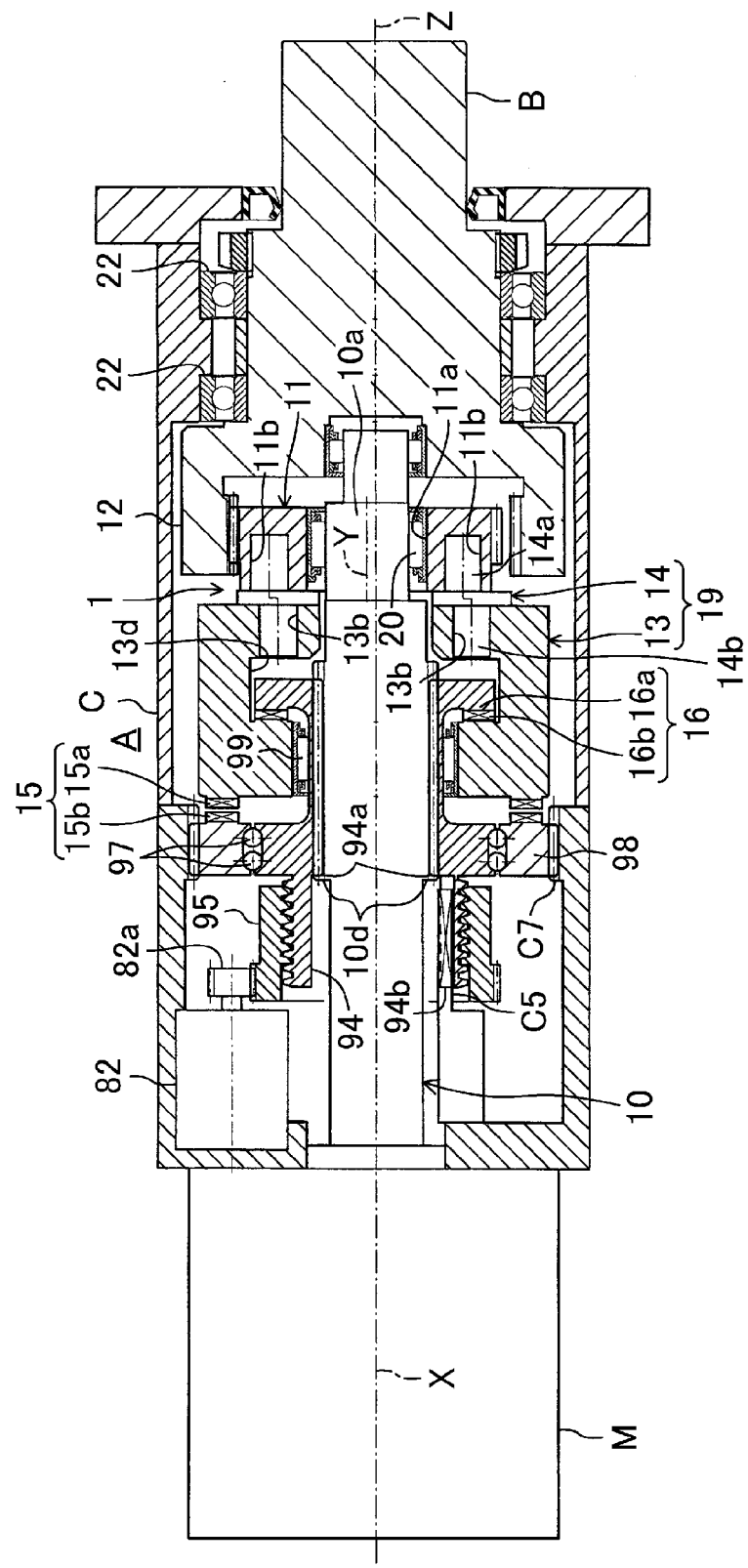
FIG. 27 is a diagram corresponding to FIG. 19 according to an eighth embodiment.
Figure 28:
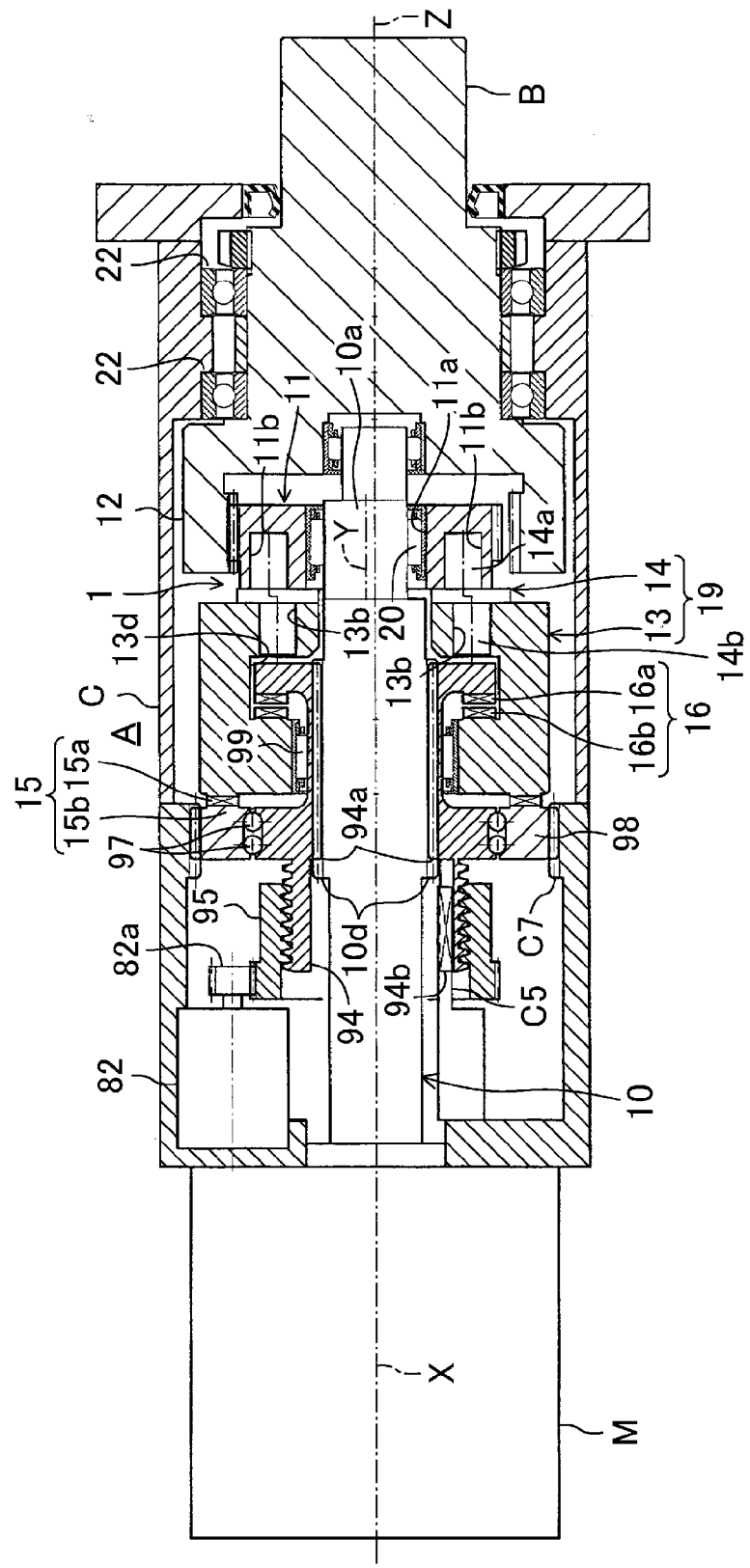
FIG. 28 is a diagram corresponding to FIG. 20 according to the eighth embodiment.

FIGS. 27 and 28 are cross-sectional views of a driver A including a gear system 1 according to an eighth embodiment of the present disclosure. In the principal structure of the gear system 1 of the eighth embodiment, the crankpins 14 of the first embodiment are used. In the eighth embodiment, a brake 15 and a clutch system 16 are operated using a screw mechanism. The same reference characters are used to represent the same components as those in the first embodiment, and the explanation thereof will be omitted. The difference between the first and eighth embodiments will be described hereinafter in detail.

In the eighth embodiment, the gear system 1 includes a ring-shaped male thread member 94 having an outer circumferential surface including a male thread portion, a ring-shaped female thread member 95 having a female thread portion threadedly engaging with the male thread member 94, and a screw drive motor 82 configured to drive the female thread member 95.

The male thread member 94 extends along the center line X, and a right end portion of the male thread member 94 is placed in a ring-shaped recess 13d formed in the inner circumferential surface of the anti-rotation plate 13, and forms a clutch system body 16a. A clutch facing 16b is fixed to a portion of the inner wall of the ring-shaped recess 13d of the anti-rotation plate 13 opposed to the clutch system body 16a. A bearing 99 is disposed between the outer circumferential surface of the male thread member 94 and the anti-rotation plate 13.

A facing fixing member 98 is placed around the male thread member 94. The facing fixing member 98 is ring-shaped to surround the male thread member 94, and many teeth are formed on the outer circumferential surface of the facing fixing member 98, and are arranged all around the facing fixing member 98. The teeth of the facing fixing member 98 are configured to mesh with teeth C7 formed on a casing C. When the teeth of the facing fixing member 98 mesh with the teeth C7 of the casing C, this prevents rotation of the facing fixing member 98.

A brake facing 15b is fixed to a side surface of the facing fixing member 98 near a brake body 15a.

Roller members 97 are provided between the inner circumferential surface of the facing fixing member 98 and the outer circumferential surface of the male thread member 94 to roll therebetween, and the roller members 97 allow the facing fixing member 98 to rotate relative to the male thread member 94 about the center line X.

The male thread member 94 has an inner circumferential surface including a rail engaging portion 94a engaging with a rail 10d formed on the outer circumferential surface of the input shaft 10 to extend along the center line X.

Furthermore, the male thread member 94 has an inner circumferential surface including a rail engaging portion 94b engaging with a rail C5 fixed to the casing C.

In the eighth embodiment, when the screw drive motor 82 is rotated, the female thread member 95 rotates, and the male thread member 94 moves on the rail C5 along the center line X in a direction corresponding to the direction of the rotation of the female thread member 95. As illustrated in FIG. 27, when the screw drive motor 82 is rotated such that the male thread member 94 moves to the left, the brake 15 is placed in a non-braking state, and the clutch system 16 is placed in a coupling state. This allows the anti-rotation plate 13 to be fixed to the input shaft 10.

In contrast, as illustrated in FIG. 28, when the screw drive motor 82 is rotated such that the male thread member 94 moves to the left, the brake 15 is placed in a braking state, and the clutch system 16 is placed in a non-coupling state. This allows the anti-rotation plate 13 to be unrestrained by the input shaft 10.

According to the eighth embodiment, operational advantages similar to those of the first embodiment can be obtained.

Ninth Embodiment

Figure 29:
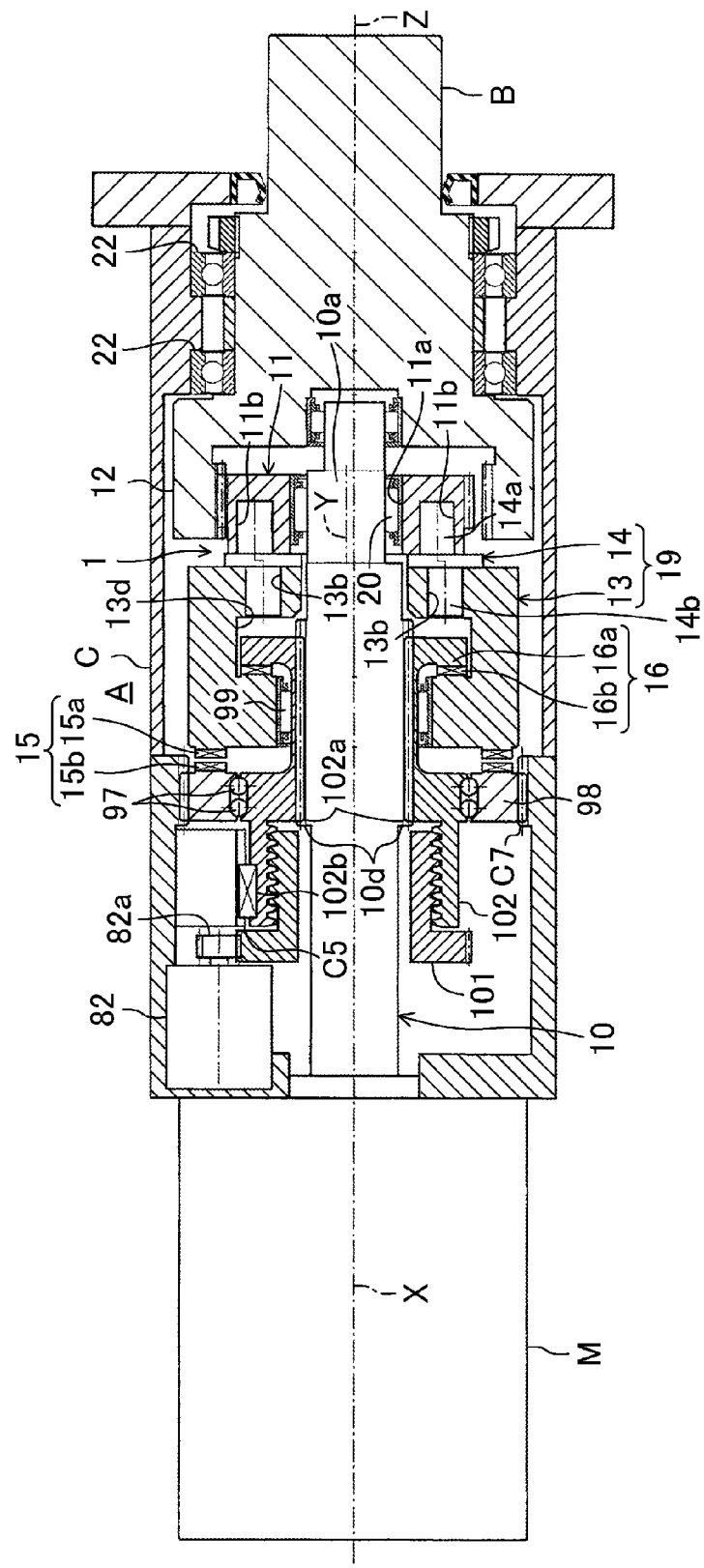
FIG. 29 is a diagram corresponding to FIG. 19 according to a ninth embodiment.
Figure 30:
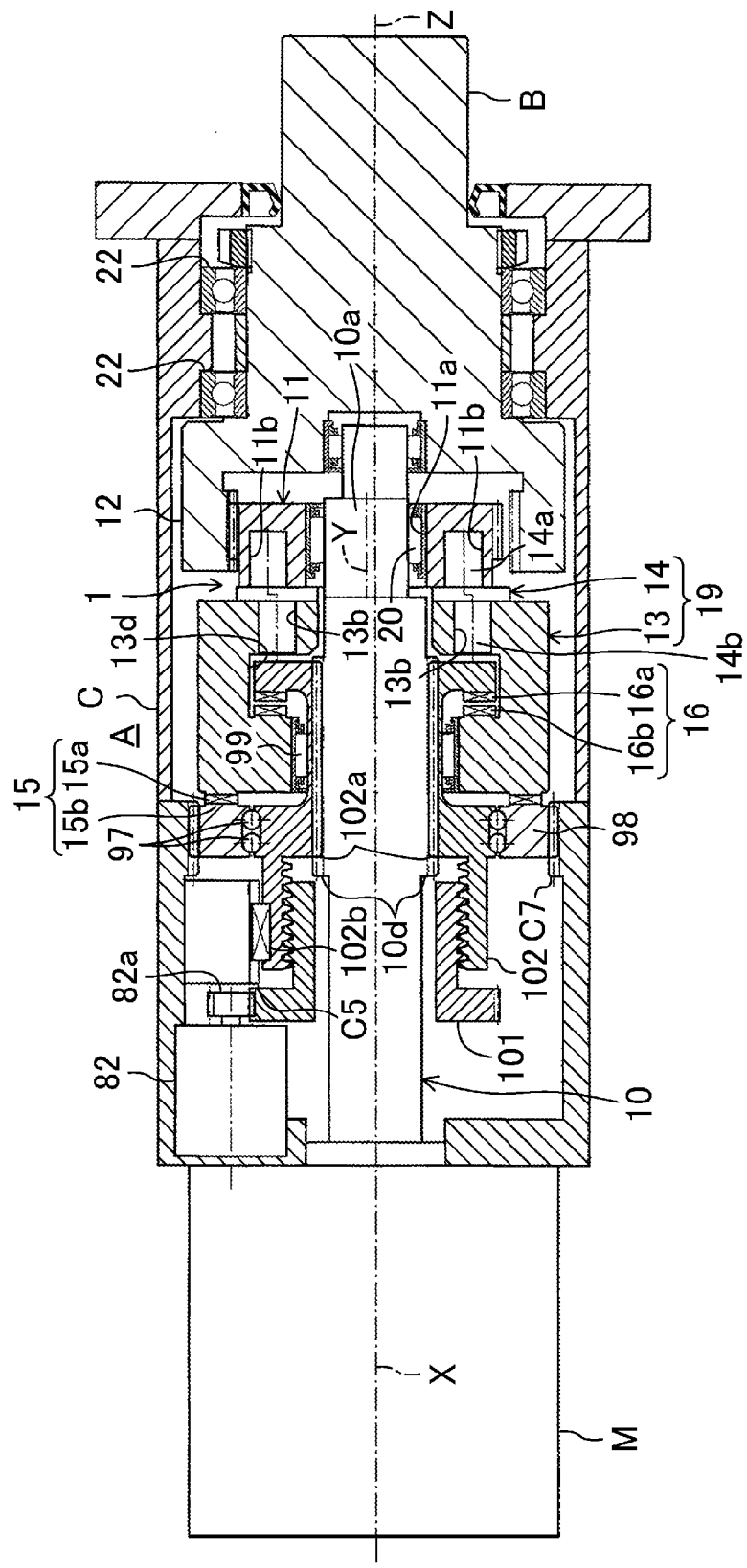
FIG. 30 is a diagram corresponding to FIG. 20 according to the ninth embodiment.

FIGS. 29 and 30 are cross-sectional views of a driver A including a gear system 1 according to a ninth embodiment of the present disclosure. In the principal structure of the gear system 1 of the ninth embodiment, the crankpins 14 of the first embodiment are used. In the ninth embodiment, a brake 15 and a clutch system 16 are operated using a screw mechanism. The same reference characters are used to represent the same components as those in the first embodiment, and the explanation thereof will be omitted. The difference between the first and ninth embodiments will be described hereinafter in detail.

In the ninth embodiment, the gear system 1 includes a ring-shaped male thread member 101 having an outer circumferential surface including a male thread portion, a ring-shaped female thread member 102 having a female thread portion threadedly engaging with the male thread member 101, and a screw drive motor 82 configured to drive the male thread member 101.

The configurations of the male thread member 101, the female thread member 102, and the screw drive motor 82 are similar to those of the male thread member 86, the female thread member 87, and the screw drive motor 82 of the fifth embodiment.

The configurations of the brake 15 and the clutch system 16 of the ninth embodiment are similar to those of the eighth embodiment.

The female thread member 102 has an inner circumferential surface including a rail engaging portion 102a engaging with a rail 10d formed on the outer circumferential surface of the input shaft 10 to extend along the center line X. This prevents rotation of the female thread member 102 about the center line X, and the female thread member 102 can move only along the center line X.

Furthermore, the female thread member 102 has an outer circumferential surface including a rail engaging portion 102b engaging with a rail C5 fixed to a casing C. Engagement between the rail engaging portion 102b and the rail C5 prevents rotation of the female thread member 102 about the center line X, and the female thread member 102 can move only along the center line X.

In the ninth embodiment, when the screw drive motor 82 is rotated, the male thread member 101 rotates, and the female thread member 102 moves on the rail C5 along the center line X in a direction corresponding to the direction of the rotation of the male thread member 101. As illustrated in FIG. 29, when the screw drive motor 82 is rotated such that the female thread member 102 moves to the left, the brake 15 is placed in a non-braking state, and the clutch system 16 is placed in a coupling state. This allows the anti-rotation plate 13 to be fixed to the input shaft 10.

In contrast, as illustrated in FIG. 30, when the screw drive motor 82 is rotated such that the female thread member 102 moves to the right, the brake 15 is placed in a braking state, and the clutch system 16 is placed in a non-coupling state. This allows the anti-rotation plate 13 to be unrestrained by the input shaft 10.

According to the ninth embodiment, operational advantages similar to those of the first embodiment can be obtained.

Tenth Embodiment

Figure 31:
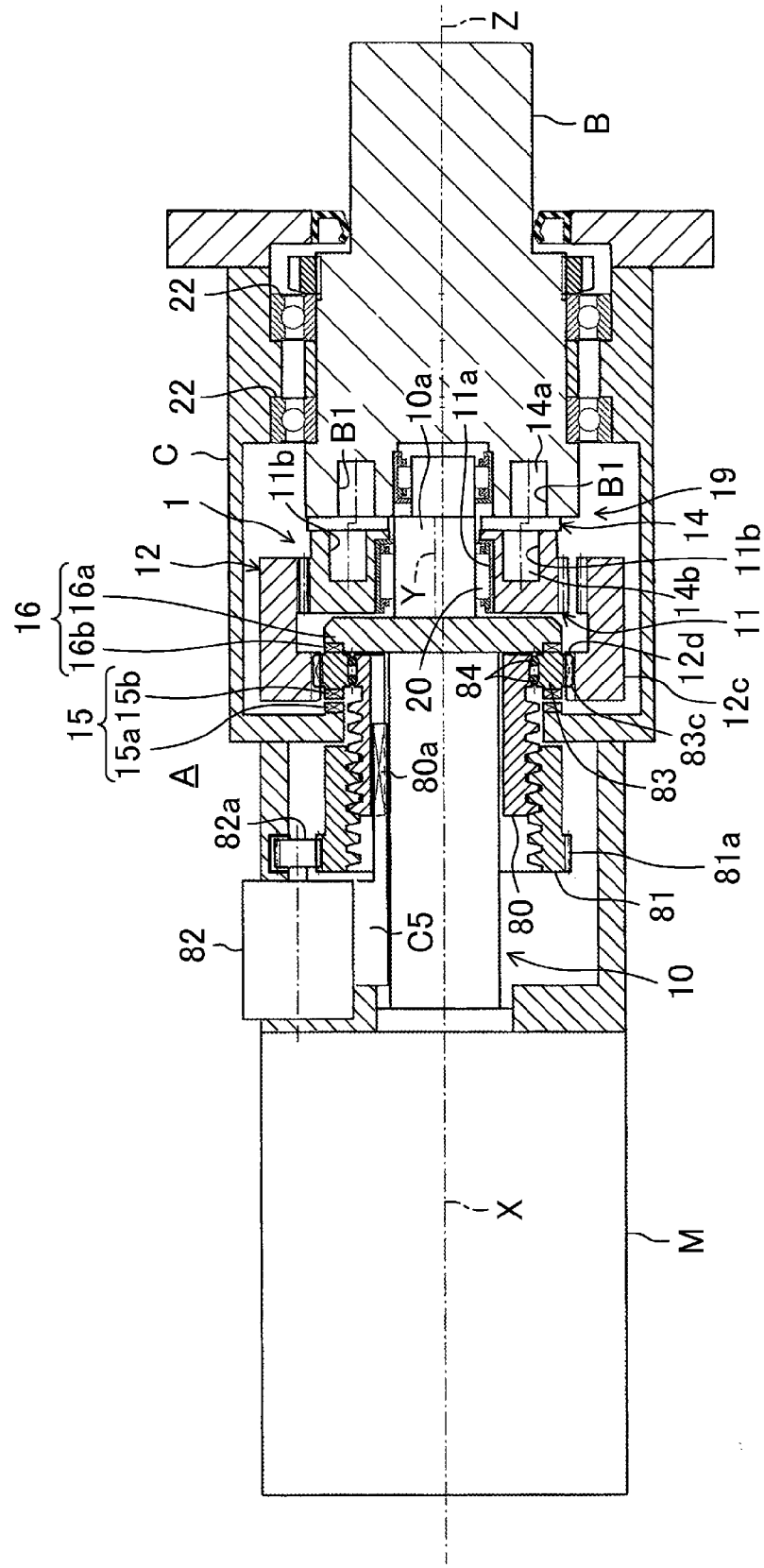
FIG. 31 is a diagram corresponding to FIG. 19 according to a tenth embodiment.
Figure 32:
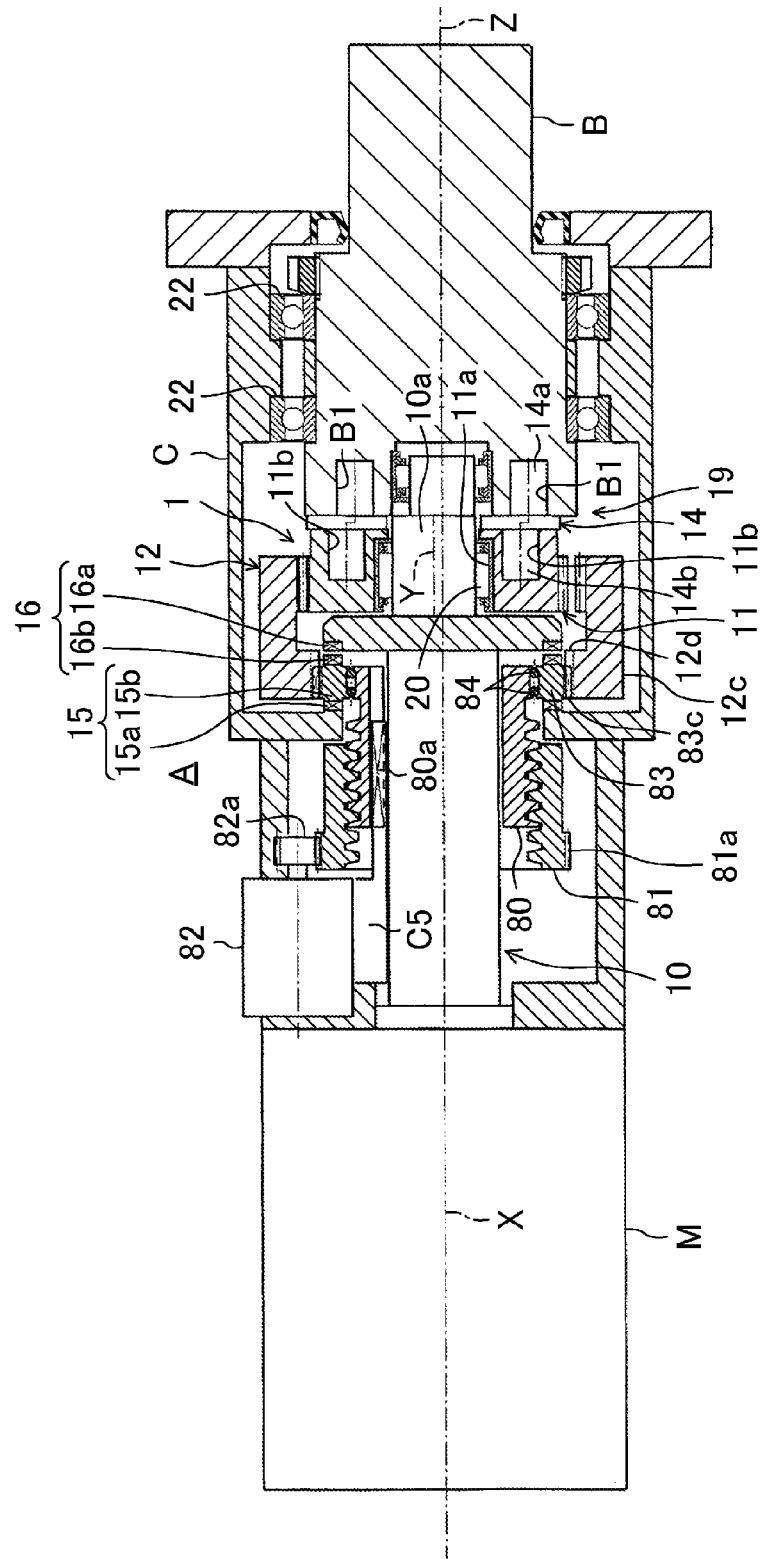
FIG. 32 is a diagram corresponding to FIG. 20 according to the tenth embodiment.

FIGS. 31 and 32 are cross-sectional views of a driver A including a gear system 1 according to a tenth embodiment of the present disclosure. In the principal structure of the gear system 1 of the tenth embodiment, the crankpins 14 of the first embodiment are used. However, unlike the first embodiment, in the tenth embodiment, the crankpins 14 are inserted into an output shaft B, and a brake 15 and a clutch system 16 are operated using a screw mechanism. The same reference characters are used to represent the same components as those in the first embodiment, and the explanation thereof will be omitted. The difference between the first and tenth embodiments will be described hereinafter in detail.

In the tenth embodiment, the brake 15 and the clutch system 16 are operated using a screw mechanism similar to that of the fourth embodiment, and the configurations of the brake 15 and the clutch system 16 are also similar to those of the fourth embodiment.

A one-end shaft portion 14a of each of the crankpins 14 is inserted into a corresponding one of pin insertion holes B1 formed in an end surface of the output shaft B. An other-end shaft portion 14b of the crankpin 14 is inserted into a corresponding one of pin insertion holes 11b of an external gear 11.

An internal gear 12 has a ring-shaped extending portion 12c extending toward a motor M along the entire circumference of the internal gear 12. Many teeth 12d are formed on the inner circumferential surface of the extending portion 12c, and are arranged along the entire inside perimeter thereof. The teeth 12d of the extending portion 12c of the internal gear 12 are configured to mesh with teeth 83c formed on the outer circumferential surface of the facing fixing member 83, and while the teeth 12d mesh with the teeth 83c, the internal gear 12 and the facing fixing member 83 rotate together.

In the tenth embodiment, when the screw drive motor 82 is rotated, the female thread member 81 rotates, and the male thread member 80 moves on the rail C5 along the center line X in a direction corresponding to the direction of the rotation of the female thread member 81. As illustrated in FIG. 31, when the screw drive motor 82 is rotated such that the male thread member 80 moves to the right, the brake 15 is placed in a non-braking state, and the clutch system 16 is placed in a coupling state. This allows the anti-rotation plate 13 to be fixed to the input shaft 10, thereby allowing the internal gear 12 meshing with the facing fixing member 83 to rotate at a speed equal to the rotational speed of the input shaft 10. Thus, the output shaft B is rotated through the external gear 11 meshing with the internal gear 12.

In contrast, as illustrated in FIG. 32, when the screw drive motor 82 is rotated such that the male thread member 80 moves to the left, the brake 15 is placed in a braking state, and the clutch system 16 is placed in a non-coupling state. This allows the facing fixing member 83 to be fixed to a casing C; thus, the internal gear 12 prevents rotation of the external gear 11, and the output shaft B rotates at a rotational speed corresponding to the difference in number between teeth of the internal gear 12 and teeth of the external gear 11.

An anti-rotation section 19 includes the external gear 11, the internal gear 12, the crankpins 14, and the brake 15.

Therefore, according to the tenth embodiment, operational advantages similar to those of the first embodiment can be obtained.

Eleventh Embodiment

Figure 33:
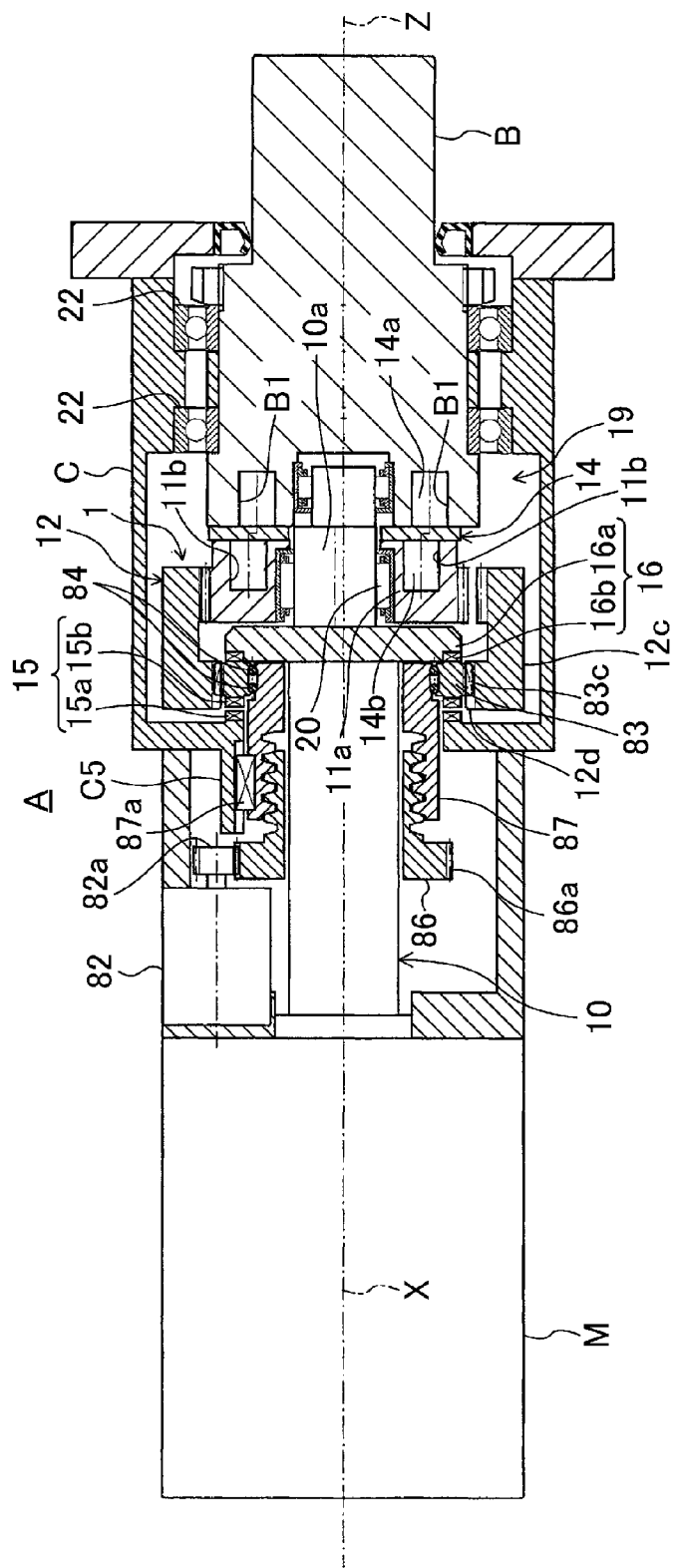
FIG. 33 is a diagram corresponding to FIG. 19 according to an eleventh embodiment.
Figure 34:
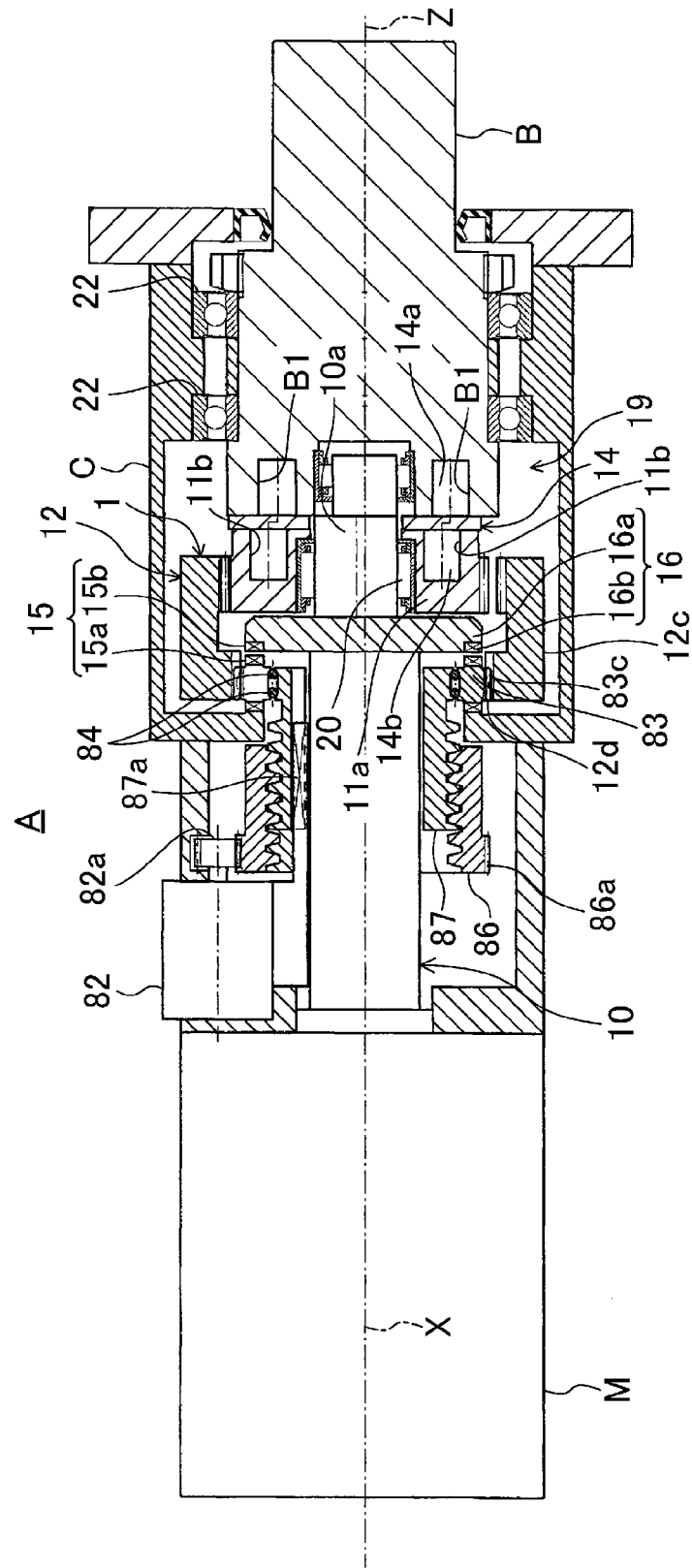
FIG. 34 is a diagram corresponding to FIG. 20 according to the eleventh embodiment.

FIGS. 33 and 34 are cross-sectional views of a driver A including a gear system 1 according to an eleventh embodiment of the present disclosure. In the principal structure of the gear system 1 of the eleventh embodiment, the crankpins 14 of the first embodiment are used. However, unlike the first embodiment, in the eleventh embodiment, the crankpins 14 are inserted into an output shaft B, and a brake 15 and a clutch system 16 are operated using a screw mechanism. The same reference characters are used to represent the same components as those in the first embodiment, and the explanation thereof will be omitted. The difference between the first and eleventh embodiments will be described hereinafter in detail.

In the eleventh embodiment, the brake 15 and the clutch system 16 are operated using a screw mechanism similar to that of the fifth embodiment, and the configurations of the brake 15 and the clutch system 16 are also similar to those of the fifth embodiment.

The configurations of the output shaft B, an external gear 11, an internal gear 12, the crankpins 14, and other components are similar to those of the tenth embodiment.

In the eleventh embodiment, when a screw drive motor 82 is rotated, a male thread member 86 rotates, and a female thread member 87 moves on a rail C5 along the center line X in a direction corresponding to the direction of the rotation of the male thread member 86. As illustrated in FIG. 33, when the screw drive motor 82 is rotated such that the female thread member 87 moves to the right, the brake 15 is placed in a non-braking state, and the clutch system 16 is placed in a coupling state. Thus, the output shaft B is rotated through the external gear 11 meshing with the internal gear 12.

In contrast, as illustrated in FIG. 34, when the screw drive motor 82 is rotated such that the female thread member 87 moves to the left, the brake 15 is placed in a braking state, and the clutch system 16 is placed in a non-coupling state. This allows a facing fixing member 83 to be fixed to a casing C; thus, the internal gear 12 prevents rotation of the external gear 11, and the output shaft B rotates at a rotational speed corresponding to the difference in number between teeth of the internal gear 12 and teeth of the external gear 11.

According to the eleventh embodiment, operational advantages similar to those of the first embodiment can be obtained.

Twelfth Embodiment

Figure 35:
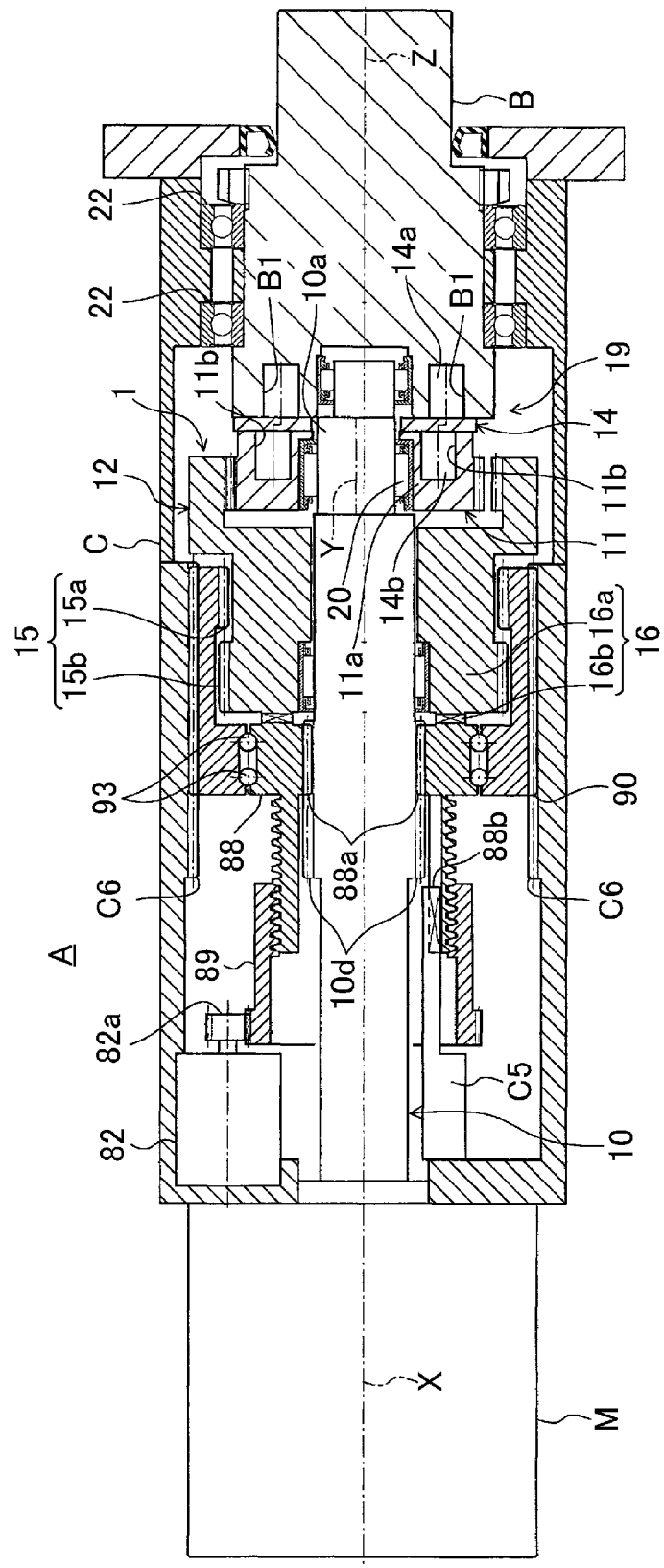
FIG. 35 is a diagram corresponding to FIG. 19 according to a twelfth embodiment.
Figure 36:
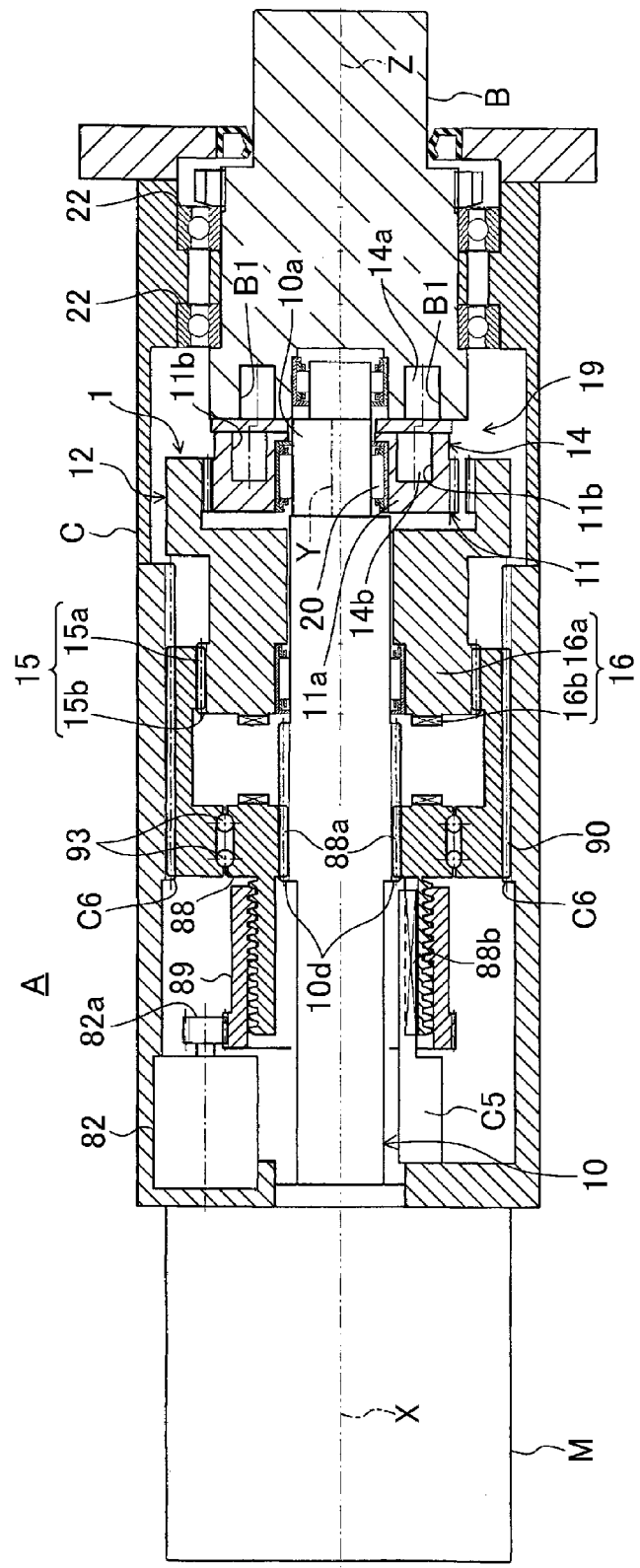
FIG. 36 is a diagram corresponding to FIG. 20 according to the twelfth embodiment.

FIGS. 35 and 36 are cross-sectional views of a driver A including a gear system 1 according to a twelfth embodiment of the present disclosure. In the principal structure of the gear system 1 of the twelfth embodiment, the crankpins 14 of the first embodiment are used. However, unlike the first embodiment, in the twelfth embodiment, the crankpins 14 are inserted into an output shaft B, and a brake 15 and a clutch system 16 are operated using a screw mechanism. The same reference characters are used to represent the same components as those in the first embodiment, and the explanation thereof will be omitted. The difference between the first and twelfth embodiments will be described hereinafter in detail.

In the twelfth embodiment, the brake 15 and the clutch system 16 are operated using a screw mechanism similar to that of the sixth embodiment, and the configurations of the brake 15 and the clutch system 16 are also similar to those of the sixth embodiment.

The configurations of the output shaft B, an external gear 11, an internal gear 12, the crankpins 14, and other components are similar to those of the tenth embodiment.

In the twelfth embodiment, when the screw drive motor 82 is rotated, the female thread member 89 rotates, and the male thread member 88 moves on the rail C5 along the center line X in a direction corresponding to the direction of the rotation of the female thread member 89. As illustrated in FIG. 35, when the screw drive motor 82 is rotated such that the male thread member 88 moves to the right, the brake 15 is placed in a non-braking state, and the clutch system 16 is placed in a coupling state. Thus, the output shaft B is rotated through the external gear 11 meshing with the internal gear 12.

In contrast, as illustrated in FIG. 36, when the screw drive motor 82 is rotated such that the male thread member 88 moves to the left, the brake 15 is placed in a braking state, and the clutch system 16 is placed in a non-coupling state. Thus, the internal gear 12 prevents rotation of the external gear 11, and the output shaft B rotates at a rotational speed corresponding to the difference in number between teeth of the internal gear 12 and teeth of the external gear 11.

According to the twelfth embodiment, operational advantages similar to those of the first embodiment can be obtained.

Thirteenth Embodiment

Figure 37:
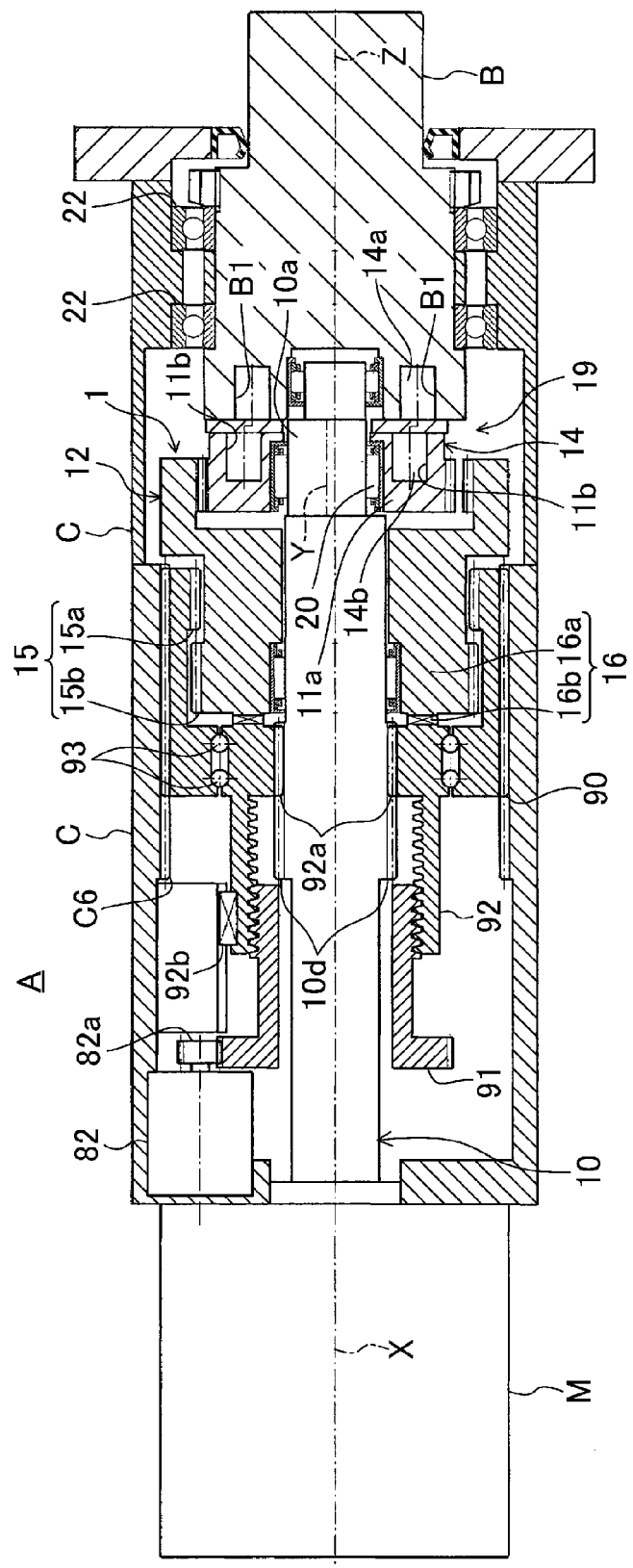
FIG. 37 is a diagram corresponding to FIG. 19 according to a thirteenth embodiment.
Figure 38:
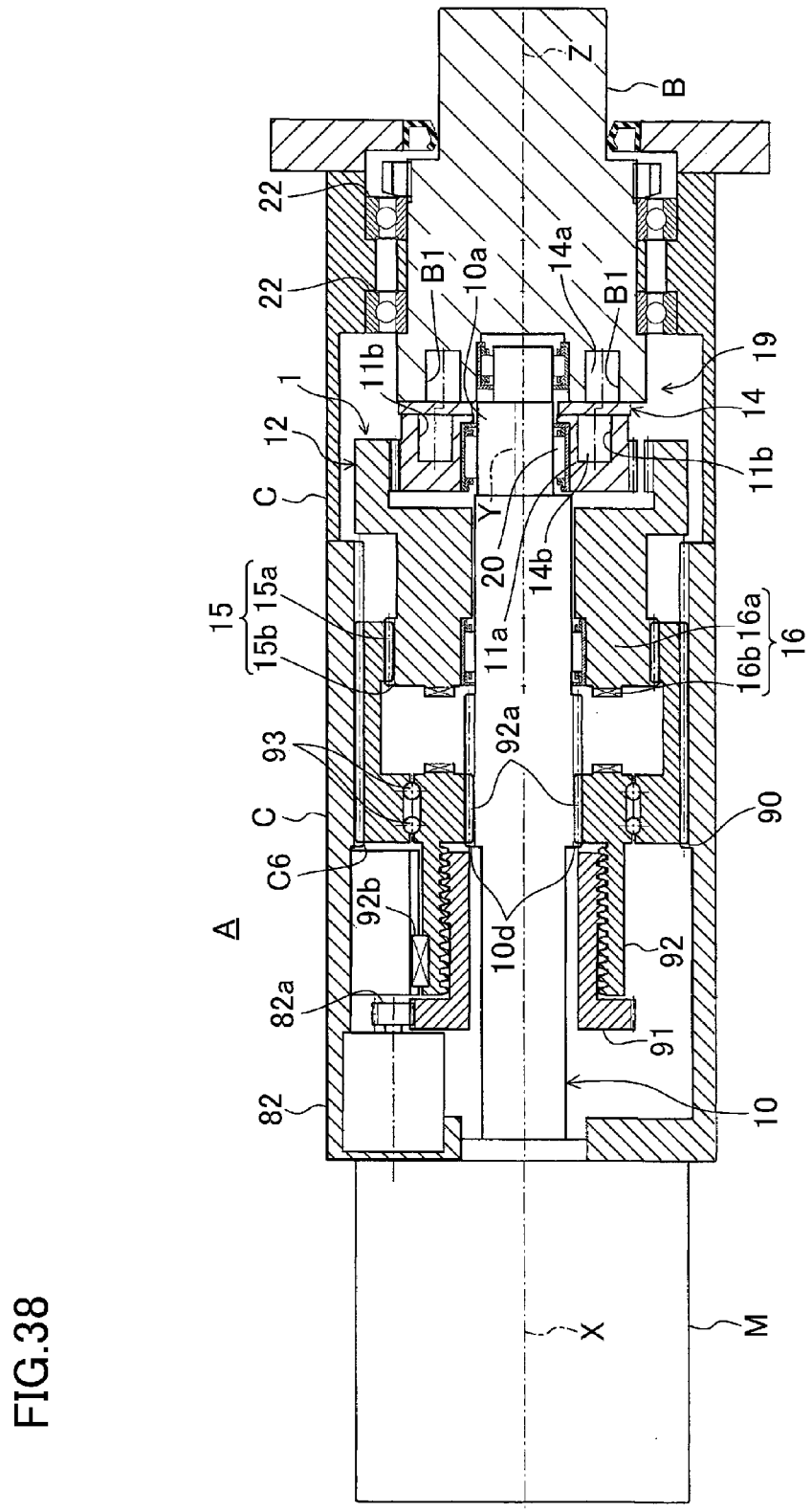
FIG. 38 is a diagram corresponding to FIG. 20 according to the thirteenth embodiment.

FIGS. 37 and 38 are cross-sectional views of a driver A including a gear system 1 according to a thirteenth embodiment of the present disclosure. In the principal structure of the gear system 1 of the thirteenth embodiment, the crankpins 14 of the first embodiment are used. However, unlike the first embodiment, in the thirteenth embodiment, the crankpins 14 are inserted into an output shaft B, and a brake 15 and a clutch system 16 are operated using a screw mechanism. The same reference characters are used to represent the same components as those in the first embodiment, and the explanation thereof will be omitted. The difference between the first and thirteenth embodiments will be described hereinafter in detail.

In the thirteenth embodiment, the brake 15 and the clutch system 16 are operated using a screw mechanism similar to that of the seventh embodiment, and the configurations of the brake 15 and the clutch system 16 are also similar to those of the seventh embodiment.

The output shaft B, an external gear 11, an internal gear 12, the crankpins 14, and other components are similar to those of the tenth embodiment.

In the thirteenth embodiment, when a screw drive motor 82 is rotated, a male thread member 91 rotates, and a female thread member 92 moves on a rail 10d along the center line X in a direction corresponding to the direction of the rotation of the male thread member 91. As illustrated in FIG. 37, when the screw drive motor 82 is rotated such that the female thread member 92 moves to the right, the brake 15 is placed in a non-braking state, and the clutch system 16 is placed in a coupling state. Thus, the output shaft B is rotated through the external gear 11 meshing with the internal gear 12.

In contrast, as illustrated in FIG. 38, when the screw drive motor 82 is rotated such that the female thread member 92 moves to the left, the brake 15 is placed in a braking state, and the clutch system 16 is placed in a non-coupling state. Thus, the internal gear 12 prevents rotation of the external gear 11, and the output shaft B rotates at a rotational speed corresponding to the difference in number between teeth of the internal gear 12 and teeth of the external gear 11.

According to the thirteenth embodiment, operational advantages similar to those of the first embodiment can be obtained.

Fourteenth Embodiment

Figure 39:
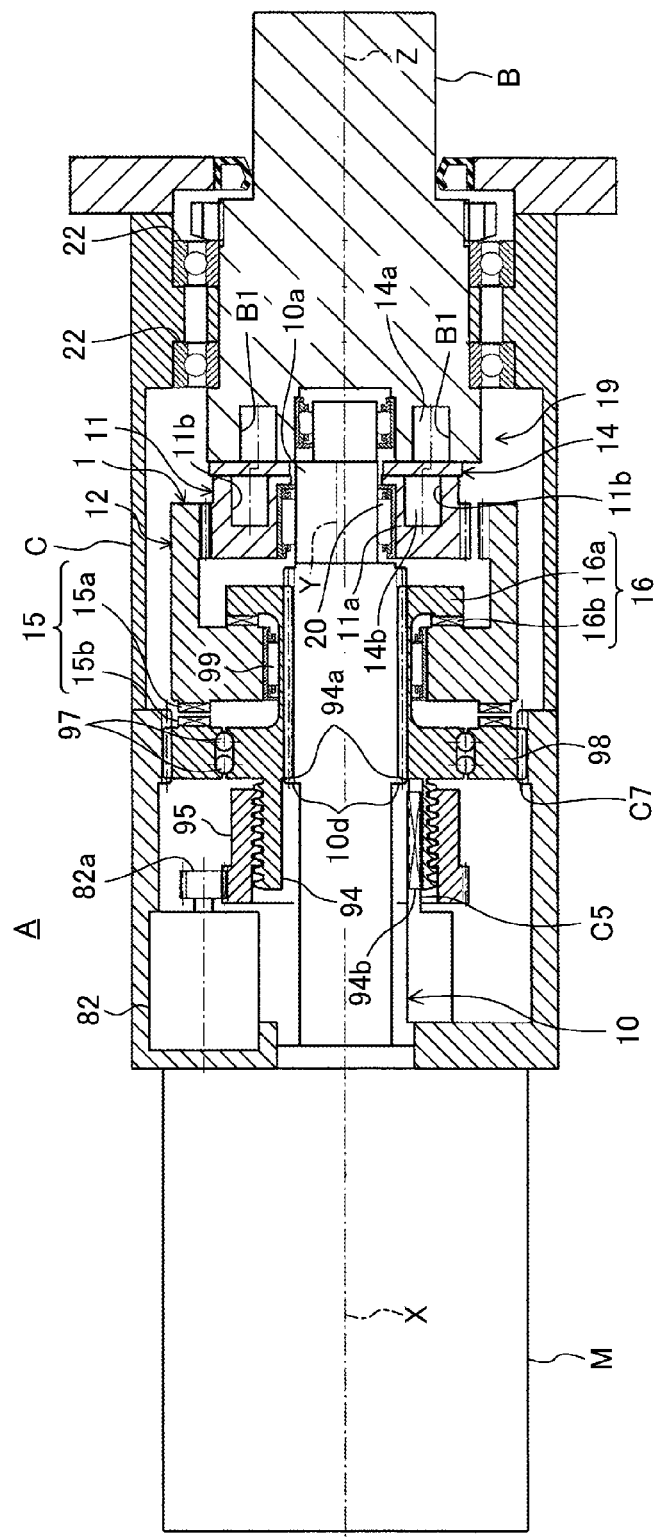
FIG. 39 is a diagram corresponding to FIG. 19 according to a fourteenth embodiment.
Figure 40:
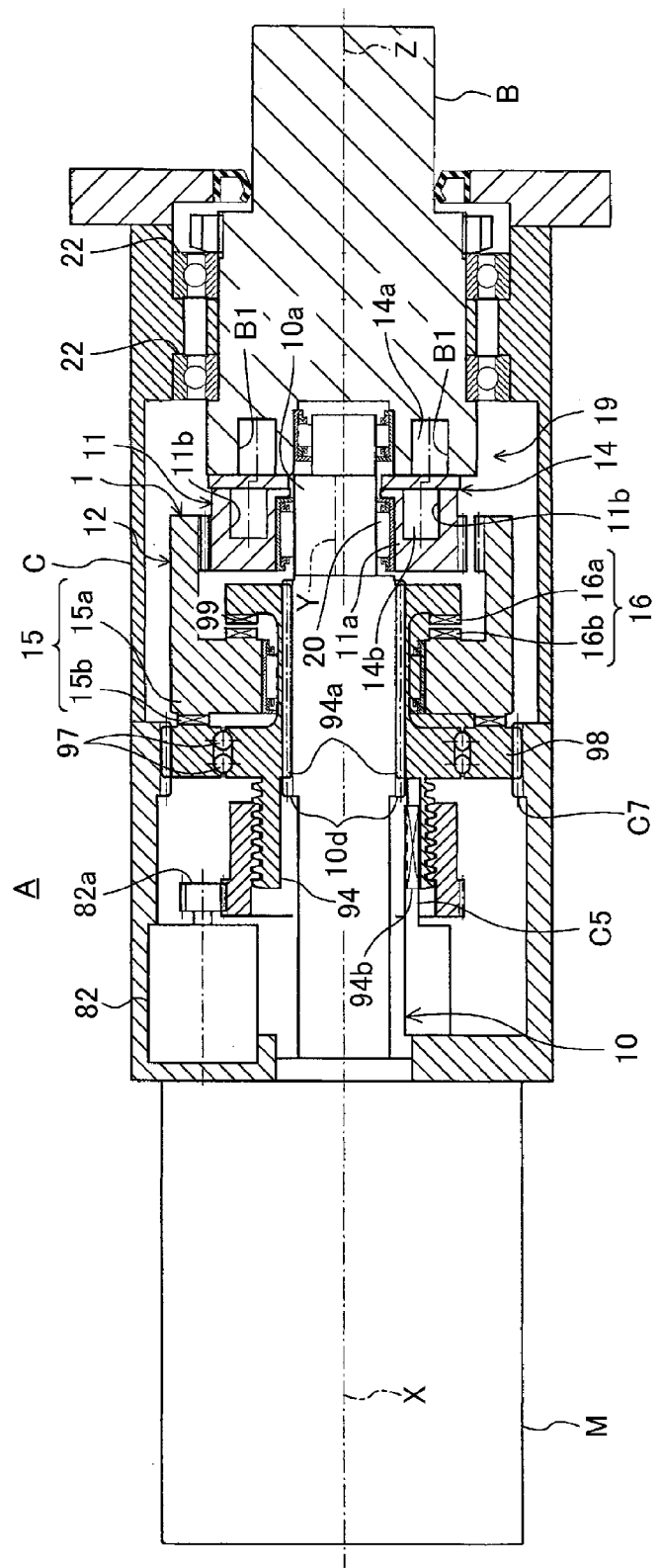
FIG. 40 is a diagram corresponding to FIG. 20 according to the fourteenth embodiment.

FIGS. 39 and 40 are cross-sectional views of a driver A including a gear system 1 according to a fourteenth embodiment of the present disclosure. In the principal structure of the gear system 1 of the fourteenth embodiment, the crankpins 14 of the first embodiment are used. However, unlike the first embodiment, in the fourteenth embodiment, the crankpins 14 are inserted into an output shaft B, and a brake 15 and a clutch system 16 are operated using a screw mechanism. The same reference characters are used to represent the same components as those in the first embodiment, and the explanation thereof will be omitted. The difference between the first and fourteenth embodiments will be described hereinafter in detail.

In the fourteenth embodiment, the brake 15 and the clutch system 16 are operated using a screw mechanism similar to that of the eighth embodiment, and the configurations of the brake 15 and the clutch system 16 are also similar to those of the eighth embodiment.

The configurations of the output shaft B, an external gear 11, an internal gear 12, the crankpins 14, and other components are similar to those of the tenth embodiment.

In the fourteenth embodiment, when a screw drive motor 82 is rotated, a female thread member 95 rotates, and a male thread member 94 moves on a rail C5 along a center line X in a direction corresponding to the direction of the rotation of the female thread member 95. As illustrated in FIG. 39, when the screw drive motor 82 is rotated such that the male thread member 94 moves to the left, the brake 15 is placed in a non-braking state, and the clutch system 16 is placed in a coupling state. Thus, the output shaft B is rotated through the external gear 11 meshing with the internal gear 12.

In contrast, as illustrated in FIG. 40, when the screw drive motor 82 is rotated such that the male thread member 94 moves to the right, the brake 15 is placed in a braking state, and the clutch system 16 is placed in a non-coupling state. Thus, the internal gear 12 prevents rotation of the external gear 11, and the output shaft B rotates at a rotational speed corresponding to the difference in number between teeth of the internal gear 12 and teeth of the external gear 11.

According to the fourteenth embodiment, operational advantages similar to those of the first embodiment can be obtained.

Fifteenth Embodiment

Figure 41:
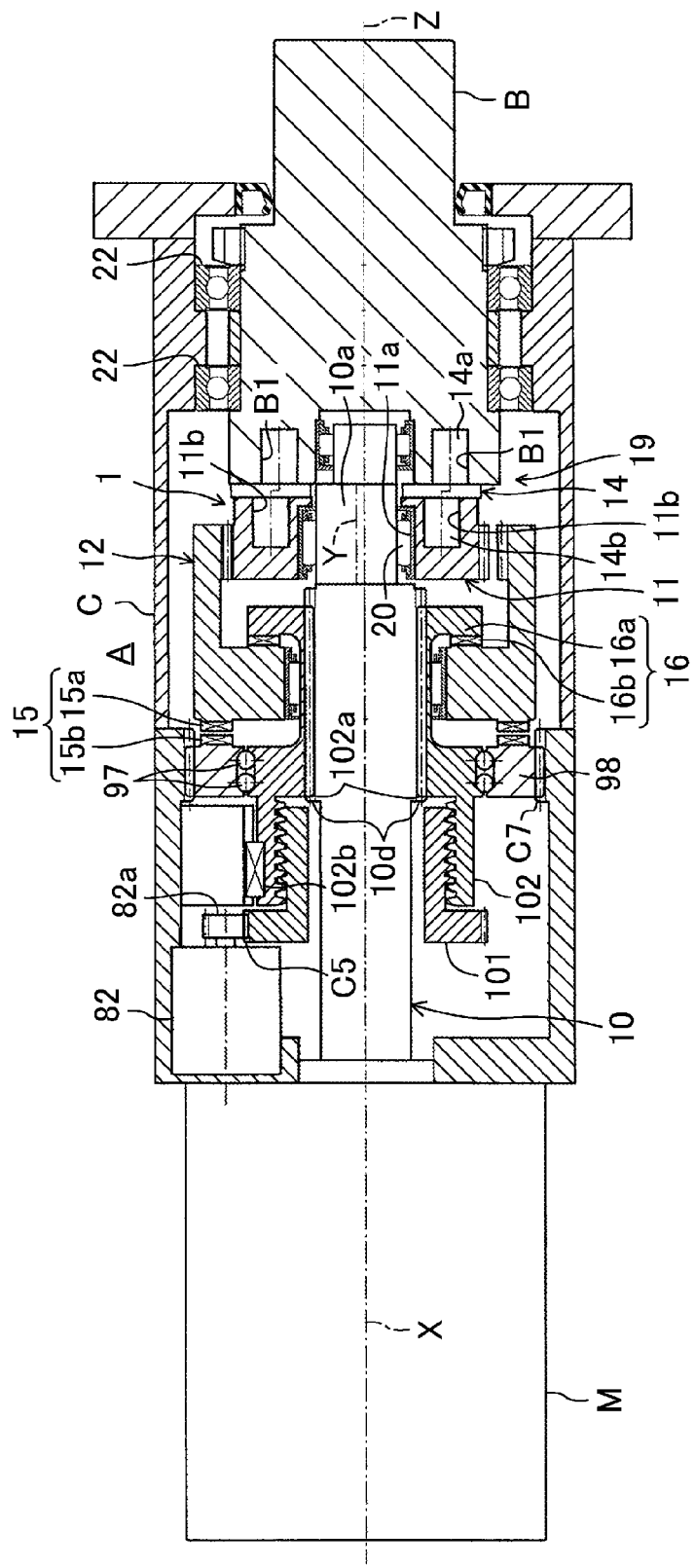
FIG. 41 is a diagram corresponding to FIG. 19 according to a fifteenth embodiment.
Figure 42:
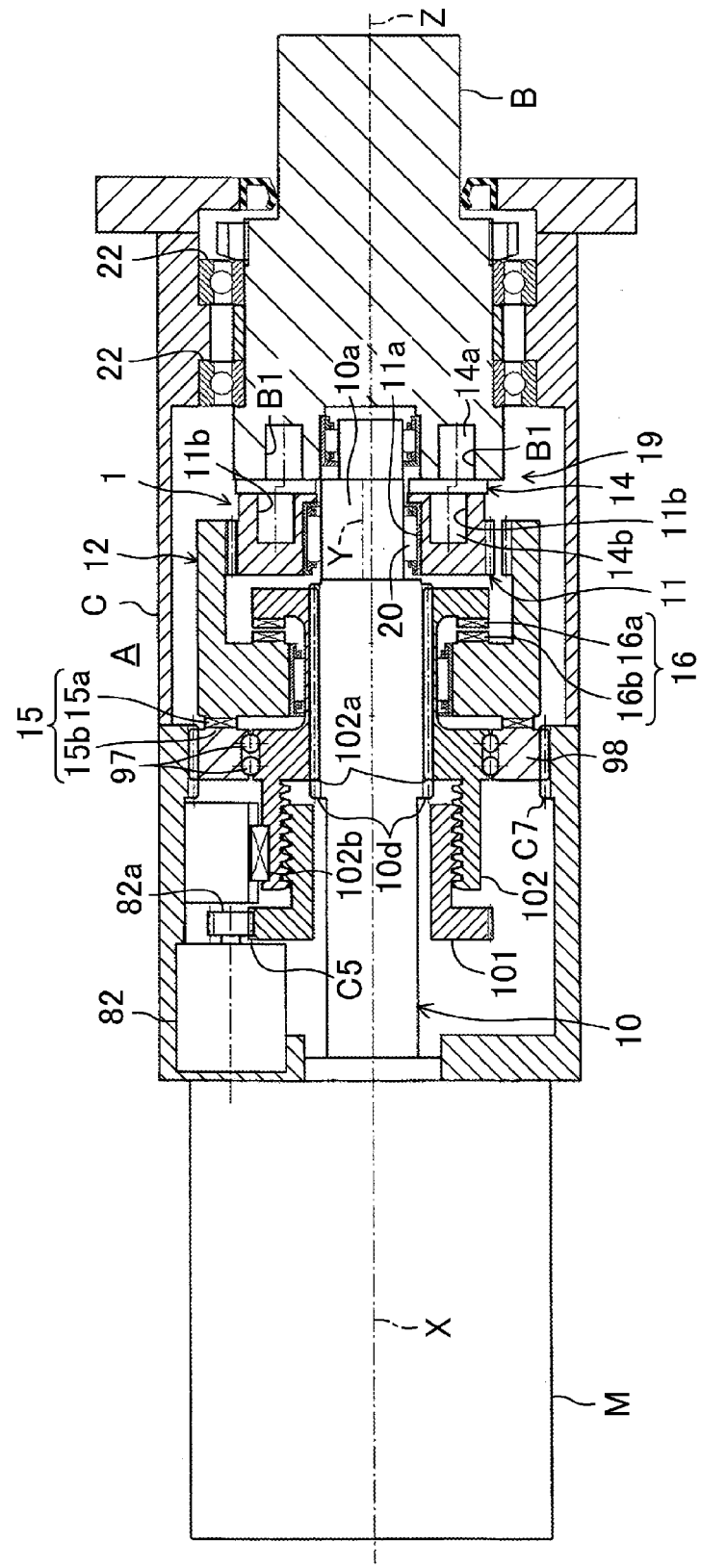
FIG. 42 is a diagram corresponding to FIG. 20 according to the fifteenth embodiment.

FIGS. 41 and 42 are cross-sectional views of a driver A including a gear system 1 according to a fifteenth embodiment of the present disclosure. In the principal structure of the gear system 1 of the fifteenth embodiment, the crankpins 14 of the first embodiment are used. However, unlike the first embodiment, in the fifteenth embodiment, the crankpins 14 are inserted into an output shaft B, and a brake 15 and a clutch system 16 are operated using a screw mechanism. The same reference characters are used to represent the same components as those in the first embodiment, and the explanation thereof will be omitted. The difference between the first and fifteenth embodiments will be described hereinafter in detail.

In the fifteenth embodiment, the brake 15 and the clutch system 16 are operated using a screw mechanism similar to that of the ninth embodiment, and the configurations of the brake 15 and the clutch system 16 are also similar to those of the ninth embodiment.

The configurations of the output shaft B, an external gear 11, an internal gear 12, the crankpins 14, and other components are similar to those of the tenth embodiment.

In the fifteenth embodiment, when a screw drive motor 82 is rotated, a male thread member 101 rotates, and a female thread member 102 moves on a rail C5 along the center line X in a direction corresponding to the direction of the rotation of the male thread member 101. As illustrated in FIG. 41, when the screw drive motor 82 is rotated such that the female thread member 102 moves to the left, the brake 15 is placed in a non-braking state, and the clutch system 16 is placed in a coupling state. Thus, the output shaft B is rotated through the external gear 11 meshing with the internal gear 12.

In contrast, as illustrated in FIG. 42, when the screw drive motor 82 is rotated such that the female thread member 102 moves to the right, the brake 15 is placed in a braking state, and the clutch system 16 is placed in a non-coupling state. Thus, the internal gear 12 prevents rotation of the external gear 11, and the output shaft B rotates at a rotational speed corresponding to the difference in number between teeth of the internal gear 12 and teeth of the external gear 11.

According to the fifteenth embodiment, operational advantages similar to those of the first embodiment can be obtained.

Sixteenth Embodiment

Figure 43:
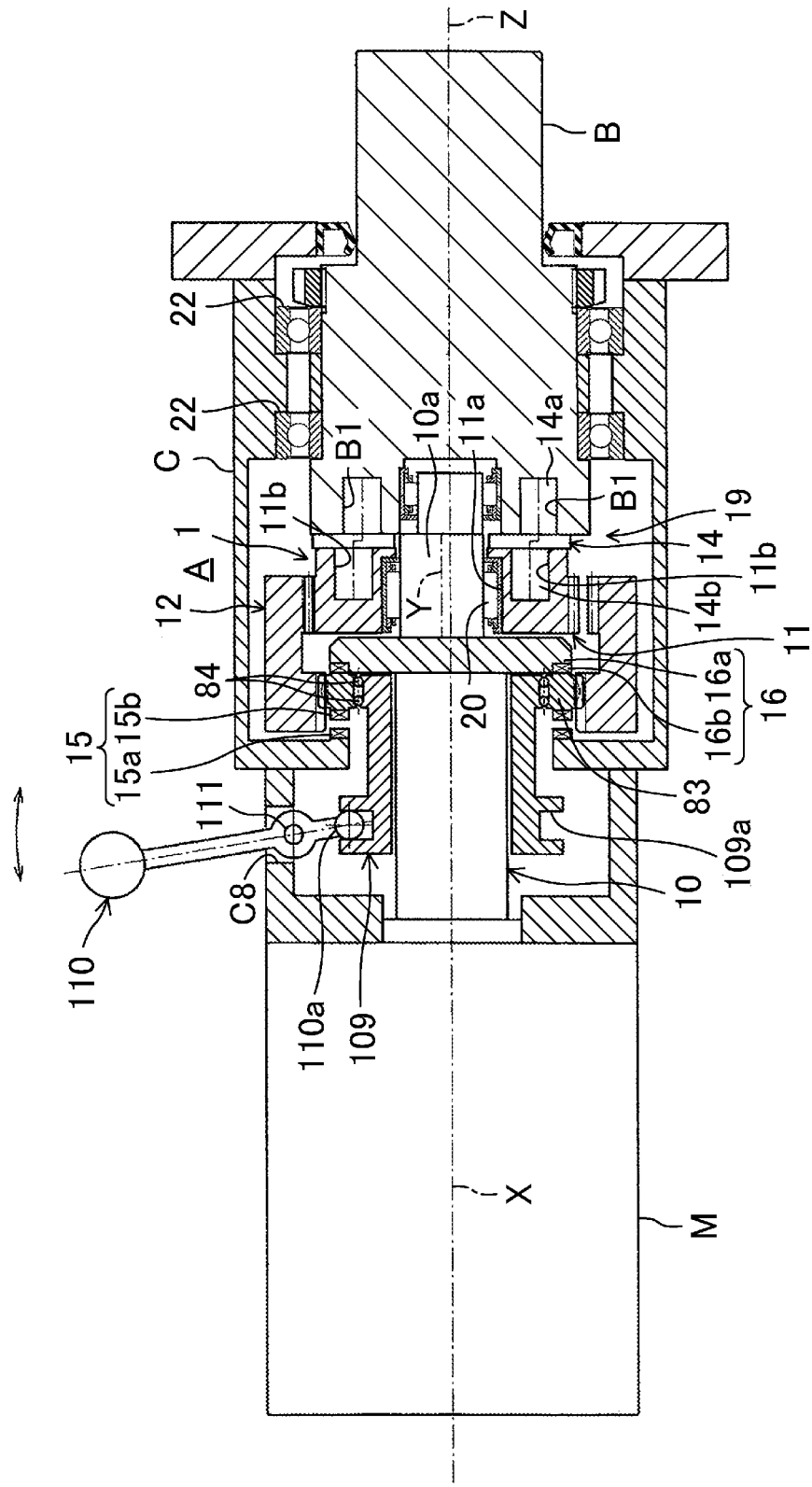
FIG. 43 is a diagram corresponding to FIG. 19 according to a sixteenth embodiment.

FIG. 43 is a cross-sectional view of a driver A including a gear system 1 according to a sixteenth embodiment of the present disclosure. In the principal structure of the gear system 1 of the sixteenth embodiment, the crankpins 14 of the first embodiment are used. However, unlike the first embodiment, in the sixteenth embodiment, the crankpins 14 are inserted into an output shaft B, and a brake 15 and a clutch system 16 are manually operated. The same reference characters are used to represent the same components as those in the first embodiment, and the explanation thereof will be omitted. The difference between the first and sixteenth embodiments will be described hereinafter in detail.

The configurations of the output shaft B, an external gear 11, an internal gear 12, the crankpins 14, and other components are similar to those of the tenth embodiment.

In the sixteenth embodiment, a manual operation mechanism is provided instead of the screw mechanism of the fourth embodiment. The manual operation mechanism includes a tubular member 109, and an operating lever 110. A portion of an input shaft 10 closer to a motor M than a clutch system body 16a is inserted into the tubular member 109. The tubular member 109 can move relative to the input shaft 10 along the center line X of the input shaft 10.

A facing fixing member 83 is placed around a portion of the tubular member 109 near the clutch system body 16a with roller members 84 interposed therebetween similarly to the fourth embodiment. A circumferentially extending continuous groove 109a is formed in the outer circumferential surface of a portion of the tubular member 109 near the motor M.

The operating lever 110 is inserted through a through hole C8 formed in a casing C. A longitudinally middle portion of the operating lever 110 is fitted to the casing C through a spindle 111 extending in a direction orthogonal to the center line X. This allows the operating lever 110 to oscillate about the spindle 111.

An end portion of the operating lever 110 in the casing C includes an insertion portion 110a inserted into the groove 109a of the tubular member 109. The insertion portion 110a is spherical, and the area of contact between the insertion portion 110a and the inner wall of the groove 109a is small. The insertion portion 110a is in sliding contact with the inner wall of the groove 109a. An end portion of the operating lever 110 outside the casing C is formed in the shape of a sphere having a large diameter to facilitate grasping the operating lever 110.

In the sixteenth embodiment, when the operating lever 110 is oscillated, the tubular member 109 moves along the center line X. As illustrated in FIG. 43, when the operating lever 110 is oscillated such that the tubular member 109 moves to the right, the brake 15 is placed in a non-braking state, and the clutch system 16 is placed in a coupling state.

In contrast, although not shown, when the operating lever 110 is oscillated such that the tubular member 109 moves to the left, the brake 15 is placed in a braking state, and the clutch system 16 is placed in a non-coupling state.

According to the sixteenth embodiment, operational advantages similar to those of the first embodiment can be obtained.

The operating lever 110 may be manually operated by a user. Alternatively, it may be operated using, e.g., an actuator (not shown). When an actuator is used, the actuator is connected to a controller 2 so as to be controlled.

Seventeenth Embodiment

Figure 44:
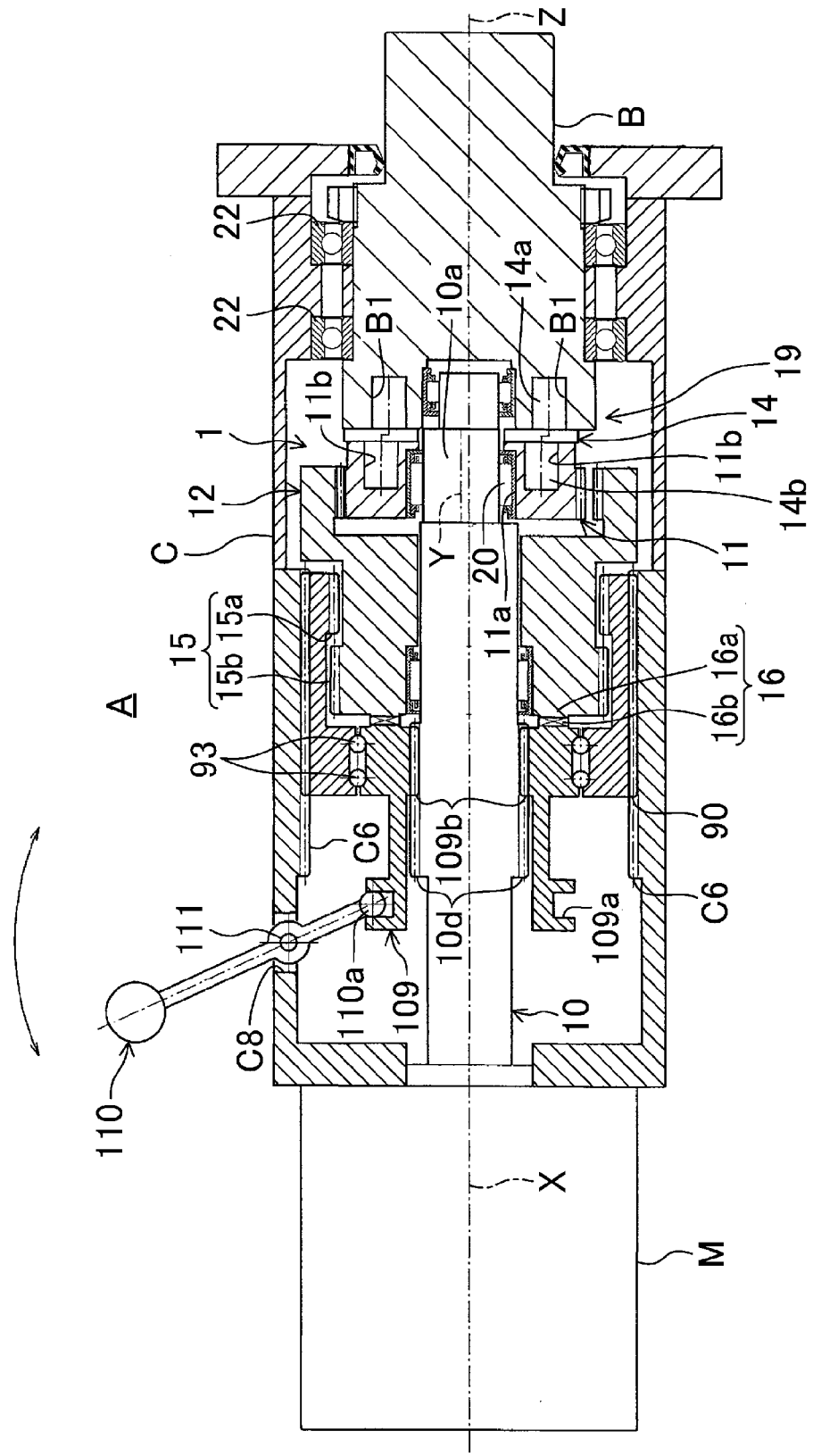
FIG. 44 is a diagram corresponding to FIG. 19 according to a seventeenth embodiment.

FIG. 44 is a cross-sectional view of a driver A including a gear system 1 according to a seventeenth embodiment of the present disclosure. In the principal structure of the gear system 1 of the seventeenth embodiment, the crankpins 14 of the first embodiment are used. However, unlike the first embodiment, in the seventeenth embodiment, the crankpins 14 are inserted into an output shaft B, and a brake 15 and a clutch system 16 are manually operated. The same reference characters are used to represent the same components as those in the first embodiment, and the explanation thereof will be omitted. The difference between the first and seventeenth embodiments will be described hereinafter in detail.

The configurations of the output shaft B, an external gear 11, an internal gear 12, the crankpins 14, and other components are similar to those of the tenth embodiment.

In the seventeenth embodiment, the principal structure of the driver A is identical with that of the twelfth embodiment, and a manual operation mechanism is provided instead of the screw mechanism of the twelfth embodiment. The manual operation mechanism is similar to that of the sixteenth embodiment. A tubular member 109 has an inner circumferential surface including a rail engaging portion 109*b* engaging with a rail 10*d* formed on the outer circumferential surface of an input shaft 10 to extend along the center line X. This prevents rotation of the tubular member 109 about the center line X, and the tubular member 109 can move only along the center line X.

In the seventeenth embodiment, as illustrated in FIG. 44, when the operating lever 110 is oscillated such that the tubular member 109 moves to the right, the brake 15 is placed in a non-braking state, and the clutch system 16 is placed in a coupling state.

In contrast, although not shown, when the operating lever 110 is oscillated such that the tubular member 109 moves to the left, the brake 15 is placed in a braking state, and the clutch system 16 is placed in a non-coupling state.

According to the seventeenth embodiment, operational advantages similar to those of the first embodiment can be obtained.

Eighteenth Embodiment

Figure 45:
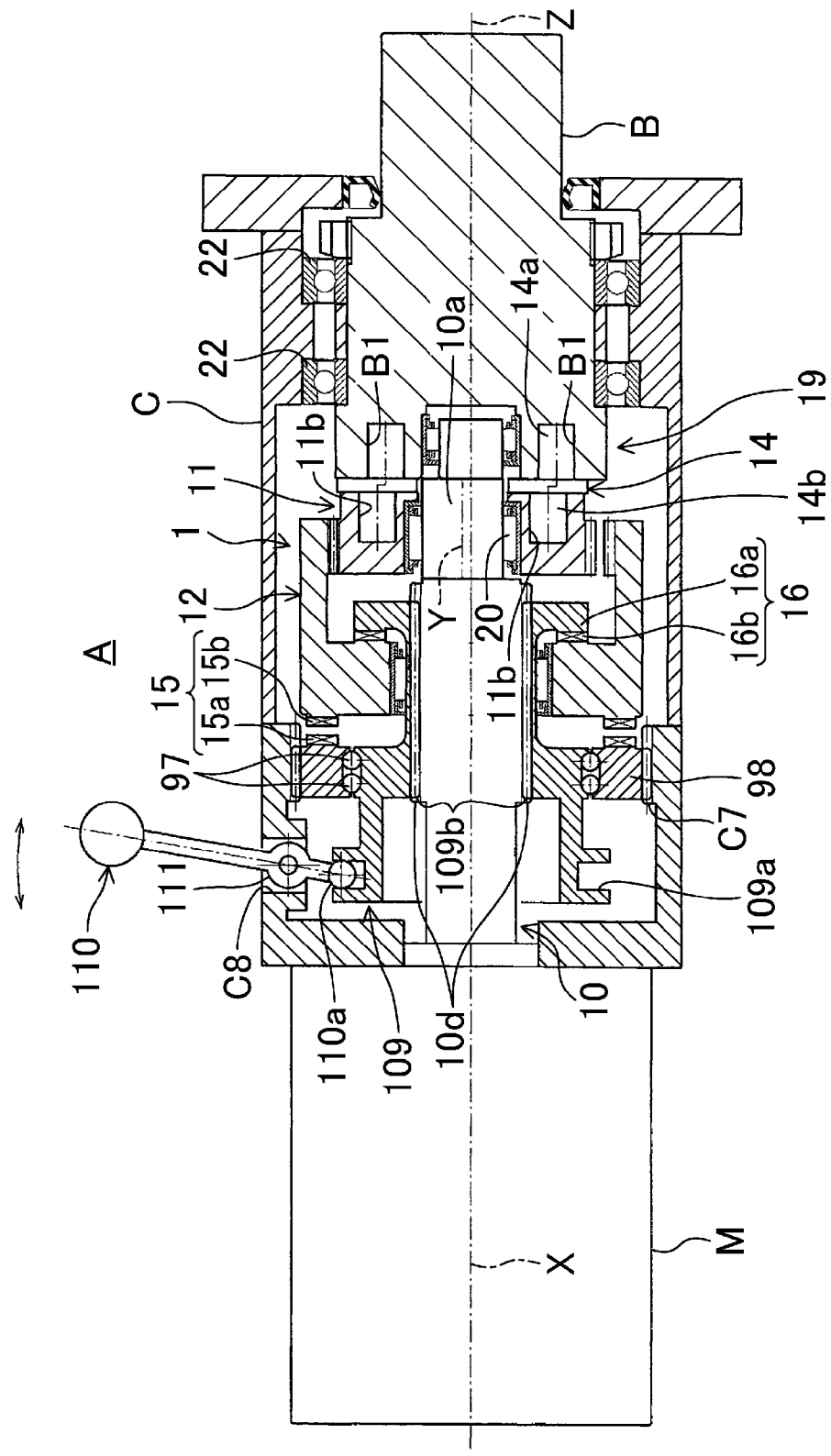
FIG. 45 is a diagram corresponding to FIG. 19 according to an eighteenth embodiment.

FIG. 45 is a cross-sectional view of a driver A including a gear system 1 according to an eighteenth embodiment of the present disclosure. In the principal structure of the gear system 1 of the eighteenth embodiment, the crankpins 14 of the first embodiment are used. However, unlike the first embodiment, in the eighteenth embodiment, the crankpins 14 are inserted into an output shaft B, and a brake 15 and a clutch system 16 are manually operated. The same reference characters are used to represent the same components as those in the first embodiment, and the explanation thereof will be omitted. The difference between the first and eighteenth embodiments will be described hereinafter in detail.

The configurations of the output shaft B, an external gear 11, an internal gear 12, the crankpins 14, and other components are similar to those of the tenth embodiment.

In the eighteenth embodiment, the principal structure of the driver A is identical with that of the fourteenth embodiment, and a manual operation mechanism is provided instead of the screw mechanism of the fourteenth embodiment. The manual operation mechanism is similar to that of the sixteenth embodiment. A tubular member 109 has an inner circumferential surface including a rail engaging portion 109*b* engaging with a rail 10*d* formed on the outer circumferential surface of an input shaft 10. This prevents rotation of the tubular member 109 about the center line X, and the tubular member 109 can move only along the center line X.

In the eighteenth embodiment, as illustrated in FIG. 45, when the operating lever 110 is oscillated such that the tubular member 109 moves to the left, the brake 15 is placed in a non-braking state, and the clutch system 16 is placed in a coupling state.

In contrast, although not shown, when the operating lever 110 is oscillated such that the tubular member 109 moves to the right, the brake 15 is placed in a braking state, and the clutch system 16 is placed in a non-coupling state.

According to the eighteenth embodiment, operational advantages similar to those of the first embodiment can be obtained.

Nineteenth Embodiment

Figure 46:
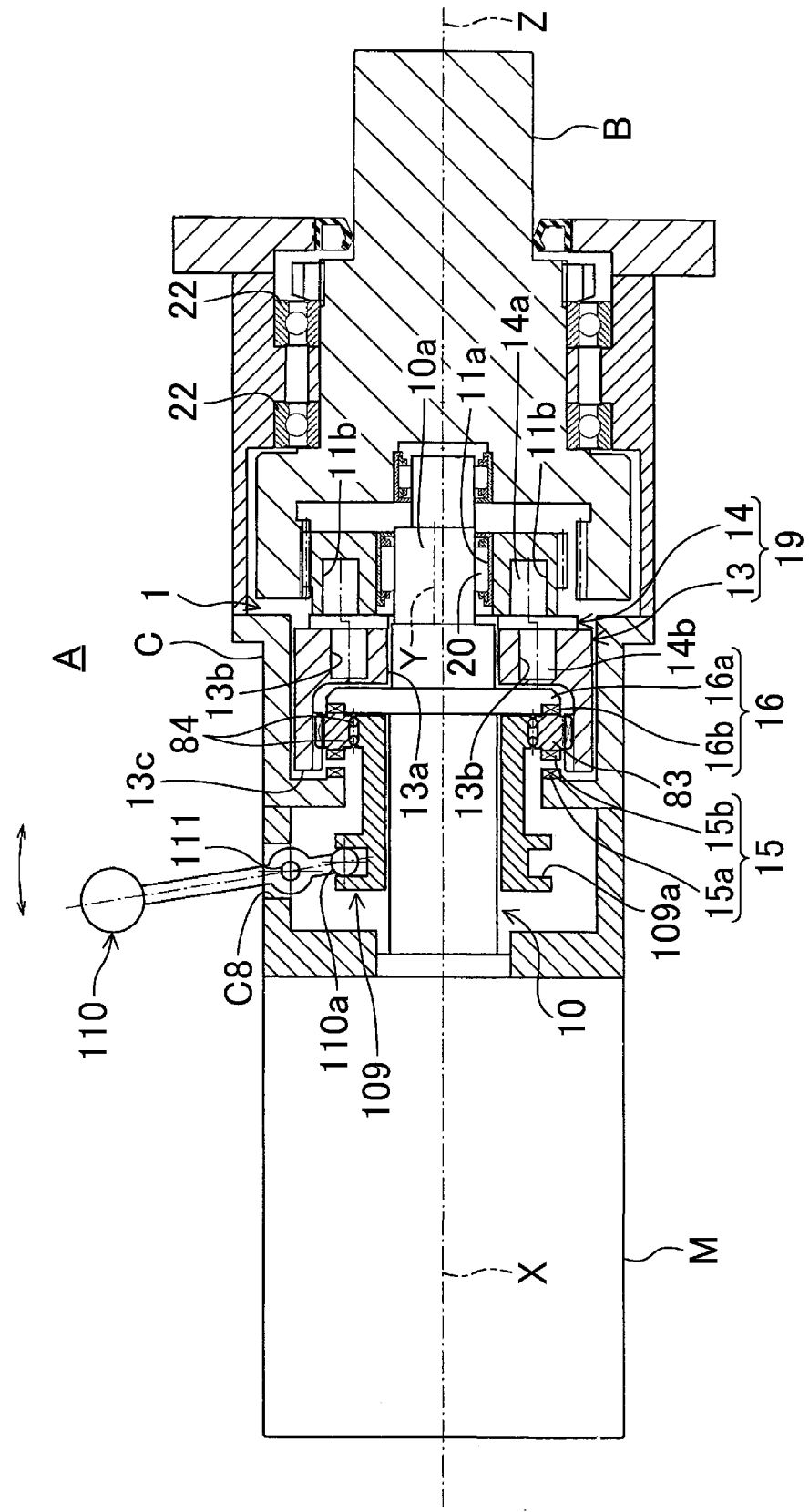
FIG. 46 is a diagram corresponding to FIG. 19 according to a nineteenth embodiment.

FIG. 46 is a cross-sectional view of a driver A including a gear system 1 according to a nineteenth embodiment of the present disclosure. In the principal structure of the gear system 1 of the nineteenth embodiment, the crankpins 14 of the first embodiment are used. However, unlike the first embodiment, in the nineteenth embodiment, a brake 15 and a clutch system 16 are manually operated. The same reference characters are used to represent the same components as those in the first embodiment, and the explanation thereof will be omitted. The difference between the first and nineteenth embodiments will be described hereinafter in detail.

The configurations of an output shaft B, an external gear 11, an internal gear 12, the crankpins 14, the brake 15, the clutch system 16, and other components are similar to those of the fourth embodiment.

In the nineteenth embodiment, a manual operation mechanism is provided instead of the screw mechanism of the fourth embodiment. The manual operation mechanism is similar to that of the sixteenth embodiment.

In the nineteenth embodiment, as illustrated in FIG. 46, when an operating lever 110 is oscillated such that a tubular member 109 moves to the right, the brake 15 is placed in a non-braking state, and the clutch system 16 is placed in a coupling state.

In contrast, although not shown, when the operating lever 110 is oscillated such that the tubular member 109 moves to the left, the brake 15 is placed in a braking state, and the clutch system 16 is placed in a non-coupling state.

According to the nineteenth embodiment, operational advantages similar to those of the first embodiment can be obtained.

Twentieth Embodiment

Figure 47:
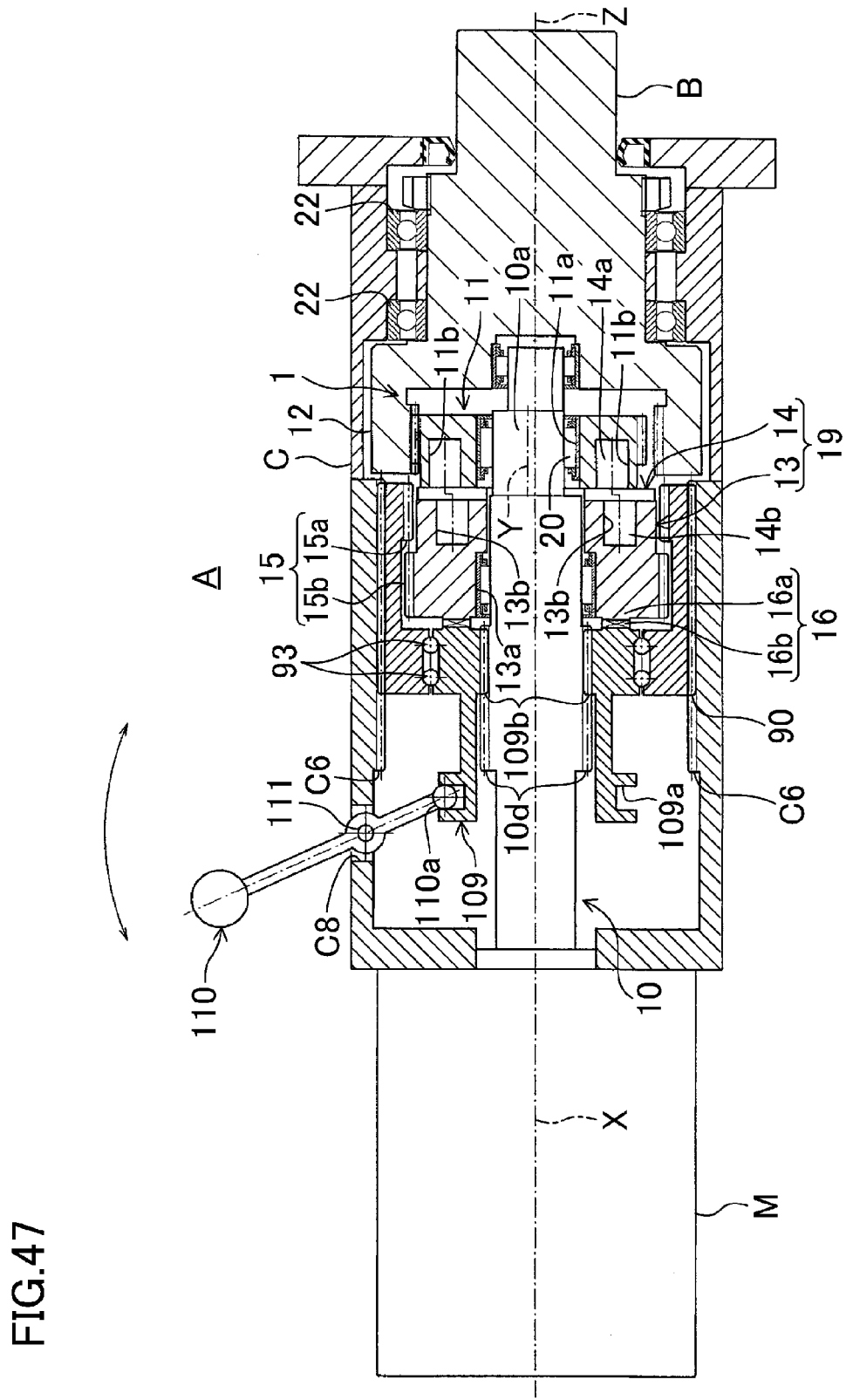
FIG. 47 is a diagram corresponding to FIG. 19 according to a twentieth embodiment.

FIG. 47 is a cross-sectional view of a driver A including a gear system 1 according to a twentieth embodiment of the present disclosure. In the principal structure of the gear system 1 of the twentieth embodiment, the crankpins 14 of the first embodiment are used. However, unlike the first embodiment, in the twentieth embodiment, a brake 15 and a clutch system 16 are manually operated. The same reference characters are used to represent the same components as those in the first embodiment, and the explanation thereof will be omitted. The difference between the first and twentieth embodiments will be described hereinafter in detail.

The configurations of an output shaft B, an external gear 11, an internal gear 12, the crankpins 14, the brake 15, the clutch system 16, and other components are similar to those of the sixth embodiment.

In the twentieth embodiment, a manual operation mechanism is provided instead of the screw mechanism of the fourth embodiment. The manual operation mechanism is similar to that of the sixteenth embodiment. A tubular member 109 has an inner circumferential surface including a rail engaging portion 109b engaging with a rail 10d formed on the outer circumferential surface of an input shaft 10. This prevents rotation of the tubular member 109 about the center line X, and the tubular member 109 can move only along the center line X.

In the twentieth embodiment, as illustrated in FIG. 47, when the operating lever 110 is oscillated such that the tubular member 109 moves to the right, the brake 15 is placed in a non-braking state, and the clutch system 16 is placed in a coupling state.

In contrast, although not shown, when the operating lever 110 is oscillated such that the tubular member 109 moves to the left, the brake 15 is placed in a braking state, and the clutch system 16 is placed in a non-coupling state.

According to the twentieth embodiment, operational advantages similar to those of the first embodiment can be obtained.

Twenty-First Embodiment

Figure 48:
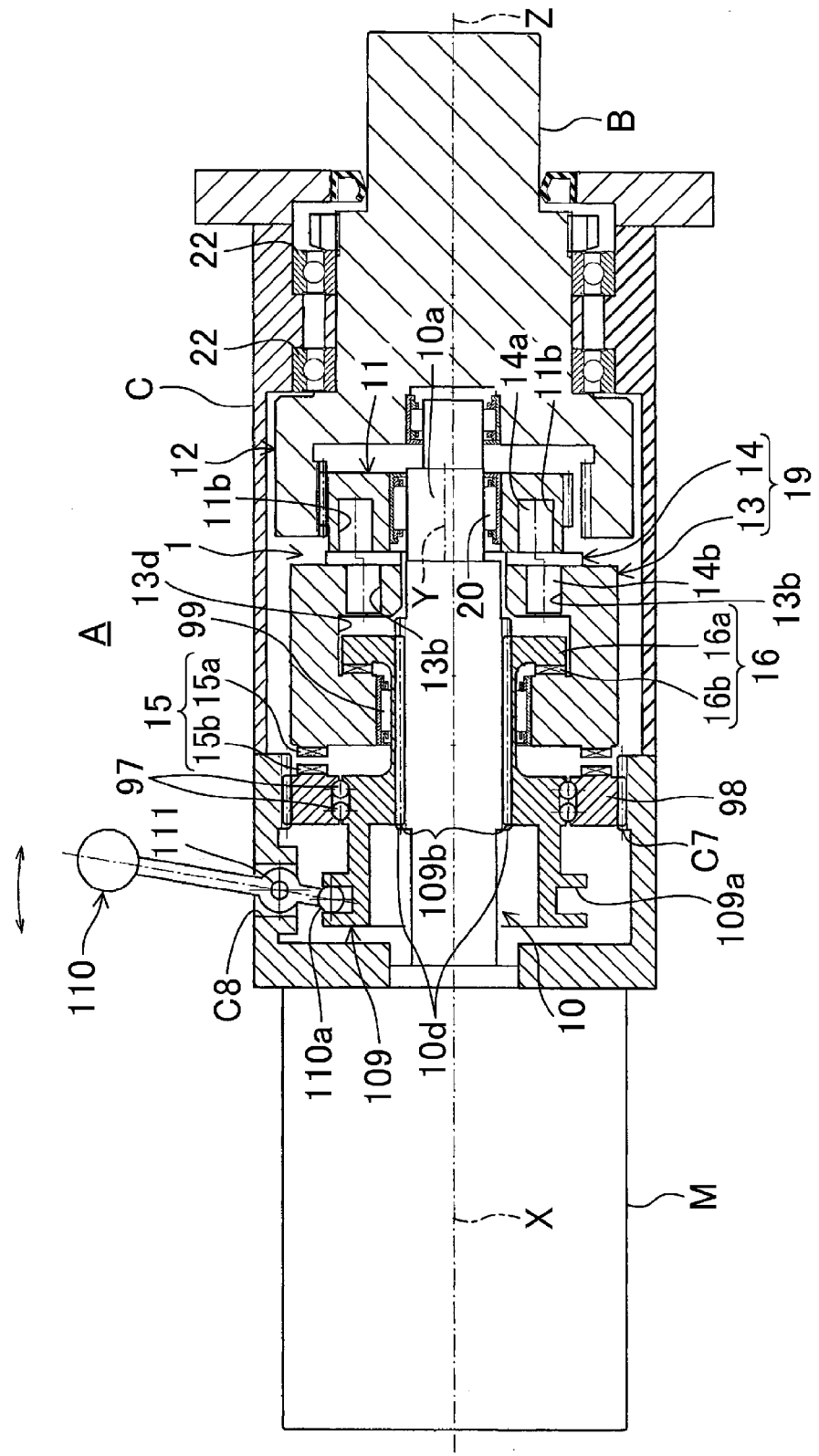
FIG. 48 is a diagram corresponding to FIG. 19 according to a twenty-first embodiment.

FIG. 48 is a cross-sectional view of a driver A including a gear system 1 according to a twenty-first embodiment of the present disclosure. In the principal structure of the gear system 1 of the twenty-first embodiment, the crankpins 14 of the first embodiment are used. However, unlike the first embodiment, in the twenty-first embodiment, a brake 15 and a clutch system 16 are manually operated. The same reference characters are used to represent the same components as those in the first embodiment, and the explanation thereof will be omitted. The difference between the first and twenty-first embodiments will be described hereinafter in detail.

The configurations of an output shaft B, an external gear 11, an internal gear 12, the crankpins 14, the brake 15, the clutch system 16, and other components are similar to those of the eighth embodiment.

In the twenty-first embodiment, a manual operation mechanism is provided instead of the screw mechanism of the fourth embodiment. The manual operation mechanism is similar to that of the sixteenth embodiment. A tubular member 109 has an inner circumferential surface including a rail engaging portion 109b engaging with a rail 10d formed on the outer circumferential surface of an input shaft 10. This prevents rotation of the tubular member 109 about the center line X, and the tubular member 109 can move only along the center line X.

In the twenty-first embodiment, as illustrated in FIG. 48, when an operating lever 110 is oscillated such that the tubular member 109 moves to the left, the brake 15 is placed in a non-braking state, and the clutch system 16 is placed in a coupling state.

In contrast, although not shown, when the operating lever 110 is oscillated such that the tubular member 109 moves to the right, the brake 15 is placed in a braking state, and the clutch system 16 is placed in a non-coupling state.

According to the twenty-first embodiment, operational advantages similar to those of the first embodiment can be obtained.

Twenty-Second Embodiment

Figure 49:
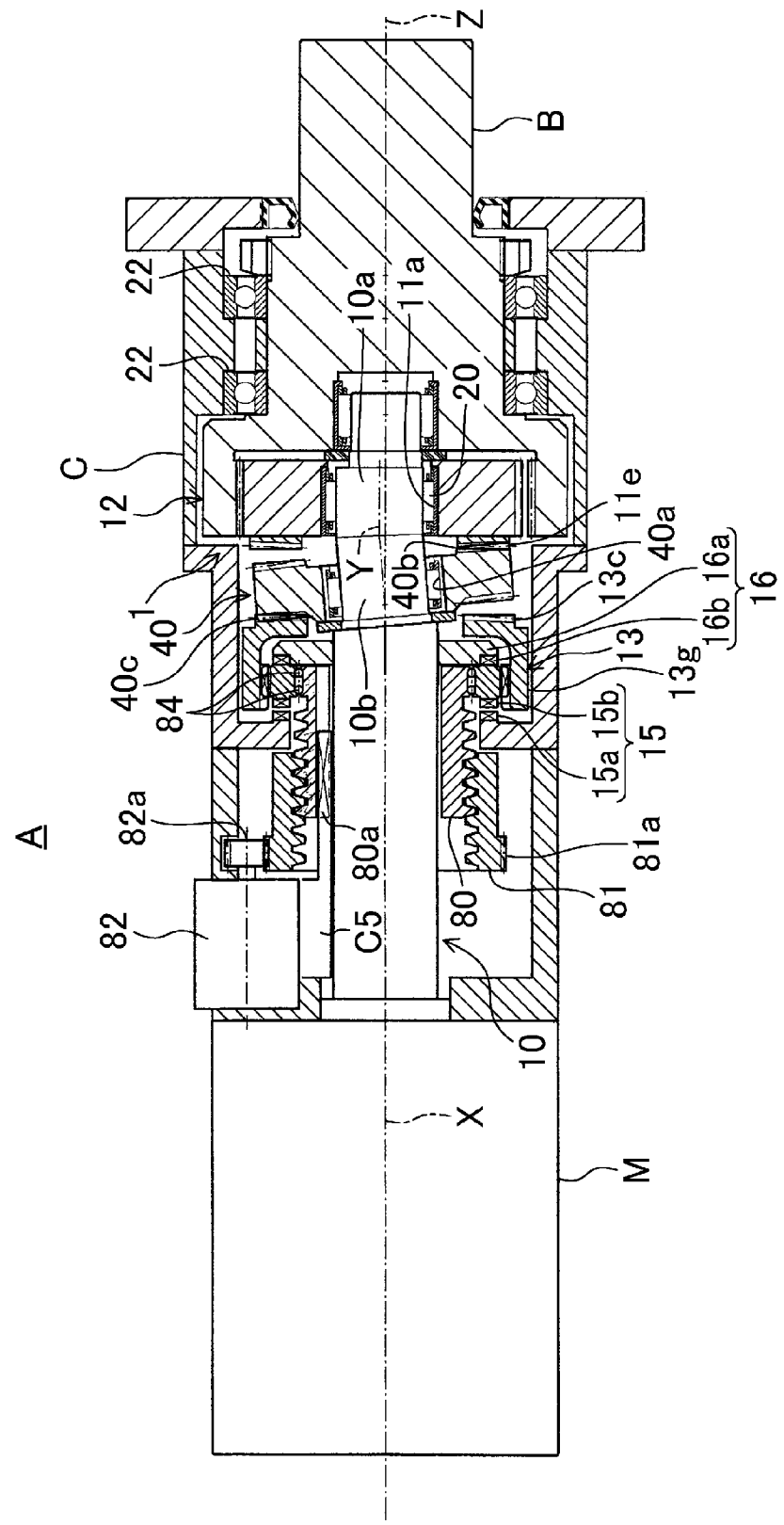
FIG. 49 is a diagram corresponding to FIG. 19 according to a twenty-second embodiment.
Figure 50:
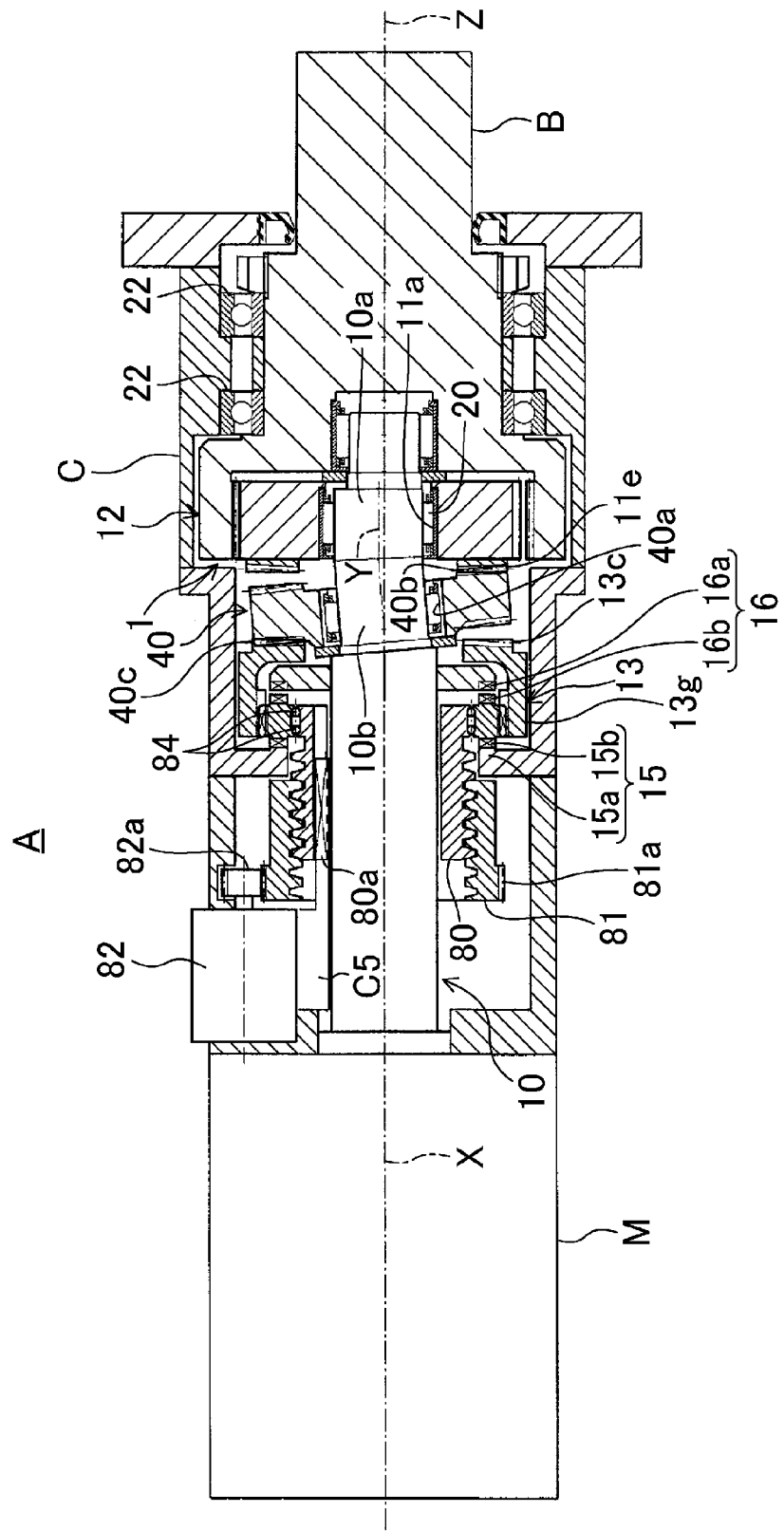
FIG. 50 is a diagram corresponding to FIG. 20 according to the twenty-second embodiment.

FIGS. 49 and 50 are cross-sectional views of a driver A including a gear system 1 according to a twenty-second embodiment of the present disclosure. In the principal structure of the gear system 1 of the twenty-second embodiment, the wobble plate 40 of the third embodiment is used. However, unlike the third embodiment, in the twenty-second embodiment, a brake 15 and a clutch system 16 are operated using a screw mechanism. The same reference characters are used to represent the same components as those in the third embodiment, and the explanation thereof will be omitted. The difference between the third and twenty-second embodiments will be described hereinafter in detail. The screw mechanism is similar to that of the fourth embodiment.

An outer portion of an anti-rotation plate 13 includes a continuous extending portion 13g circumferentially extending toward a motor M. A plurality of teeth are formed on the inner circumferential surface of the extending portion 13g to mesh with teeth of a facing fixing member 83.

In the twenty-second embodiment, as illustrated in FIG. 49, when a screw drive motor 82 is rotated such that a male thread member 80 moves to the right, the brake 15 is placed in a non-braking state, and the clutch system 16 is placed in a coupling state. This allows the anti-rotation plate 13 to be fixed to an input shaft 10.

In contrast, as illustrated in FIG. 50, when the screw drive motor 82 is rotated such that the male thread member 80 moves to the left, the brake 15 is placed in a braking state, and the clutch system 16 is placed in a non-coupling state. This allows the anti-rotation plate 13 to be unrestrained by the input shaft 10.

According to the twenty-second embodiment, operational advantages similar to those of the first embodiment can be obtained.

Twenty-Third Embodiment

Figure 51:
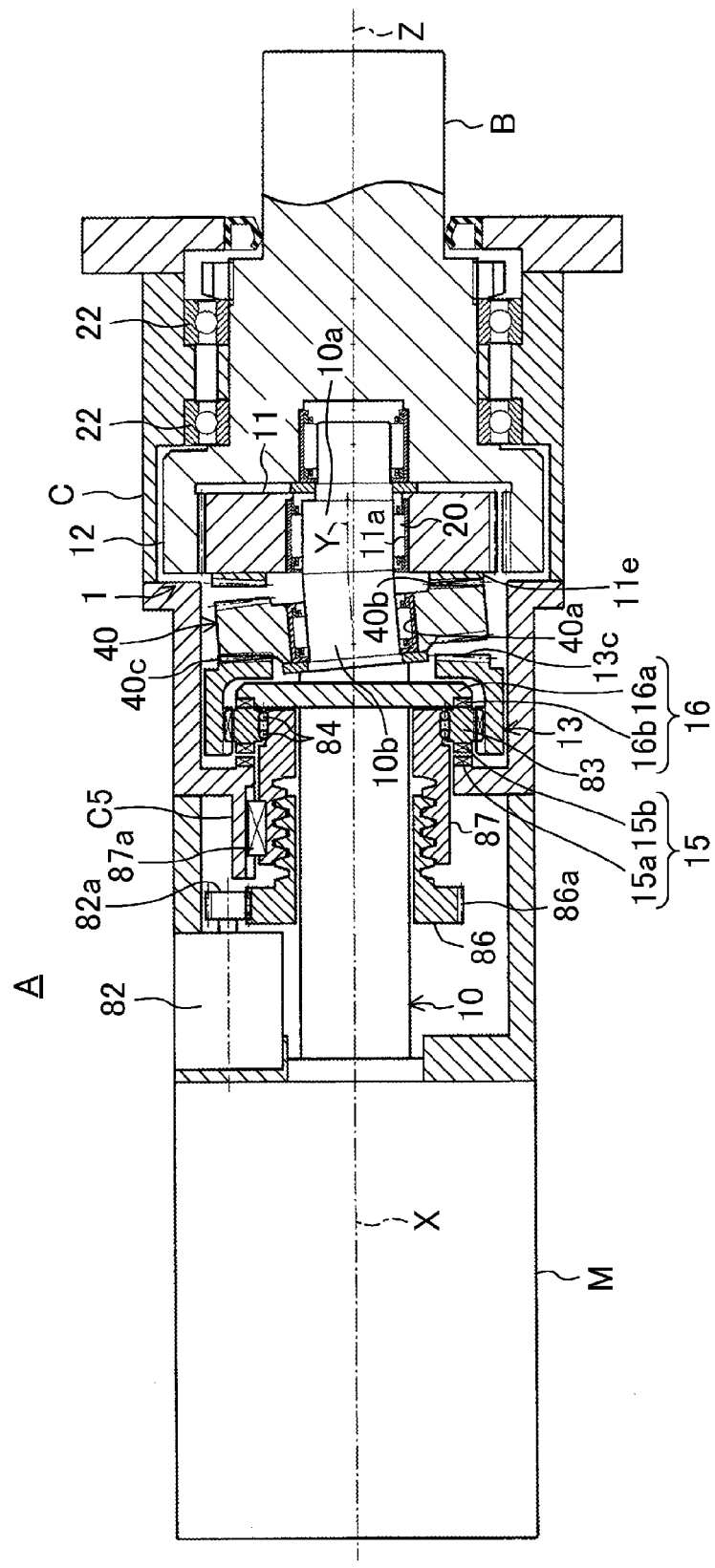
FIG. 51 is a diagram corresponding to FIG. 19 according to a twenty-third embodiment.
Figure 52:
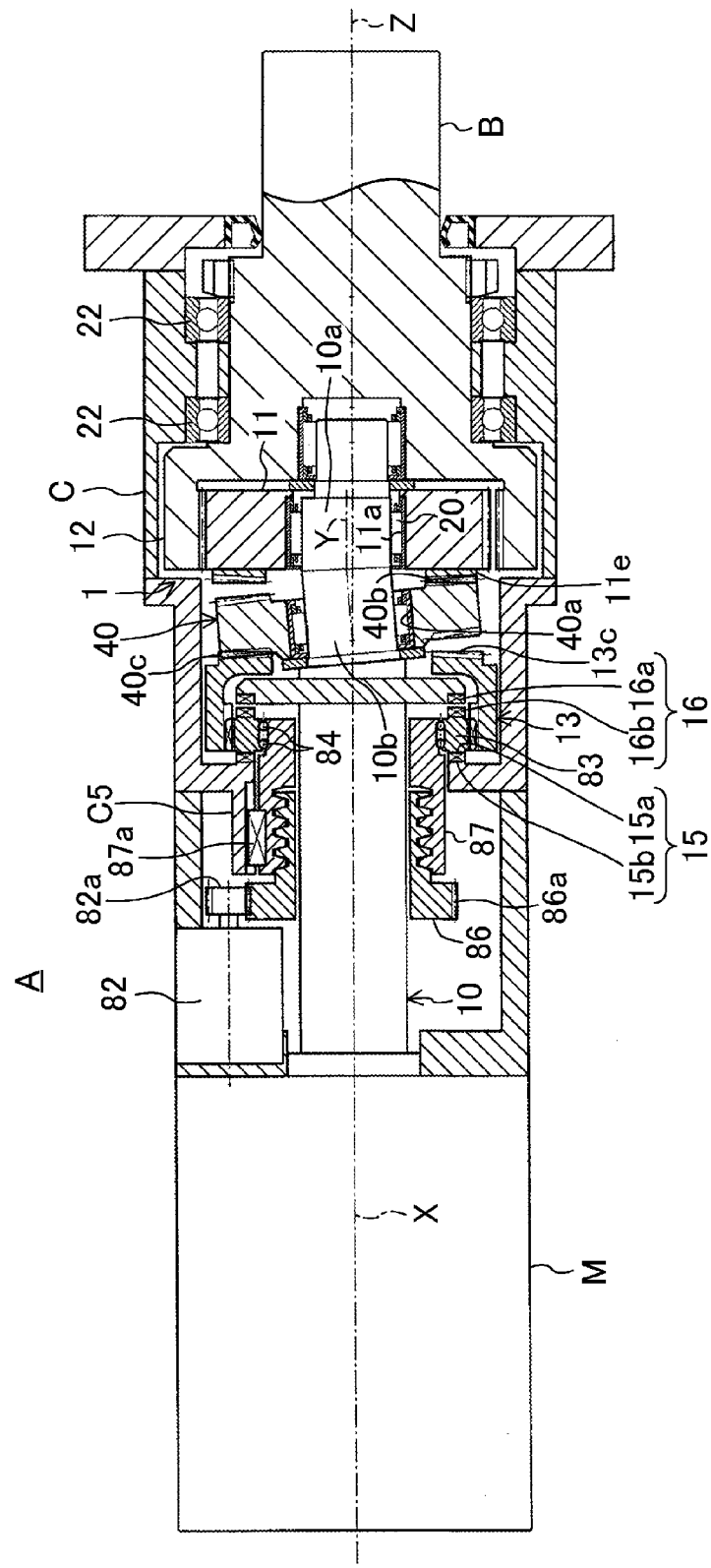
FIG. 52 is a diagram corresponding to FIG. 20 according to the twenty-third embodiment.

FIGS. 51 and 52 are cross-sectional views of a driver A including a gear system 1 according to a twenty-third embodiment of the present disclosure. In the principal structure of the gear system 1 of the twenty-third embodiment, the wobble plate 40 of the third embodiment is used. However, unlike the third embodiment, in the twenty-third embodiment, a brake 15 and a clutch system 16 are operated using a screw mechanism. The same reference characters are used to represent the same components as those in the third embodiment, and the explanation thereof will be omitted. The difference between the third and twenty-third embodiments will be described hereinafter in detail. The screw mechanism is similar to that of the fifth embodiment.

An outer portion of an anti-rotation plate 13 includes a continuous extending portion 13g circumferentially extending toward a motor M. A plurality of teeth are formed on the inner circumferential surface of the extending portion 13g to mesh with teeth of a facing fixing member 83.

In the twenty-third embodiment, as illustrated in FIG. 51, when a screw drive motor 82 is rotated such that a female thread member 87 moves to the right, the brake 15 is placed in a non-braking state, and the clutch system 16 is placed in a coupling state. This allows the anti-rotation plate 13 to be fixed to an input shaft 10.

In contrast, as illustrated in FIG. 52, when the screw drive motor 82 is rotated such that the female thread member 87 moves to the left, the brake 15 is placed in a braking state, and the clutch system 16 is placed in a non-coupling state. This allows the anti-rotation plate 13 to be unrestrained by the input shaft 10.

According to the twenty-third embodiment, operational advantages similar to those of the first embodiment can be obtained.

Twenty-Fourth Embodiment

Figure 53:
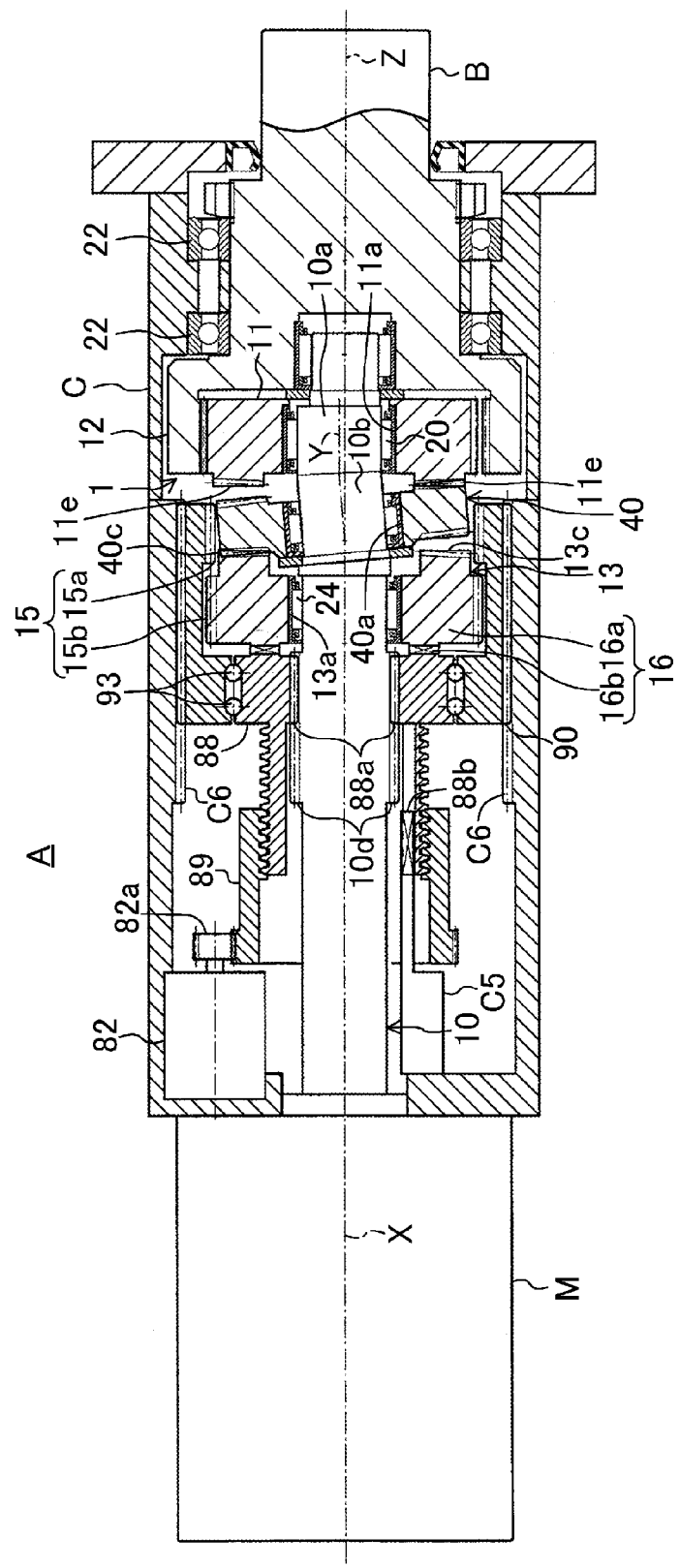
FIG. 53 is a diagram corresponding to FIG. 19 according to a twenty-fourth embodiment.
Figure 54:
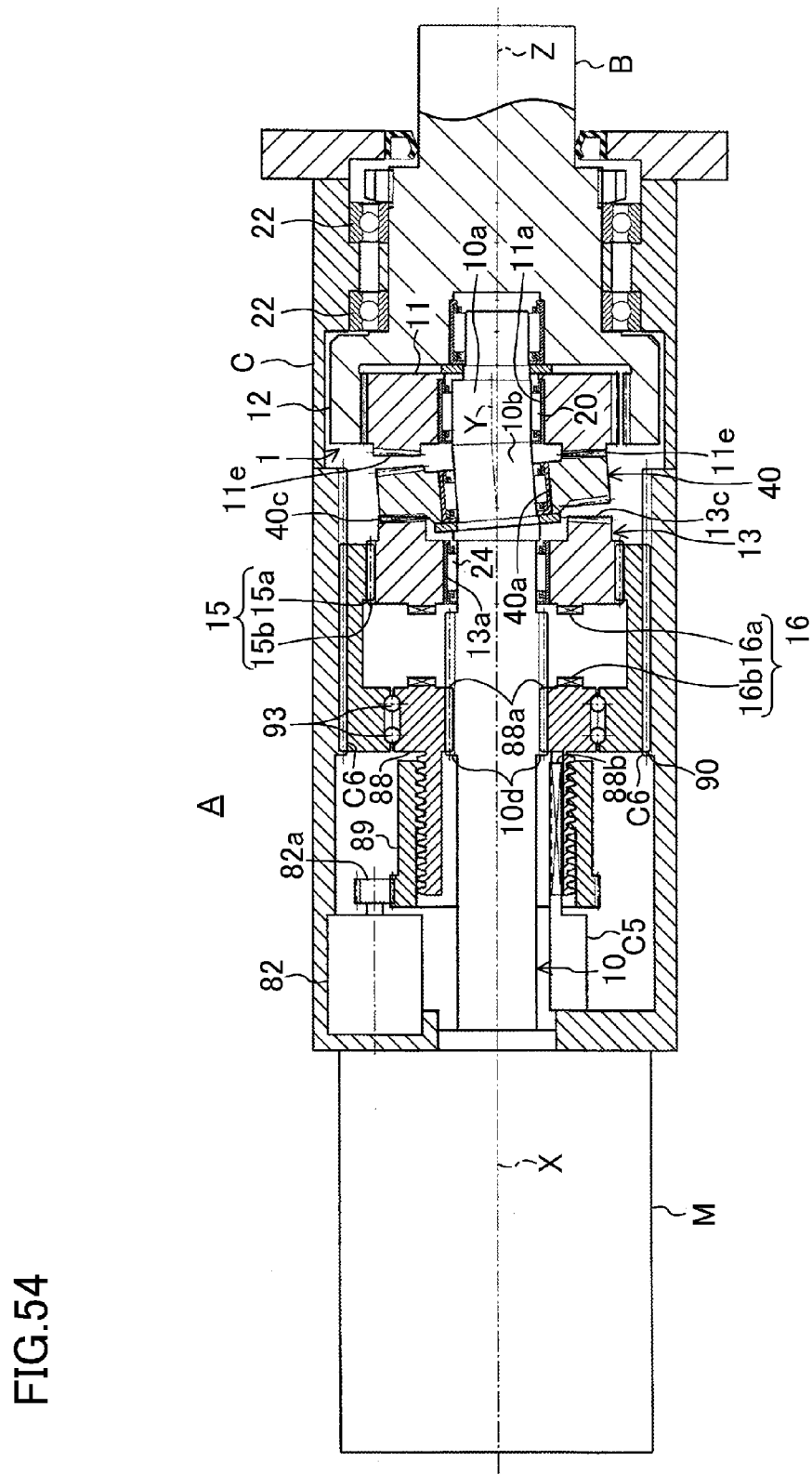
FIG. 54 is a diagram corresponding to FIG. 20 according to the twenty-fourth embodiment.

FIGS. 53 and 54 are cross-sectional views of a driver A including a gear system 1 according to a twenty-fourth embodiment of the present disclosure. In the principal structure of the gear system 1 of the twenty-fourth embodiment, the wobble plate 40 of the third embodiment is used. However, unlike the third embodiment, in the twenty-fourth embodiment, a brake 15 and a clutch system 16 are operated using a screw mechanism. The same reference characters are used to represent the same components as those in the third embodiment, and the explanation thereof will be omitted. The difference between the third and twenty-fourth embodiments will be described hereinafter in detail. The screw mechanism is similar to that of the sixth embodiment.

In the twenty-fourth embodiment, as illustrated in FIG. 53, when a screw drive motor 82 is rotated such that a male thread member 88 moves to the right, the brake 15 is placed in a non-braking state, and the clutch system 16 is placed in a coupling state. This allows an anti-rotation plate 13 to be fixed to an input shaft 10.

In contrast, as illustrated in FIG. 54, when the screw drive motor 82 is rotated such that the male thread member 88 moves to the left, the brake 15 is placed in a braking state, and the clutch system 16 is placed in a non-coupling state. This allows the anti-rotation plate 13 to be unrestrained by the input shaft 10.

According to the twenty-fourth embodiment, operational advantages similar to those of the first embodiment can be obtained.

Twenty-Fifth Embodiment

Figure 55:
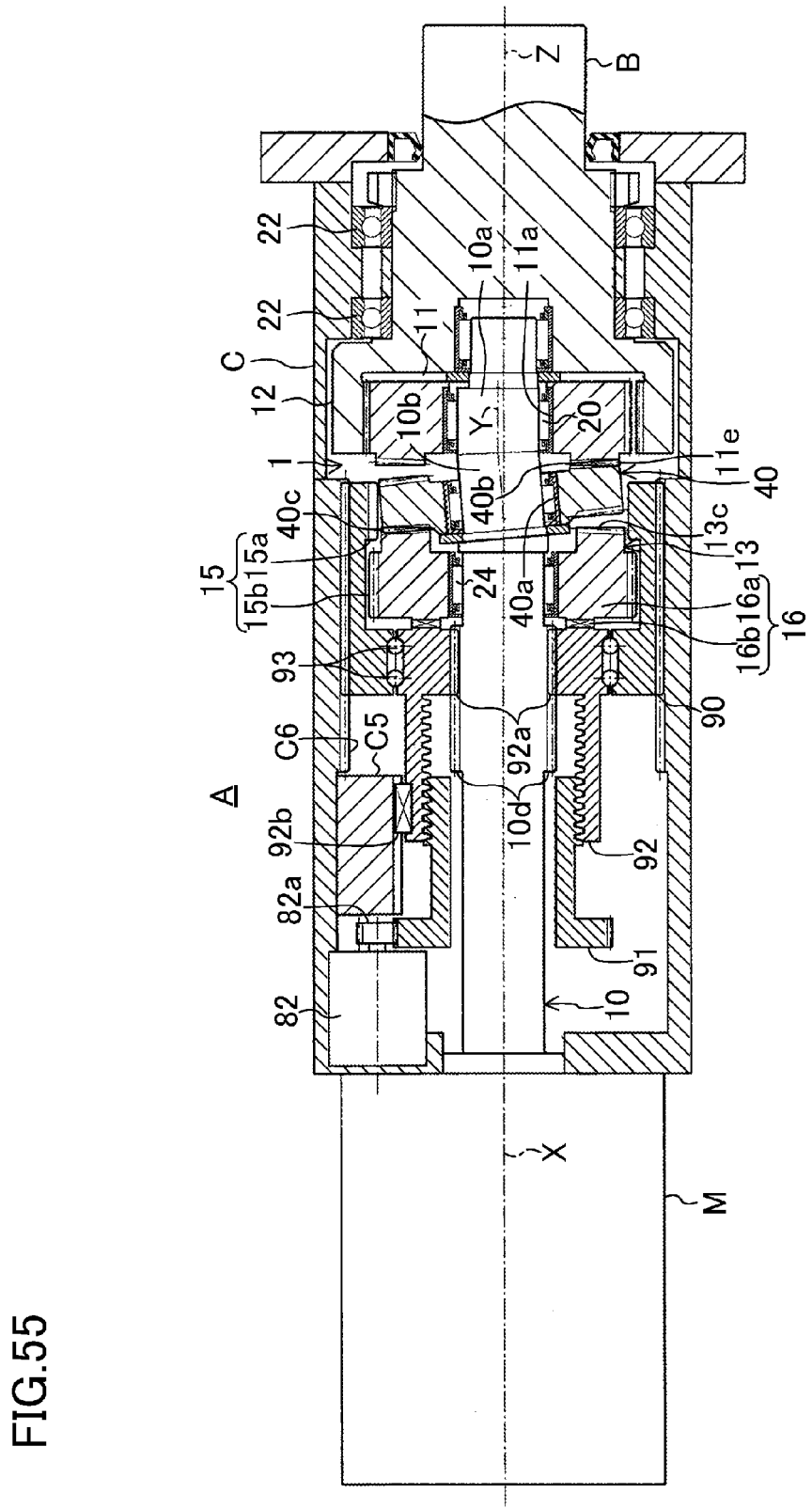
FIG. 55 is a diagram corresponding to FIG. 19 according to a twenty-fifth embodiment.
Figure 56:
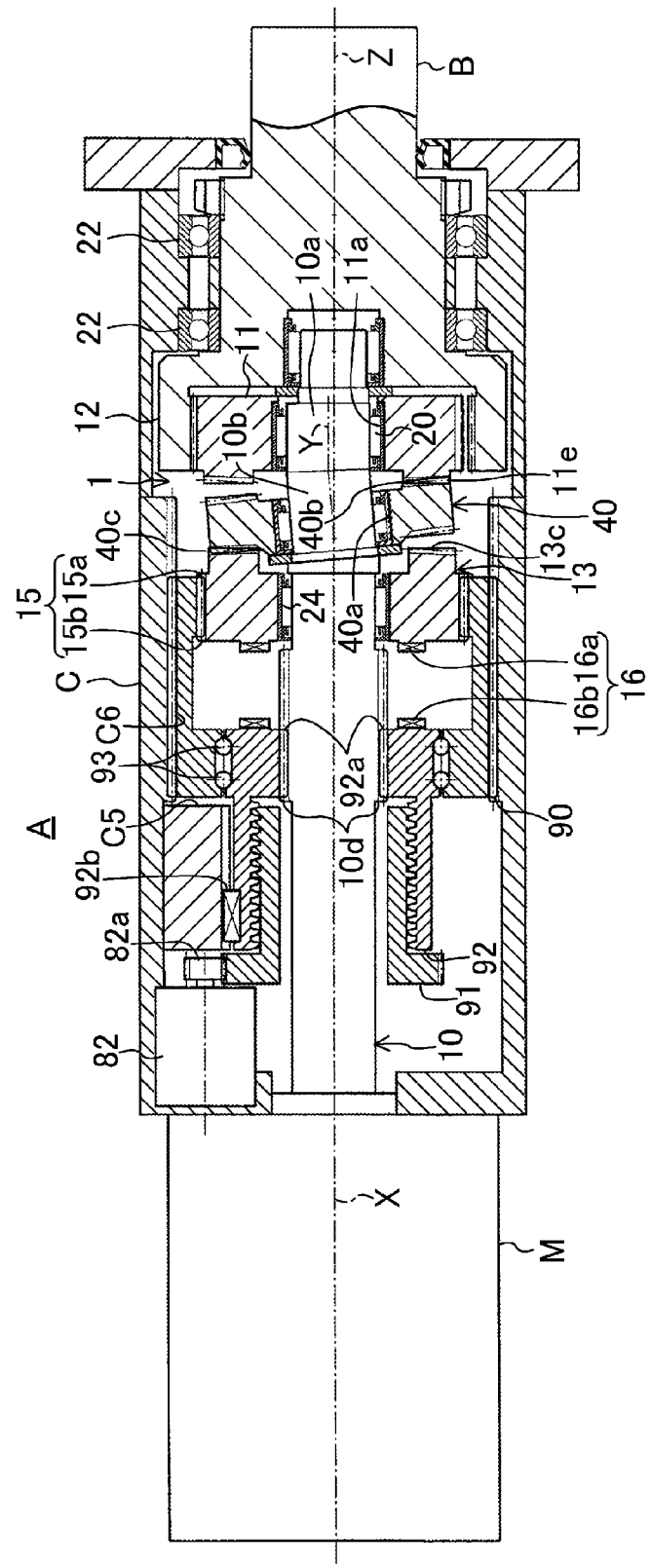
FIG. 56 is a diagram corresponding to FIG. 20 according to the twenty-fifth embodiment.

FIGS. 55 and 56 are cross-sectional views of a driver A including a gear system 1 according to a twenty-fifth embodiment of the present disclosure. In the principal structure of the gear system 1 of the twenty-fifth embodiment, the wobble plate 40 of the third embodiment is used. However, unlike the third embodiment, in the twenty-fifth embodiment, a brake 15 and a clutch system 16 are operated using a screw mechanism. The same reference characters are used to represent the same components as those in the third embodiment, and the explanation thereof will be omitted. The difference between the third and twenty-fifth embodiments will be described hereinafter in detail. The screw mechanism is similar to that of the seventh embodiment.

In the twenty-fifth embodiment, as illustrated in FIG. 55, when a screw drive motor 82 is rotated such that a female thread member 92 moves to the right, the brake 15 is placed in a non-braking state, and the clutch system 16 is placed in a coupling state. This allows an anti-rotation plate 13 to be fixed to an input shaft 10.

In contrast, as illustrated in FIG. 56, when the screw drive motor 82 is rotated such that the female thread member 92 moves to the left, the brake 15 is placed in a braking state, and the clutch system 16 is placed in a non-coupling state. This allows the anti-rotation plate 13 to be unrestrained by the input shaft 10.

According to the twenty-fifth embodiment, operational advantages similar to those of the first embodiment can be obtained.

Twenty-Sixth Embodiment

Figure 57:
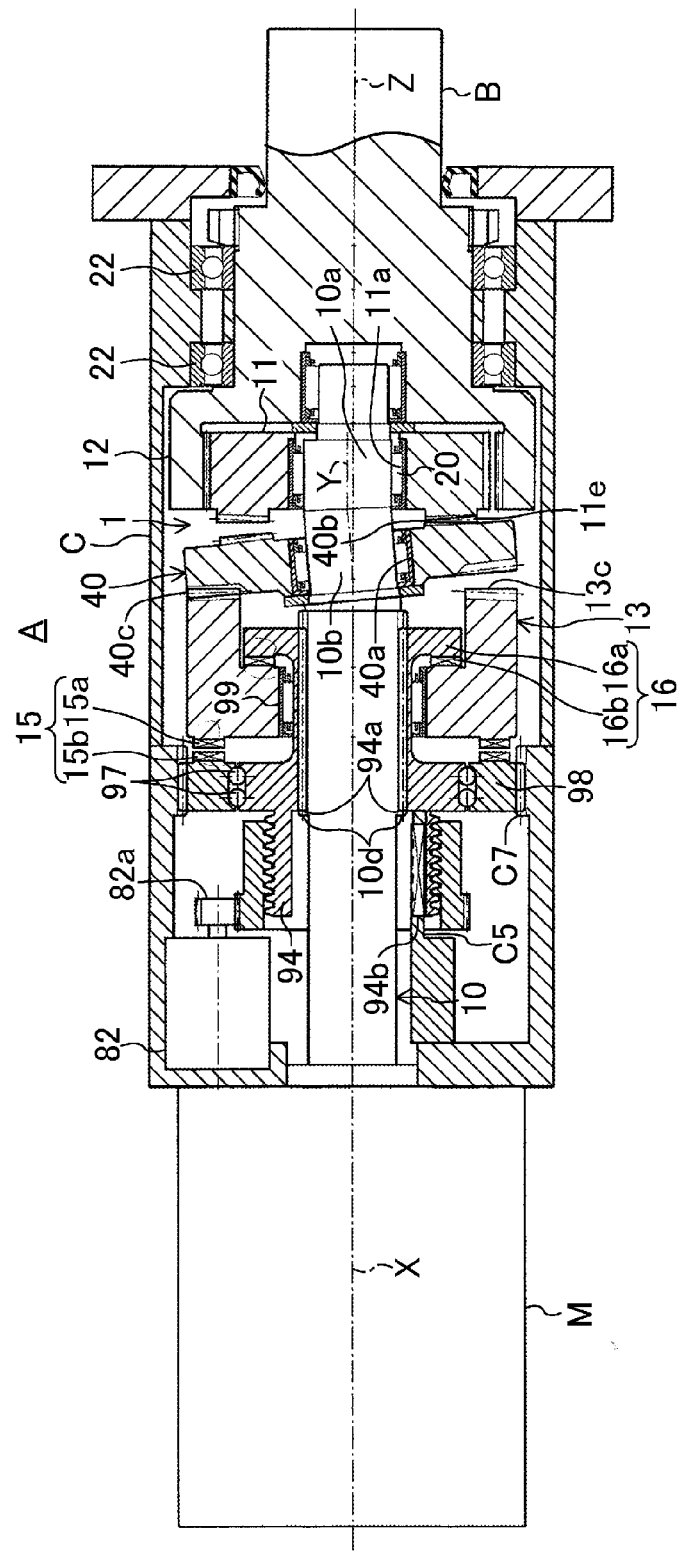
FIG. 57 is a diagram corresponding to FIG. 19 according to a twenty-sixth embodiment.
Figure 58:
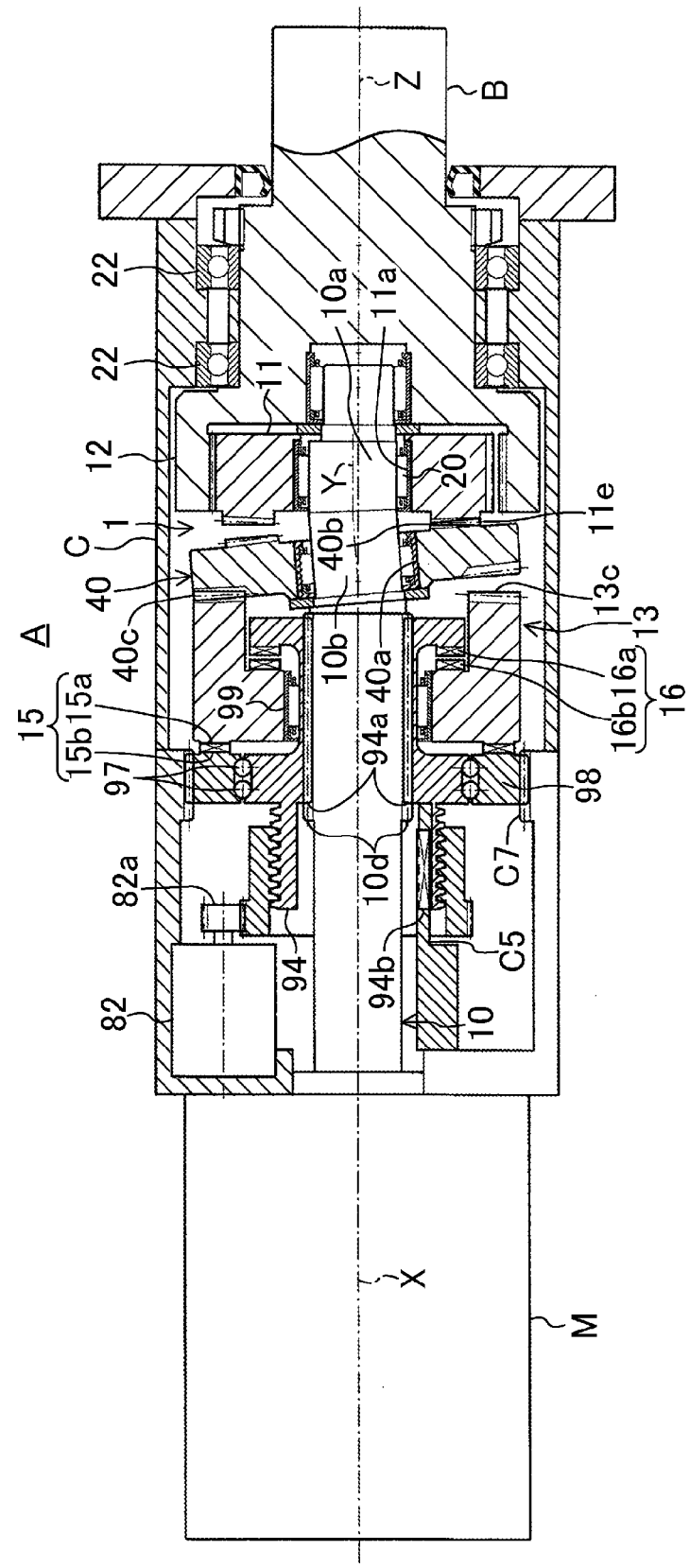
FIG. 58 is a diagram corresponding to FIG. 20 according to the twenty-sixth embodiment.

FIGS. 57 and 58 are cross-sectional views of a driver A including a gear system 1 according to a twenty-sixth embodiment of the present disclosure. In the principal structure of the gear system 1 of the twenty-sixth embodiment, the wobble plate 40 of the third embodiment is used. However, unlike the third embodiment, in the twenty-sixth embodiment, a brake 15 and a clutch system 16 are operated using a screw mechanism. The same reference characters are used to represent the same components as those in the third embodiment, and the explanation thereof will be omitted. The difference between the third and twenty-sixth embodiments will be described hereinafter in detail. The screw mechanism is similar to that of the eighth embodiment.

In the twenty-sixth embodiment, as illustrated in FIG. 57, when a screw drive motor 82 is rotated such that a male thread member 94 moves to the left, the brake 15 is placed in a non-braking state, and the clutch system 16 is placed in a coupling state. This allows an anti-rotation plate 13 to be fixed to an input shaft 10.

In contrast, as illustrated in FIG. 58, when the screw drive motor 82 is rotated such that the male thread member 94 moves to the right, the brake 15 is placed in a braking state, and the clutch system 16 is placed in a non-coupling state. This allows an anti-rotation plate 13 to be unrestrained by the input shaft 10.

According to the twenty-sixth embodiment, operational advantages similar to those of the first embodiment can be obtained.

Twenty-Seventh Embodiment

Figure 59:
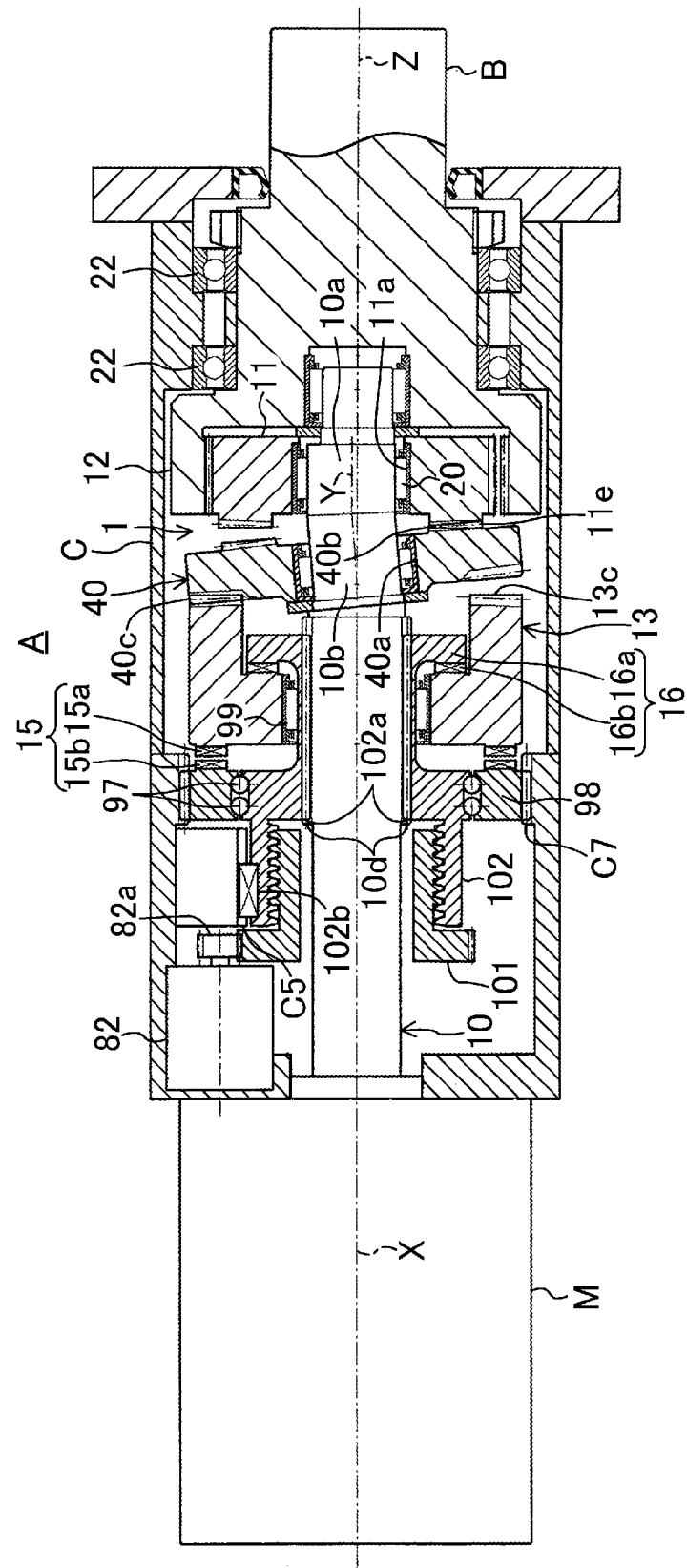
FIG. 59 is a diagram corresponding to FIG. 19 according to a twenty-seventh embodiment.
Figure 60:
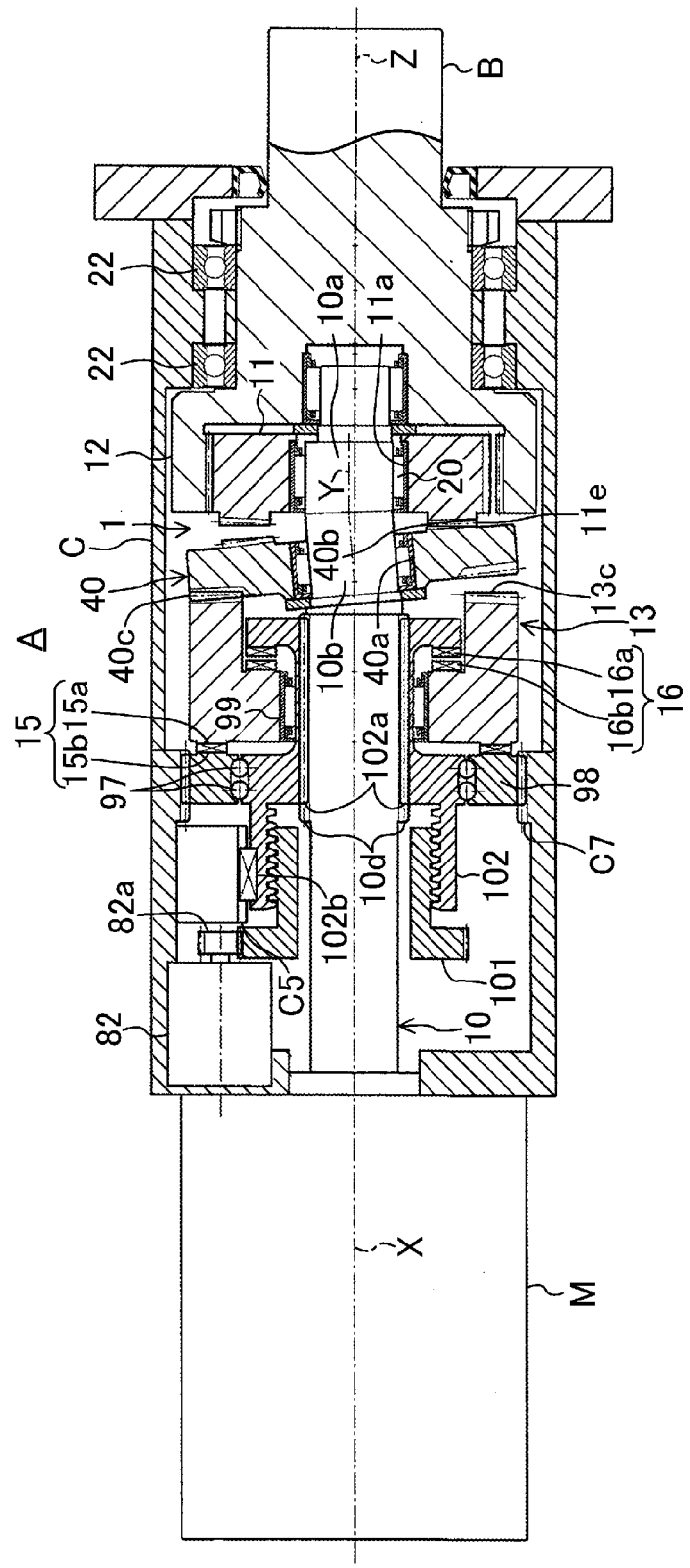
FIG. 60 is a diagram corresponding to FIG. 20 according to the twenty-seventh embodiment.

FIGS. 59 and 60 are cross-sectional views of a driver A including a gear system 1 according to a twenty-seventh embodiment of the present disclosure. In the principal structure of the gear system 1 of the twenty-seventh embodiment, the wobble plate 40 of the third embodiment is used. However, unlike the third embodiment, in the twenty-seventh embodiment, a brake 15 and a clutch system 16 are operated using a screw mechanism. The same reference characters are used to represent the same components as those in the third embodiment, and the explanation thereof will be omitted. The difference between the third and twenty-seventh embodiments will be described hereinafter in detail. The screw mechanism is similar to that of the ninth embodiment.

In the twenty-seventh embodiment, as illustrated in FIG. 59, when a screw drive motor 82 is rotated such that a female thread member 102 moves to the left, the brake 15 is placed in a non-braking state, and the clutch system 16 is placed in a coupling state. This allows an anti-rotation plate 13 to be fixed to an input shaft 10.

In contrast, as illustrated in FIG. 60, when the screw drive motor 82 is rotated such that the female thread member 102 moves to the right, the brake 15 is placed in a braking state, and the clutch system 16 is placed in a non-coupling state. This allows the anti-rotation plate 13 to be unrestrained by the input shaft 10.

According to the twenty-seventh embodiment, operational advantages similar to those of the first embodiment can be obtained.

Twenty-Eighth Embodiment

Figure 61:
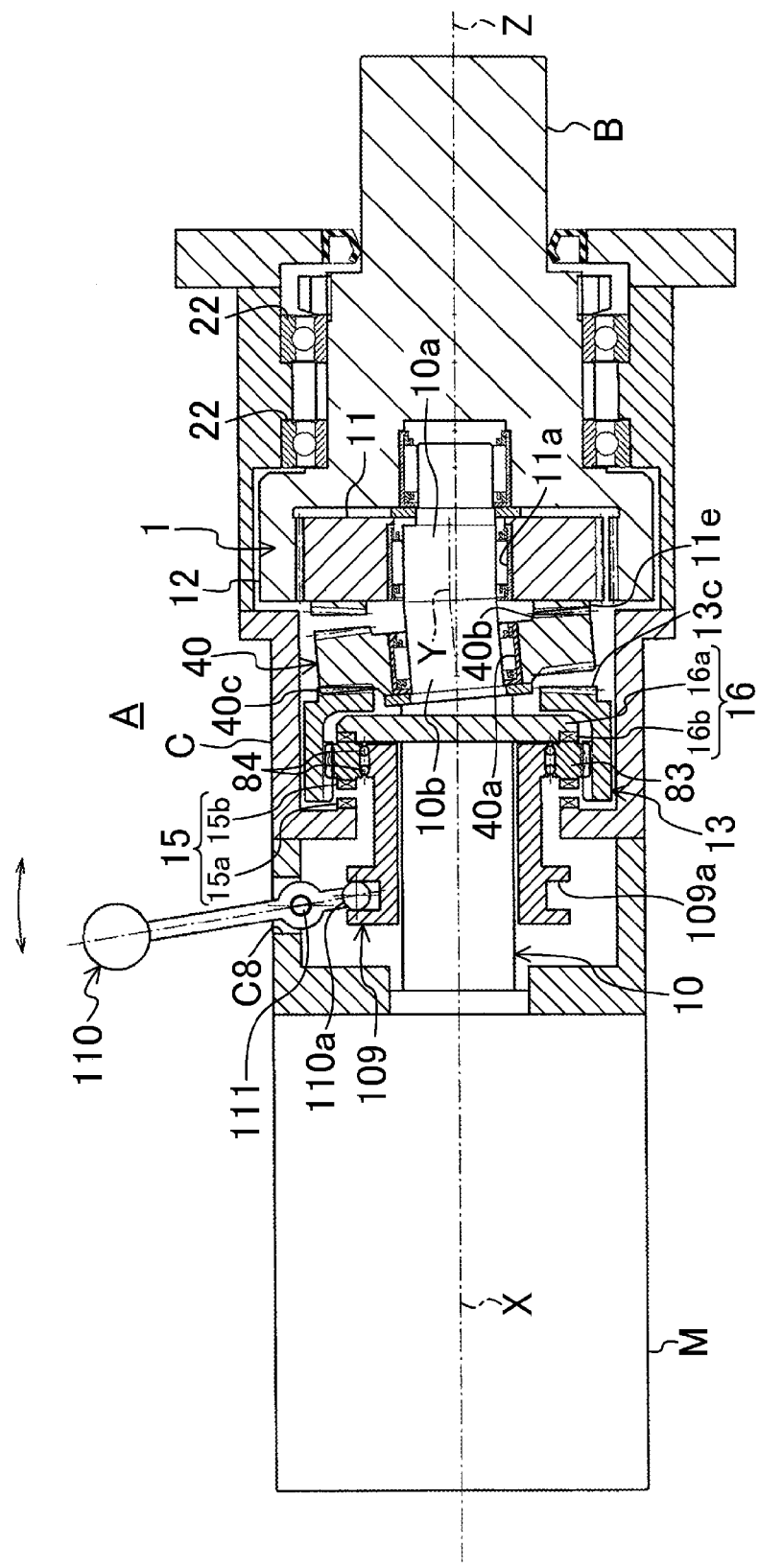
FIG. 61 is a diagram corresponding to FIG. 19 according to a twenty-eighth embodiment.

FIG. 61 is a cross-sectional view of a driver A including a gear system 1 according to a twenty-eighth embodiment of the present disclosure. In the principal structure of the gear system 1 of the twenty-eighth embodiment, the wobble plate 40 of the third embodiment is used. However, unlike the third embodiment, in the twenty-eighth embodiment, a brake 15 and a clutch system 16 are manually operated. The same reference characters are used to represent the same components as those in the third embodiment, and the explanation thereof will be omitted. The difference between the first and twenty-eighth embodiments will be described hereinafter in detail. A manual operation mechanism is similar to that of the sixteenth embodiment. The wobble plate 40, an anti-rotation plate 13, the brake 15, the clutch system 16, and other components are similar to those of the twenty-second embodiment.

In the twenty-eighth embodiment, as illustrated in FIG. 61, when an operating lever 110 is oscillated such that a tubular member 109 moves to the right, the brake 15 is placed in a non-braking state, and the clutch system 16 is placed in a coupling state.

In contrast, although not shown, when the operating lever 110 is oscillated such that the tubular member 109 moves to the left, the brake 15 is placed in a braking state, and the clutch system 16 is placed in a non-coupling state.

According to the twenty-eighth embodiment, operational advantages similar to those of the first embodiment can be obtained.

Twenty-Ninth Embodiment

Figure 62:
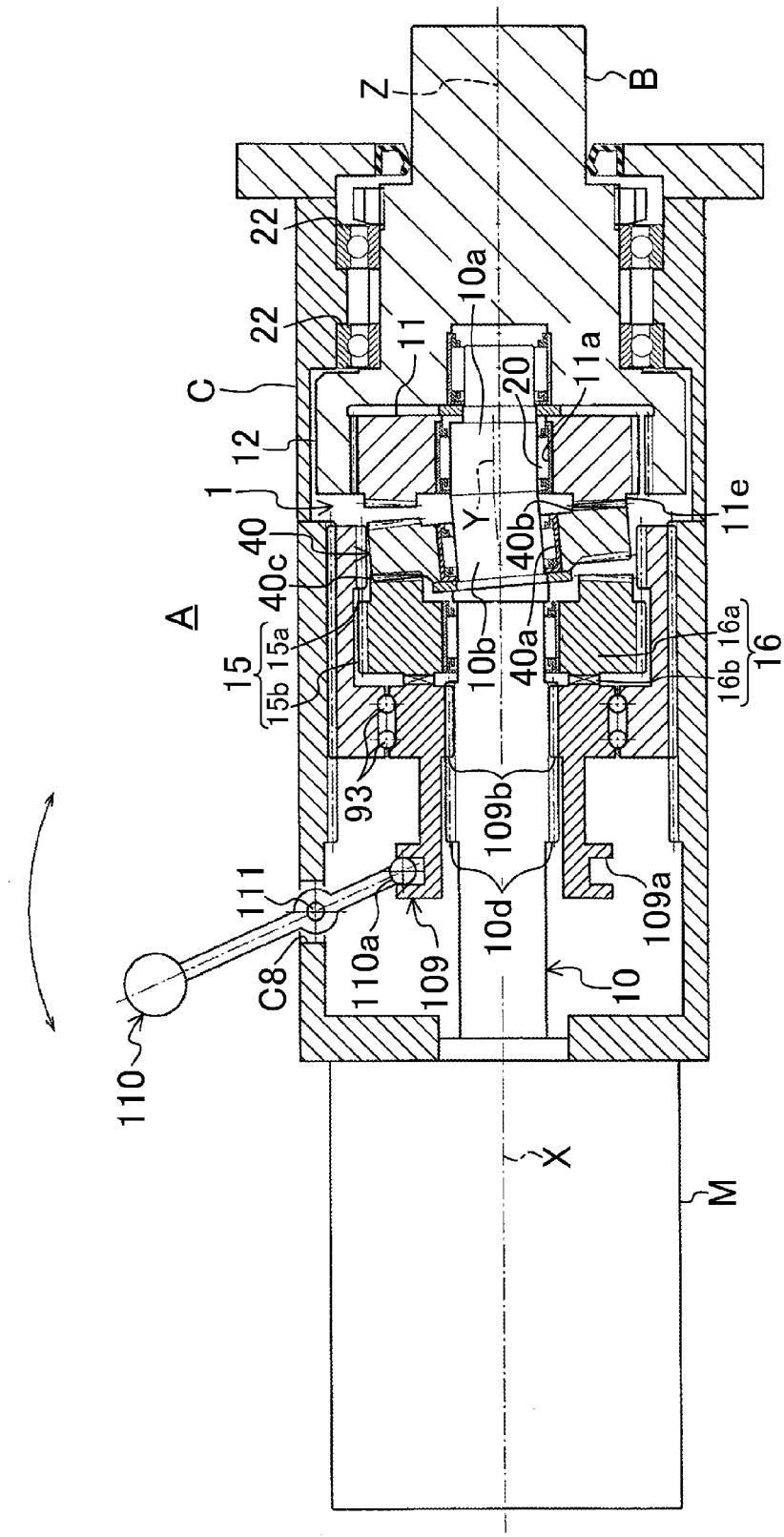
FIG. 62 is a diagram corresponding to FIG. 19 according to a twenty-ninth embodiment.

FIG. 62 is a cross-sectional view of a driver A including a gear system 1 according to a twenty-ninth embodiment of the present disclosure. In the principal structure of the gear system 1 of the twenty-ninth embodiment, the wobble plate 40 of the third embodiment is used. However, unlike the third embodiment, in the twenty-ninth embodiment, a brake 15 and a clutch system 16 are manually operated. The same reference characters are used to represent the same components as those in the third embodiment, and the explanation thereof will be omitted. The difference between the third and twenty-ninth embodiments will be described hereinafter in detail. A manual operation mechanism is similar to that of the seventeenth embodiment. The wobble plate 40, an anti-rotation plate 13, the brake 15, the clutch system 16, and other components are similar to those of the twenty-fourth embodiment.

In the twenty-ninth embodiment, as illustrated in FIG. 62, when an operating lever 110 is oscillated such that a tubular member 109 moves to the right, the brake 15 is placed in a non-braking state, and the clutch system 16 is placed in a coupling state.

In contrast, although not shown, when the operating lever 110 is oscillated such that the tubular member 109 moves to the left, the brake 15 is placed in a braking state, and the clutch system 16 is placed in a non-coupling state.

According to the twenty-ninth embodiment, operational advantages similar to those of the first embodiment can be obtained.

Thirtieth Embodiment

Figure 63:
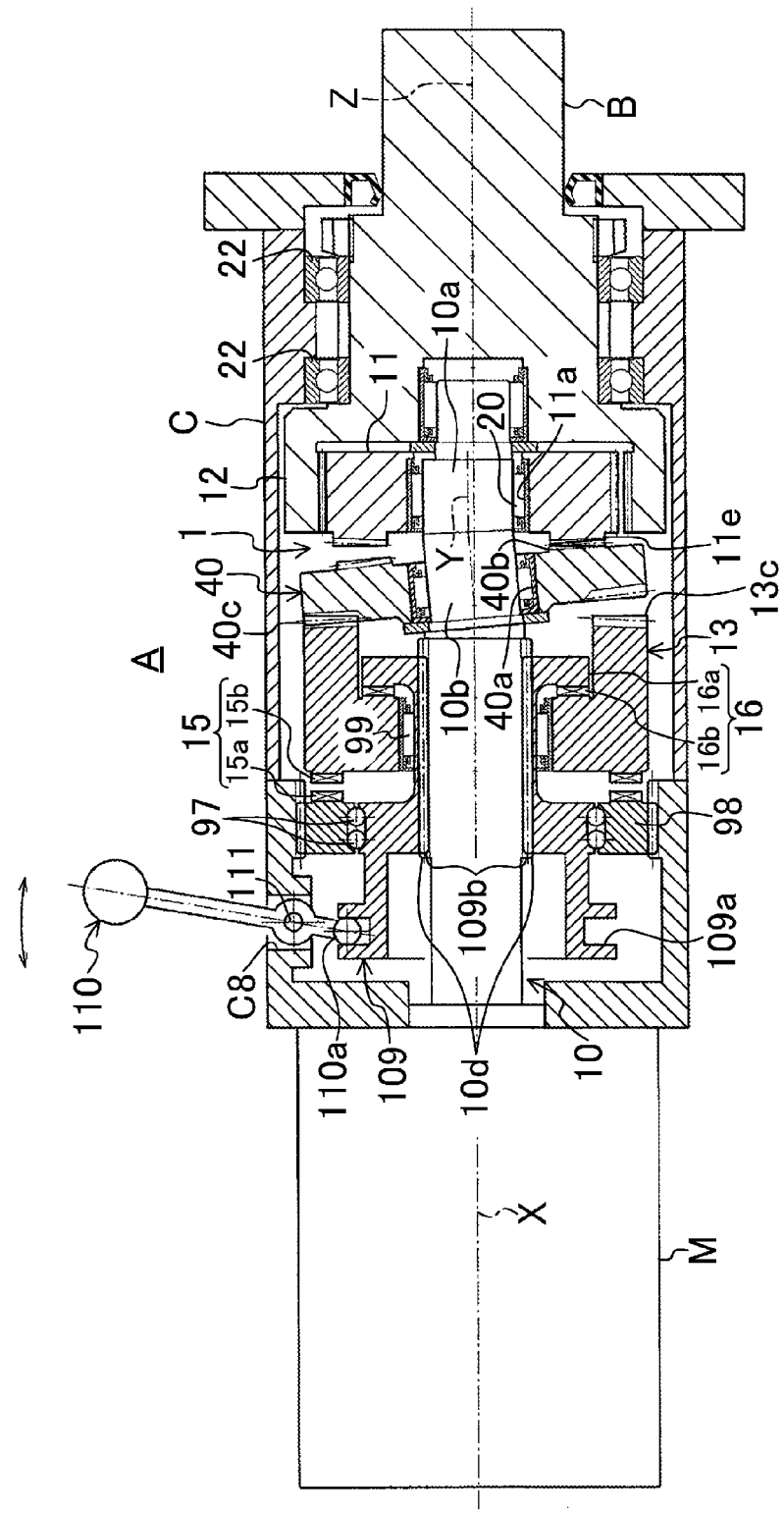
FIG. 63 is a diagram corresponding to FIG. 19 according to a thirtieth embodiment.

FIG. 63 is a cross-sectional view of a driver A including a gear system 1 according to a thirtieth embodiment of the present disclosure. In the principal structure of the gear system 1 of the thirtieth embodiment, the wobble plate 40 of the third embodiment is used. However, unlike the third embodiment, in the thirtieth embodiment, a brake 15 and a clutch system 16 are manually operated. The same reference characters are used to represent the same components as those in the third embodiment, and the explanation thereof will be omitted. The difference between the third and thirtieth embodiments will be described hereinafter in detail. A manual operation mechanism is similar to that of the eighteenth embodiment. The wobble plate 40, an anti-rotation plate 13, the brake 15, the clutch system 16, and other components are similar to those of the twenty-sixth embodiment.

In the thirtieth embodiment, as illustrated in FIG. 63, when an operating lever 110 is oscillated such that a tubular member 109 moves to the left, the brake 15 is placed in a non-braking state, and the clutch system 16 is placed in a coupling state.

In contrast, although not shown, when the operating lever 110 is oscillated such that the tubular member 109 moves to the right, the brake 15 is placed in a braking state, and the clutch system 16 is placed in a non-coupling state.

According to the thirtieth embodiment, operational advantages similar to those of the first embodiment can be obtained.

Thirty-First Embodiment

Figure 64:
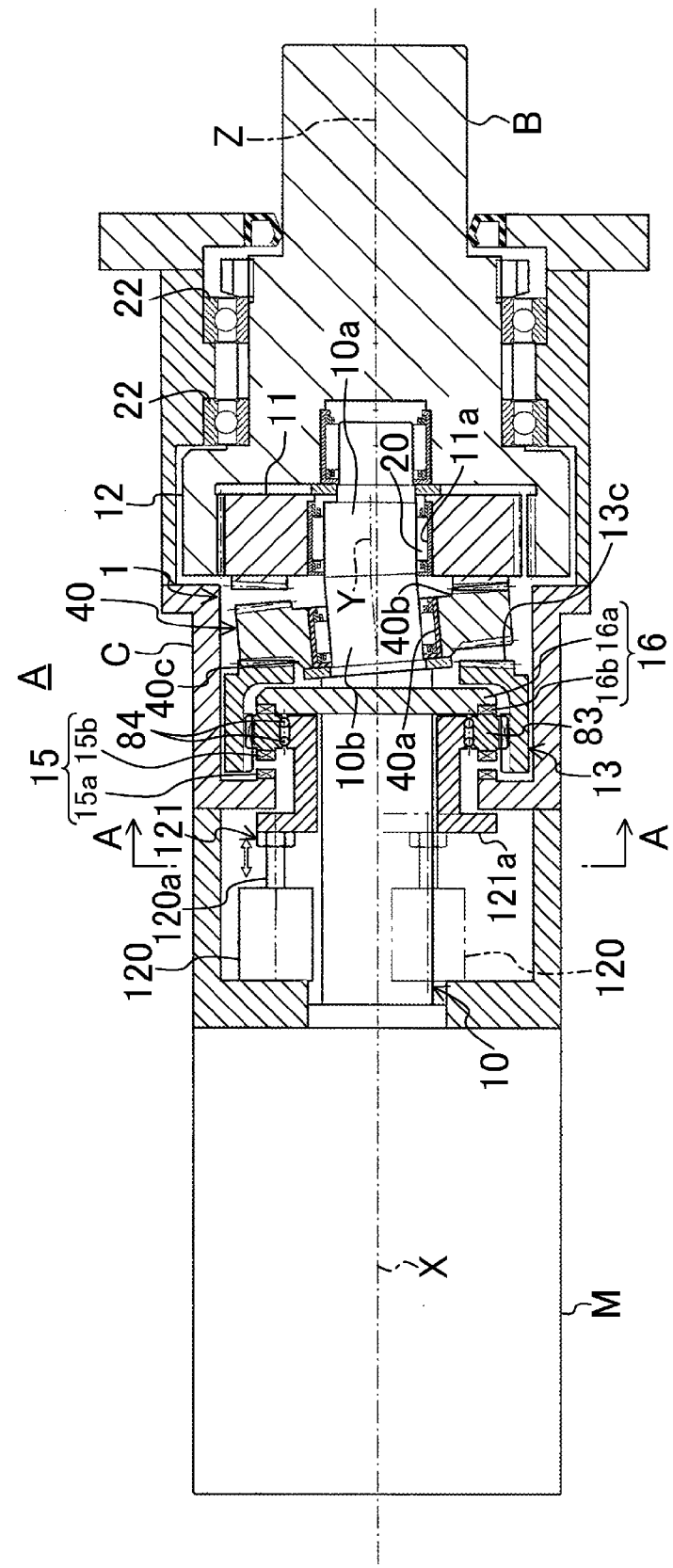
FIG. 64 is a diagram corresponding to FIG. 19 according to a thirty-first embodiment.
Figure 65:
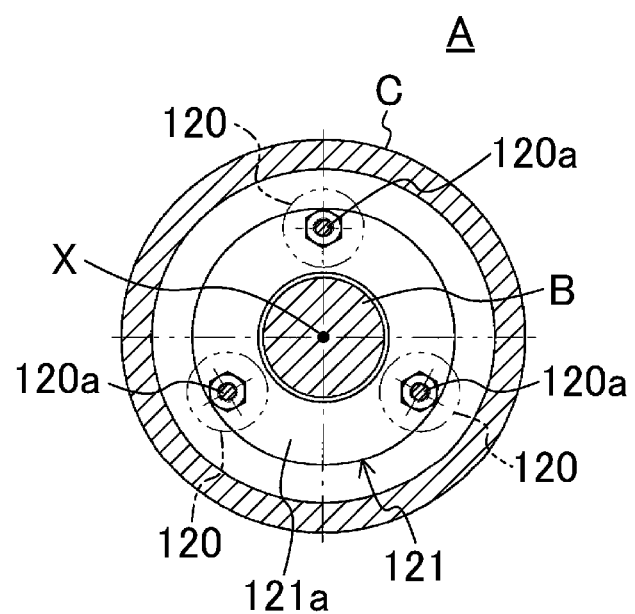
FIG. 65 is a cross-sectional view taken along the line A-A in FIG. 64.

FIGS. 64 and 65 are cross-sectional views of a driver A including a gear system 1 according to a thirty-first embodiment of the present disclosure. In the principal structure of the gear system 1 of the thirty-first embodiment, the wobble plate 40 of the third embodiment is used. However, unlike the third embodiment, in the thirty-first embodiment, a brake 15 and a clutch system 16 are operated using direct drive actuators 120. The same reference characters are used to represent the same components as those in the third embodiment, and the explanation thereof will be omitted. The difference between the third and thirty-first embodiments will be described hereinafter in detail.

In the thirty-first embodiment, the driver A includes the direct drive actuators 120, and a cylindrical direct-acting member 121. A portion of an input shaft 10 closer to a motor M than a clutch system body 16*a* is inserted into the direct-acting member 121. The direct-acting member 121 can move relative to the input shaft 10 along the center line X of the input shaft 10. An end portion of the direct-acting member 121 near the motor M includes a flange 121*a* extending radially outward to form an annular shape. Similarly to the male thread member 80 of the fourth embodiment, a facing fixing member 83 is placed around an end portion of the direct-acting member 121 opposite to the flange 121*a* with roller members 84 interposed therebetween.

The direct drive actuators 120 can be actuators utilizing, e.g., a hydraulic cylinder and an electromagnetic force, and as illustrated in FIG. 65, in this embodiment, the number of the direct drive actuators 120 is three. As illustrated in FIG. 64, the direct drive actuators 120 each include a rod 120*a* moving forward and backward. The direct drive actuators 120 are each fixed to a casing C such that the rod 120*a* is in a position parallel to the center line X of the input shaft 10. As illustrated in FIG. 65, the three direct drive actuators 120 are spaced substantially uniformly about the center line X.

A front end portion of the rod 120*a* of each of the direct drive actuators 120 is fixed to the flange 121*a* of the direct-acting member 121, and the driving force of the rod 120*a* is transferred to the direct-acting member 121.

In the thirty-first embodiment, as illustrated in FIG. 64, when the direct drive actuators 120 are operated by a controller 2 such that the direct-acting member 121 moves to the right, the brake 15 is placed in a non-braking state, and the clutch system 16 is placed in a coupling state.

In contrast, although not shown, when the direct drive actuators 120 are rotated such that the direct-acting member 121 moves to the left, the brake 15 is placed in a braking state, and the clutch system 16 is placed in a non-coupling state.

According to the thirty-first embodiment, operational advantages similar to those of the first embodiment can be obtained.

The number of the direct drive actuators 120 may be one, two, four, or more.

For example, rectilinear solenoids can be used as the direct drive actuators 120.

Thirty-Second Embodiment

Figure 66:
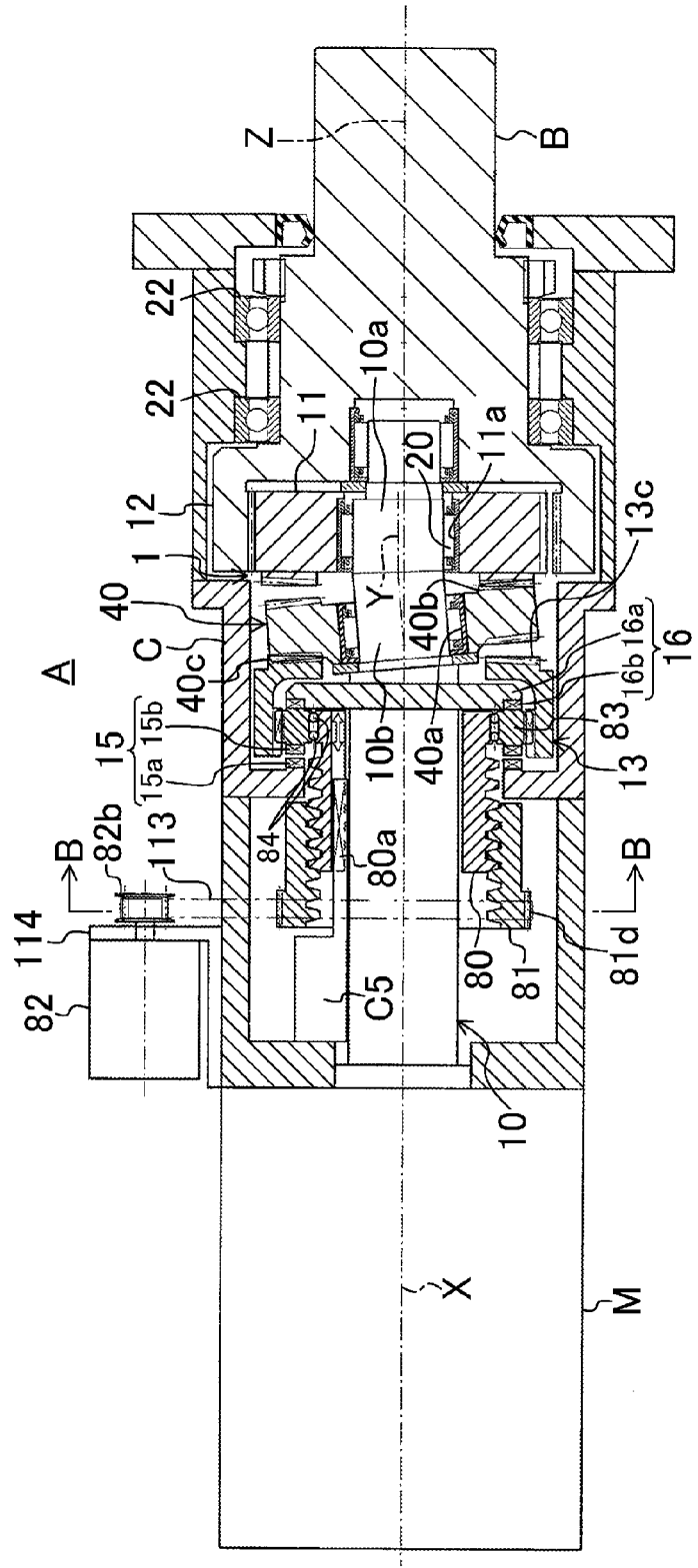
FIG. 66 is a diagram corresponding to FIG. 19 according to a thirty-second embodiment.
Figure 67:
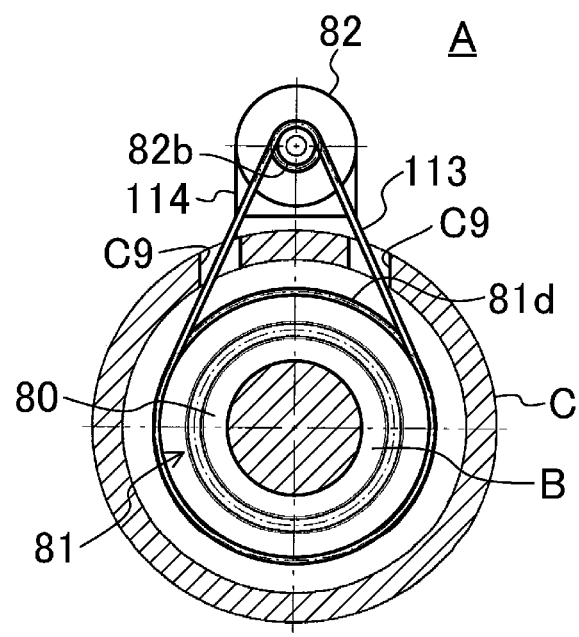
FIG. 67 is a cross-sectional view taken along the line B-B in FIG. 66.

FIGS. 66 and 67 are cross-sectional views of a driver A including a gear system 1 according to a thirty-second embodiment of the present disclosure. In the principal structure of the gear system 1 of the thirty-second embodiment, the wobble plate 40 of the third embodiment is used. However, in the thirty-second embodiment, a brake 15 and a clutch system 16 are operated using a screw mechanism similar to that of the fourth embodiment. The same reference characters are used to represent the same components as those in the fourth embodiment, and the explanation thereof will be omitted. The difference between the fourth and thirty-second embodiments will be described hereinafter in detail.

In the thirty-second embodiment, a female thread member 81 is actuated by a belt 113. Specifically, a screw drive motor 82 is fixed to an outer surface of a casing C with a stationary table 114 interposed therebetween. A pulley 82b is fixed to an output shaft of the screw drive motor 82. In contrast, an outer portion of the female thread member 81 includes a pulley portion 81d onto which the belt 113 is fitted.

In the thirty-second embodiment, when the screw drive motor 82 is rotated, the female thread member 81 rotates, and a male thread member 80 moves on a rail C5 along the center line X in a direction corresponding to the direction of the rotation of the female thread member 81. As illustrated in FIG. 66, when the screw drive motor 82 is rotated such that the male thread member 80 moves to the right, the brake 15 is placed in a non-braking state, and the clutch system 16 is placed in a coupling state.

In contrast, although not shown, when the screw drive motor 82 is rotated such that the male thread member 80 moves to the left, the brake 15 is placed in a braking state, and the clutch system 16 is placed in a non-coupling state.

The belt 113 may be a timing belt or a V-belt.

Instead of the belt 113, a roller chain can be used. In this case, a sprocket (not shown) may be fixed to the screw drive motor 82, and a sprocket (not shown) may be fixed to the female thread member 81.

According to the thirty-second embodiment, operational advantages similar to those of the first embodiment can be obtained.

In each of the first through thirty-second embodiments, a situation where the driver A is used for a drive train of an electric vehicle was described. However, the uses of the driver A are not limited to the situation. A screw feed mechanism can be driven using the driver A. Thus, although not shown, a press die for a press, for example, can be driven by the motor M. In this case, the speed of the press die moved by the driver A can be changed as described above, thereby increasing the speed at which the press die is simply moved except under pressure while providing high thrust under pressure.

The driver A can be used also as, e.g., a driver for a press fitting machine or an injection molding machine.

In each of the first through third embodiments, the gear system 1 is driven by the motor M incorporated into the casing C. However, the motor M is not limited to the motor M of this type. The motor M may be placed outside the casing C. In this case, motors M and gear systems 1 can be separately manufactured and distributed, and one of the motors M and one of the gear systems 1 can be combined depending on the preference of a user.

In each of the fourth through thirty-second embodiments, the motor M is placed outside the casing C. However, a hollow motor may be incorporated into the casing C similarly to the first through third embodiments, and the gear system 1 may be driven by the motor.

For example, when the gear system 1 is used for a press, the input encoder 17 and the output encoder 18 may be omitted.

Examples of types of the motor M include a brushless motor, a switched reluctance motor (SR motor), a direct current motor, and an induction motor, and another type of motor may be used.

Depending on the set number of teeth, the gear system 1 can be utilized also as a speed-increasing gear.

The gear system 1 and the driver A according to the present disclosure can be naturally used to convert a used car with an engine into an electric vehicle, and can be used also in a car body designed as an electric vehicle.

The gear system 1 and the driver A according to the present disclosure can be used for either of a front-wheel drive vehicle, a rear-wheel drive vehicle, and a four-wheel drive vehicle.

The gear system 1 and the driver A according to the present disclosure can be used also for, e.g., a passenger vehicle, a freight car, a train, a motorcycle, a bicycle with an electric motor (a power-assisted bicycle), an electric cart, or an electric wheelchair.

The screw mechanism of, e.g., the fourth embodiment can employ, e.g., a trapezoidal screw thread, a square thread, a ball screw, a sliding screw, or a roller screw.

When the screw mechanism of, e.g., the fourth embodiment is driven, the direct drive actuators 120 of the thirty-first embodiment can be used. For example, the direct drive actuators 120 are fixed to the casing C such that the direction of the movement of the rod 120a of the direct drive actuator 120 is along radial directions of the input shaft 10, and a front end portion of the rod 120a is pivotally coupled to an end surface of the female thread member 81 of the fourth embodiment near the motor M. In this situation, when the rod 120a moves forward or backward, the female thread member 81 can be rotated.

The structures of the brake 15 and the clutch system 16 are not limited to the above structures. For example, spline coupling, a tooth clutch, a meshing system, or insulation displacement connection may be used for the brake 15 and the clutch system 16.

One of the brake 15 and the clutch system 16 may be prevented from being operated. Alternatively, one of them may be omitted.

For example, a structure using a slider mechanism, a toggle mechanism, a crank mechanism, or a linkage may be used as a structure for operating the brake 15 or the clutch system 16, and the structure is not specifically limited.

The structures according to the first through thirty-second embodiments may be used in combination.

INDUSTRIAL APPLICABILITY

As described above, the gear system and the driver according to the present disclosure can be used for, e.g., an electric vehicle or a press.

DESCRIPTION OF REFERENCE CHARACTERS

1 GEAR SYSTEM
2 CONTROLLER (CONTROLLER SECTION)

10 INPUT SHAFT
11 EXTERNAL GEAR
12 INTERNAL GEAR
13 ANTI-ROTATION PLATE
14 CRANKPIN
15 BRAKE
16 CLUTCH SYSTEM
19 ANTI-ROTATION SECTION
40 WOBBLE PLATE
A DRIVER
M MOTOR

The invention claimed is:

1. An eccentrically oscillating gear system comprising:
an internal gear;
an external gear disposed inward of the internal gear to mesh with the internal gear, and including teeth that are different in number from teeth of the internal gear;
an input shaft rotatably inserted into a center hole formed in the external gear; and
an anti-rotation section engaging with the external gear to block rotation of the external gear, wherein
the input shaft has an eccentric part that is eccentric relative to a center line of the input shaft,
in a situation where the anti-rotation section blocks the rotation of the external gear, the external gear is eccentrically oscillated while meshing with the internal gear by rotating the input shaft with the eccentric part being inserted into the center hole of the external gear,
the anti-rotation section is formed such that the input shaft is inserted into the anti-rotation section, and is rotatable about the center line of the input shaft,
the gear system includes:
a brake configured to disable movement of the anti-rotation section about the input shaft; and
a clutch system configured to select one of a coupling state in which the anti-rotation section and the input shaft are coupled together to rotate together, and a non-coupling state in which the anti-rotation section and the input shaft are rotatable relative to each other, and
one of a first mode in which while the brake is operated, and the clutch system is placed in the non-coupling state, the external gear is oscillated, or a second mode in which while the brake is released, and the clutch system is placed in the coupling state, the external gear is rotated at a rotational speed equal to a rotational speed of the input shaft is selected.

2. A driver comprising:
the gear system of claim 1;
a motor configured to rotate the input shaft; and
a controller section configured to control the motor, the brake, and the clutch system.

3. The driver of claim 2, wherein
the number of the teeth of the external gear is set at a number less than the number of the teeth of the internal gear, and
when a change is made from the second mode to the first mode, the controller section places the clutch system in the non-coupling state, then controls a rotational speed of the motor such that a rotational speed of the input shaft corresponds to a difference in number between the teeth of the external gear and the teeth of the internal gear, and thereafter operates the brake.

4. The driver of claim 2, wherein
the number of the teeth of the external gear is set at a number less than the number of the teeth of the internal gear, and
when a change is made from the first mode to the second mode, the controller section releases the brake, then controls a rotational speed of the motor such that a rotational speed of the input shaft corresponds to a difference in number between the teeth of the external gear and the teeth of the internal gear, and thereafter places the clutch system in the coupling state.

* * * * *